US012661282B2

(12) United States Patent
Trimble et al.

(10) Patent No.: US 12,661,282 B2
(45) Date of Patent: Jun. 23, 2026

(54) PATIENT TRANSPORT APPARATUS BASE WITH TROLLEY FOR REMOVABLE LITTER

(71) Applicant: Stryker Corporation, Kalamazoo, MI (US)

(72) Inventors: Shawn Trimble, Portage, MI (US); Christopher Gentile, Sturgis, MI (US); John Pacelli, Allegan, MI (US); Justin Thomas McLouth, Portage, MI (US); Scott Michael Batzer, Plainwell, MI (US)

(73) Assignee: Stryker Corporation, Portage, MI (US)

( * ) Notice: Subject to any disclaimer, the term of this patent is extended or adjusted under 35 U.S.C. 154(b) by 370 days.

(21) Appl. No.: 18/569,275

(22) PCT Filed: Mar. 30, 2022

(86) PCT No.: PCT/US2022/022468
§ 371 (c)(1),
(2) Date: Dec. 12, 2023

(87) PCT Pub. No.: WO2023/027770
PCT Pub. Date: Mar. 2, 2023

(65) Prior Publication Data

US 2024/0277535 A1 Aug. 22, 2024

Related U.S. Application Data

(60) Provisional application No. 63/237,304, filed on Aug. 26, 2021.

(51) Int. Cl.

*A61G 1/017* (2006.01)
*A61G 3/02* (2006.01)

(52) U.S. Cl.

CPC ........... *A61G 1/017* (2013.01); *A61G 3/0218* (2013.01); *A61G 2203/16* (2013.01); *A61G 2203/40* (2013.01)

(58) Field of Classification Search

None
See application file for complete search history.

(56) References Cited

U.S. PATENT DOCUMENTS 7,398,571 B2 7/2008 Souke et al.
8,439,416 B2 5/2013 Lambarth et al.
(Continued)

OTHER PUBLICATIONS

International Search Report for Application No. PCT/US2022/022468 dated Jul. 13, 2022, 2 pages.

*Primary Examiner* — Joseph D. Pape
(74) *Attorney, Agent, or Firm* — Howard & Howard Attorneys PLLC

(57) ABSTRACT

A patient support apparatus for patients. The patient support apparatus comprises a base having a base frame and an intermediate frame. The patient support further comprises a litter configured to be docked to and undocked from a trolley that is configured to slidably translate along the intermediate frame between a plurality of positions including a trolley forward position and a trolley docking position. The litter includes a lower pin and an upper pin. The trolley is configured to receive the upper pin and the lower pin and includes a lower pin stop and an upper pin stop. The lower pin is configured to abut the lower pin stop and the upper pin is configured to abut the upper pin stop to dock the litter to the base.

19 Claims, 40 Drawing Sheets

(56) References Cited

U.S. PATENT DOCUMENTS

| | | | |
|---|---|---|---|
| 9,486,373 B2 | 11/2016 | Lambarth et al. | |
| 9,510,981 B2 | 12/2016 | Lambarth et al. | |
| 10,098,796 B2 * | 10/2018 | Valentino | A61G 1/0212 |
| 10,744,049 B2 | 8/2020 | Naber et al. | |
| 10,758,437 B2 | 9/2020 | Lucas et al. | |
| 10,857,047 B2 | 12/2020 | Furman et al. | |
| 11,298,279 B2 | 4/2022 | Trimble et al. | |
| 2015/0196442 A1 * | 7/2015 | Heil | A61G 7/012 5/613 |
| 2018/0028383 A1 | 2/2018 | Stryker et al. | |
| 2018/0369036 A1 | 12/2018 | Furman et al. | |
| 2020/0179191 A1 | 6/2020 | Trimble et al. | |
| 2020/0179199 A1 | 6/2020 | Feliksa | |
| 2021/0030606 A1 | 2/2021 | Xu et al. | |

* cited by examiner

PATIENT TRANSPORT APPARATUS BASE WITH TROLLEY FOR REMOVABLE LITTER

CROSS-REFERENCE TO RELATED APPLICATIONS

The subject patent application claims priority to and all the benefits of U.S. Provisional Patent Application No. 63/237,304, filed on Aug. 26, 2021, the disclosure of which is hereby incorporated by reference in its entirety.

BACKGROUND

Patient support systems facilitate care of patients in a health care setting. Patient support systems comprise patient transport apparatuses such as, for example, hospital beds, stretchers, cots, tables, wheelchairs, chairs, stair chairs, and the like. Many conventional patient transport apparatuses, such as for example cots, generally include a base arranged for movement about floor surfaces, and a litter upon which a patient can be positioned or otherwise supported. Here, one or types of lift mechanisms may be employed to facilitate adjusting a vertical position of the litter relative to the base to, among other things, promote patient care, load the patient transport apparatus into an ambulance, and the like.

Conventional stair chairs (or “evacuation chairs”) are configured to facilitate transporting a seated patient up or down a flight of stairs, such as by employing tracks that allow for controlled descent down a staircase. When a patient is to be transported along stairs using a stair chair, the tracks are typically moved from a stowed configuration to a deployed configuration extending outwardly at an angle to engage stairs. Those having ordinary skill in the art will appreciate that, when used in connection with certain emergency medical services, stair chairs are typically realized as separate patient transport apparatuses from cots. Further, many conventional ambulances are configured to facilitate loading, securing, and transporting cots, but typically only employ storage space for stair chairs. Thus, in scenarios where a patient being transported via an ambulance on a cot must be transported up or down stairs using a stair chair, the patient sometimes has to be transferred between different patient transport apparatuses, such as from a stair chair to a cot which may subsequently be loaded into an ambulance.

A patient support system designed to overcome one or more of the aforementioned challenges is desired.

SUMMARY

The present disclosure is directed towards a patient support apparatus for supporting a patient. The patient support apparatus includes a base having a head end and a foot end. The base has a base frame arranged for movement about a floor surface, and an intermediate frame operatively coupled to the base frame. The intermediate frame has a trolley configured to translate between a plurality of trolley positions including: a trolley forward position where the trolley is arranged at the head end of the base, and a trolley docking position where the trolley is arranged at the foot end of the base. The trolley defines a lower pin stop and an upper pin stop spaced above the lower pin stop. A litter for supporting the patient is configured to be docked to and undocked from the trolley. The litter includes a patient support surface for supporting the patient, and a litter lift device configured to adjustably support the litter relative to the floor surface between a plurality of positions including: a litter lift chair position, and a litter lift dock position. At least a portion of the patient support surface is closer to the floor surface in the litter lift dock position than in the litter lift chair position. A lower pin and an upper pin each extend from the litter, with the upper pin spaced above the lower pin. At least one of the upper pin and the lower pin are configured to be received by the trolley when the litter lift device is in the litter lift chair position. When at least one of the upper pin and the lower pin have been received by the trolley, the litter lift device is configured to move from the litter lift chair position to the litter lift dock position to lower the litter such that the lower pin abuts the lower pin stop and the upper pin abuts the upper pin stop to dock the litter to the trolley.

DETAILED DESCRIPTION

Figure 1A:
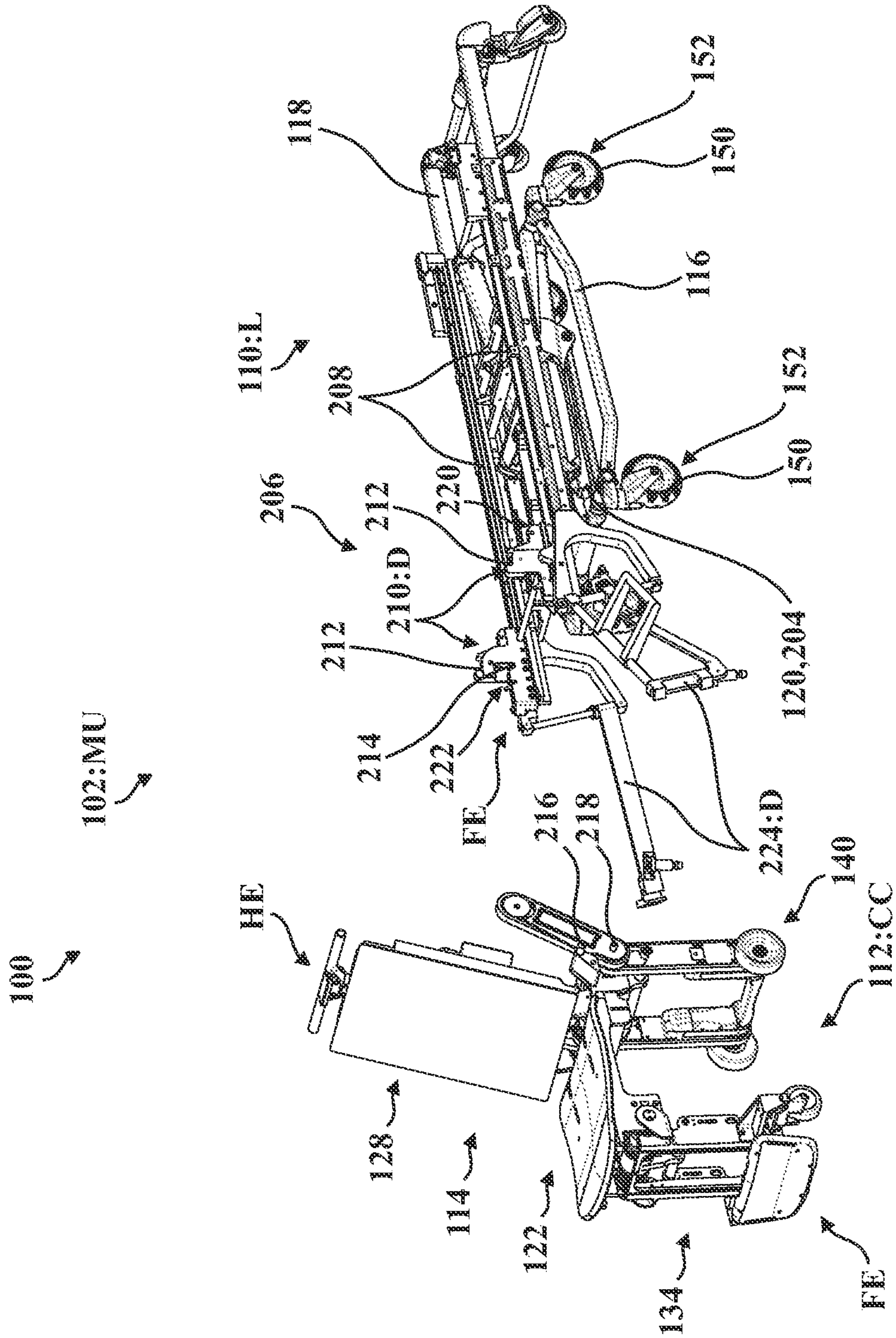
FIG. 1A is a perspective view of a patient transport apparatus of a patient support system of the present disclosure, shown with the patient transport apparatus operating in an undocked mode with a base having stabilizers arranged in a deployed configuration to brace the base against floor surfaces for loading a litter, the litter shown positioned adjacent to the base and arranged in a chair configuration.
Figure 1B:
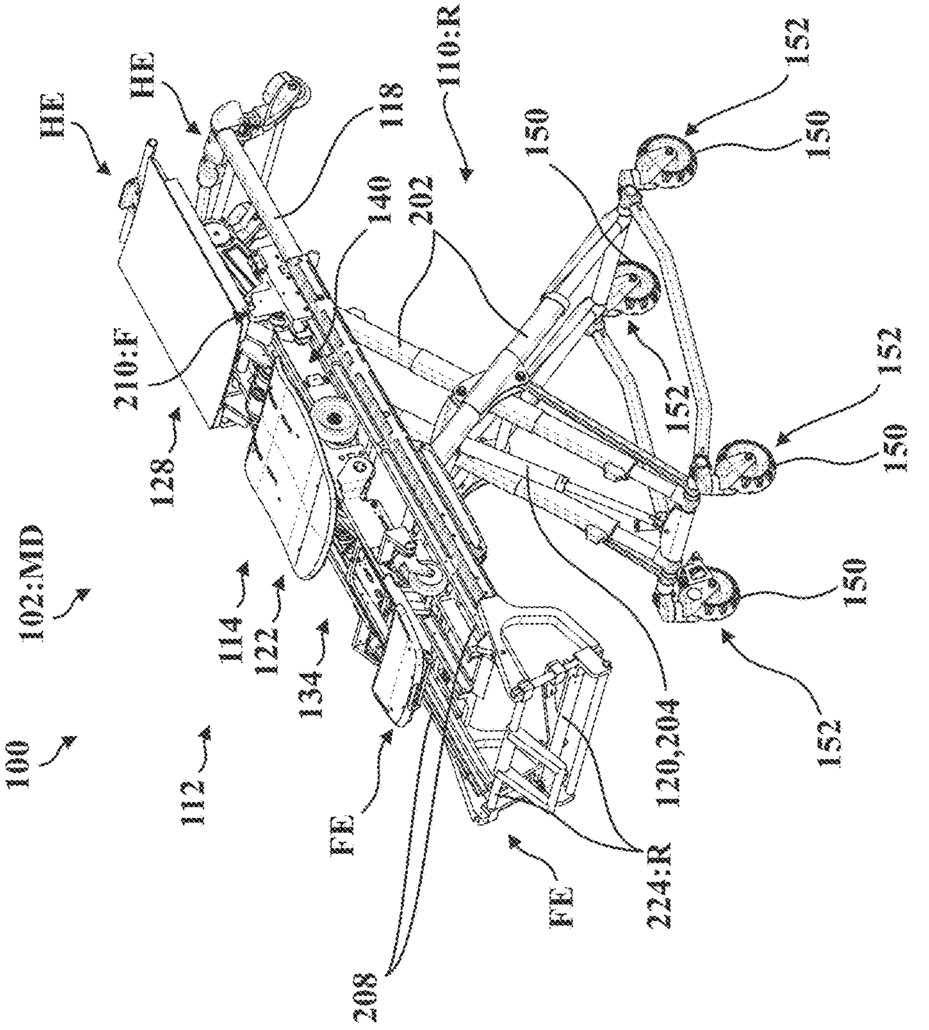
FIG. 1B is another perspective view of the patient transport apparatus of FIG. 1A, shown with the patient transport apparatus operating in a docked mode with the litter secured to the base and with the stabilizers arranged in a retracted configuration.
Figure 4A:
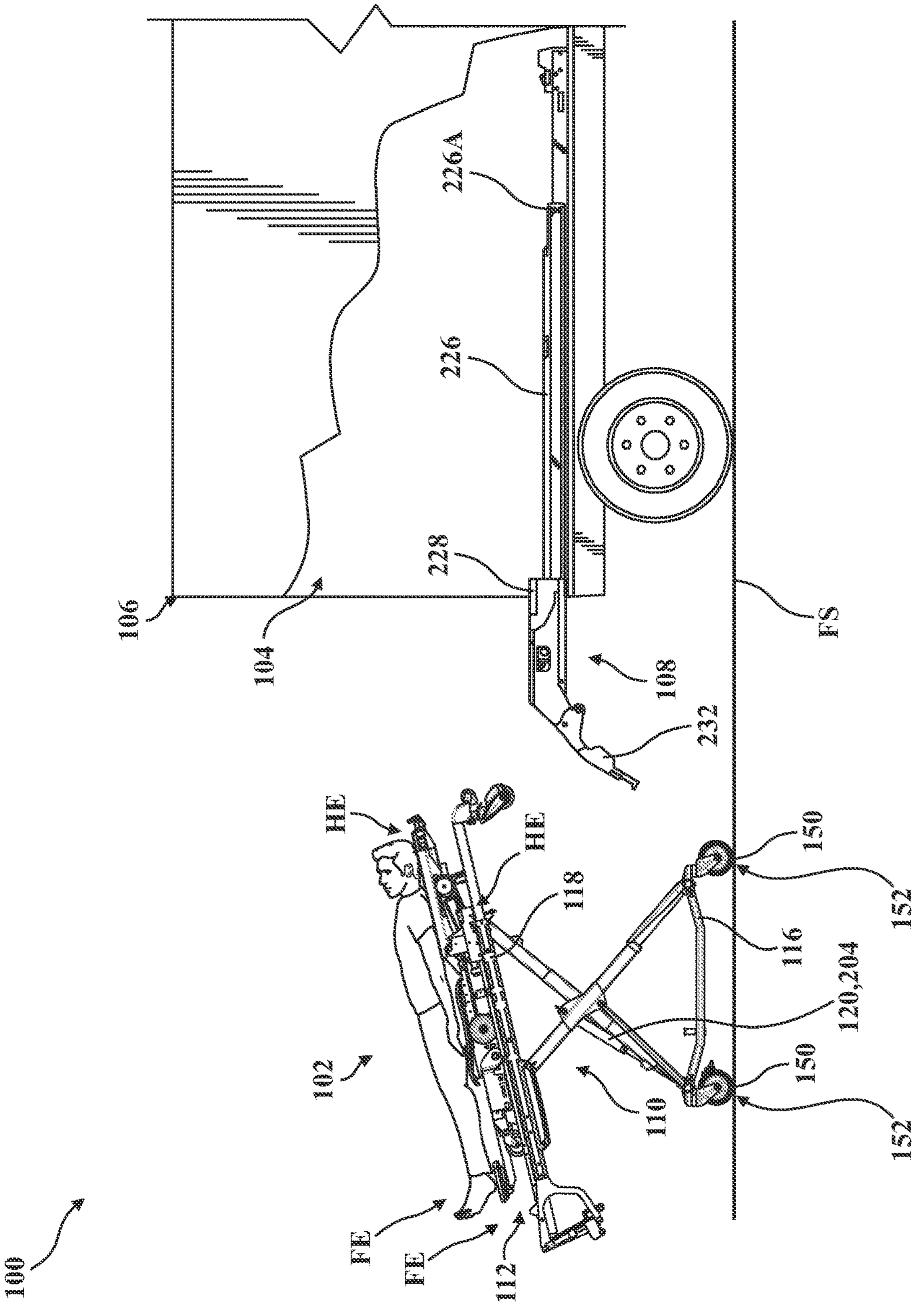
FIG. 4A is another side view of the patient transport apparatus of FIGS. 1A-3G, shown positioned adjacent to a cargo area of an ambulance to which a power load device is secured, with the base of the patient transport apparatus shown arranged in a raised configuration.

Referring to FIGS. 1A-1B and 4A, portions of a patient support system 100 are shown including a patient transport apparatus 102 for supporting a patient in a health care setting according to aspects of the present disclosure. In some versions, the patient transport apparatus 102 is configured to be loaded into a cargo area 104 of an ambulance 106, such as via a power load device 108 (see FIGS. 4A-4C). As will be appreciated from the subsequent description below, while the illustrated versions of the patient transport apparatus 102 described herein are configured as cots for transporting patients, the patient transport apparatus 102 may comprise a hospital bed, a stretcher, a table, a wheelchair, a chair, or a similar apparatus utilized in the care of a patient. The version of the patient transport apparatus 102 shown in FIGS. 1A-1B generally comprises a base 110 and a litter 112. The litter 112 defines or otherwise comprises a patient support surface 114 to support a patient.

In some versions, the patient transport apparatus 102 may comprise a reconfigurable patient support as described in U.S. Pat. No. 9,486,373, which is hereby incorporated by reference in its entirety. In some versions, the patient transport apparatus 102 may comprise a reconfigurable transport apparatus as described in U.S. Pat. No. 9,510,981, which is hereby incorporated by reference in its entirety. In some versions, the patient transport apparatus 102 may comprise a person support apparatus system as described in U.S. Patent Application Publication No. 2018/0028383, which is hereby incorporated by reference in its entirety. In some versions, the patient transport apparatus 102 may comprise a patient transfer apparatus with integrated tracks as described in U.S. patent application Ser. No. 15/854,943, which is hereby incorporated by reference in its entirety. In some versions, the patient transport apparatus 102 may comprise a variable speed patient transfer apparatus as described in U.S. patent application Ser. No. 15/854,199, which is hereby incorporated by reference in its entirety. In some versions, the patient transport apparatus 102 may comprise a patient transfer apparatus as described in U.S. patent application Ser. No. 15/855,161, which is hereby incorporated by reference in its entirety. In some versions, the patient transport apparatus 102 may comprise an ambulance cot as described in U.S. Pat. No. 7,398,571, which is hereby incorporated by reference in its entirety.

With continued reference to FIGS. 1A-1B, the base 110 and litter 112 each have a head end HE and a foot end FE corresponding to designated placement of the patient's head and feet on the patient transport apparatus 102. In FIG. 1A, the litter 112 is shown separated from the base 110; as is described in greater detail below, the base 110 is configured to removably receive and support the litter 112 in certain situations. Put differently, in the illustrated version, the litter 112 is configured for releasable attachment to the base 110. The base 110 generally includes a base frame 116, an intermediate frame 118, and a base lift device 120. The intermediate frame 118 is spaced above the base frame 116 and is moved relative to the base frame 116 via the base lift device 120 as described in greater detail below. Although not illustrated in detail in the drawings, a mattress (or sections thereof) may be disposed on or integral with the litter 112. In such circumstances, the mattress comprises or otherwise defines a secondary patient support surface 114 upon which the patient is supported.

As will be described in greater detail below in connection with FIGS. 3A-8, in the illustrated versions, the litter 112 employs a plurality of assemblies, some of which are capable of being articulated relative to others in various ways and under certain operating conditions to adjust the patient support surface 114 and to facilitate docking to and undocking from the base 110. In the illustrated version, the litter 112 generally includes a seat assembly 122 with a seat frame 124 and a seat section 126, a fowler assembly 128 with a fowler frame 130 and a fowler section 132, a front assembly 134 with a front frame 136 and a front section 138, a rear assembly 140 with a rear frame 142, and a ski assembly 144. Each of the assemblies 122, 128, 134, 140, 144 introduced above will be described in greater detail below.

In the illustrated versions, the fowler assembly 128 pivots relative to the seat assembly 122 about a fowler axis XW, the front assembly 134 pivots relative to the seat assembly 122 about a front axis XF, and the rear assembly 140 pivots relative to the seat assembly 122 about a rear axis XR. In addition, the ski assembly 144 pivots about the rear axis XR as described in greater detail below, but could pivot about other axes in some configurations. In the illustrated version, the seat section 126, the fowler section 132, and the front section 138 each provide support to the patient and, thus, generally cooperate to define the patient support surface 114. In the illustrated version, the front section 138 is also configured to translate along the front frame 136, such as is described in U.S. patent application Ser. No. 16/705,878, the disclosure of which is hereby incorporated by reference in its entirety. It will be appreciated that the fowler section 132 and the front section 138 may pivot relative to the seat section 126, or may articulate relative to the seat section 126 in any manner. For instance, the fowler section 132 and/or the front section 138 may both pivot and translate relative to the seat section 126 in some configurations.

Caregiver interfaces 148, such as handles, help facilitate movement of the patient transport apparatus 102 over floor surfaces. Here, caregiver interfaces 148 may be coupled to the fowler assembly 128, the front assembly 134 (not shown), the intermediate frame 118, and the like. Additional caregiver interfaces 148 may be integrated into other components of the patient transport apparatus 102. The caregiver interfaces 148 are graspable by the caregiver to manipulate the patient transport apparatus 102 for movement.

Base wheels 150 are coupled to the base frame 116 to facilitate transport over floor surfaces. The base wheels 150 are arranged in each of four quadrants of the base 110 adjacent to corners of the base frame 116. In the illustrated versions, the base wheels 150 are caster wheels, which are able to rotate and swivel relative to the base frame 116 during transport. Each of the base wheels 150 forms part of a base caster assembly 152. Each base caster assembly 152 is mounted to the base frame 116. It should be understood that various configurations of base caster assemblies 152 are contemplated. In addition, in some configurations, the base wheels 150 are not caster wheels and may be non-steerable, steerable, non-powered, powered, or combinations thereof. Additional base wheels 150 are also contemplated. For example, the patient transport apparatus 102 may comprise four non-powered, non-steerable wheels, along with one or more powered wheels. In some cases, the patient transport apparatus 102 may not include any wheels. In other configurations, one or more auxiliary wheels (powered or non-powered), which are movable between stowed positions and deployed positions, may be coupled to the base frame 116. In some cases, when these auxiliary wheels are located between caster assemblies and contact the floor surface FS in the deployed position, they cause two of the base caster assemblies 152 to be lifted off the floor surface thereby shortening a wheel base 110 of the patient transport apparatus 102. A fifth wheel may also be arranged substantially in a center of the base 110. Other configurations are contemplated.

It should be noted that in many of the drawings described herein, certain components of the patient transport apparatus 102 have been omitted from view for convenience of description and ease of illustration.

Figure 2:
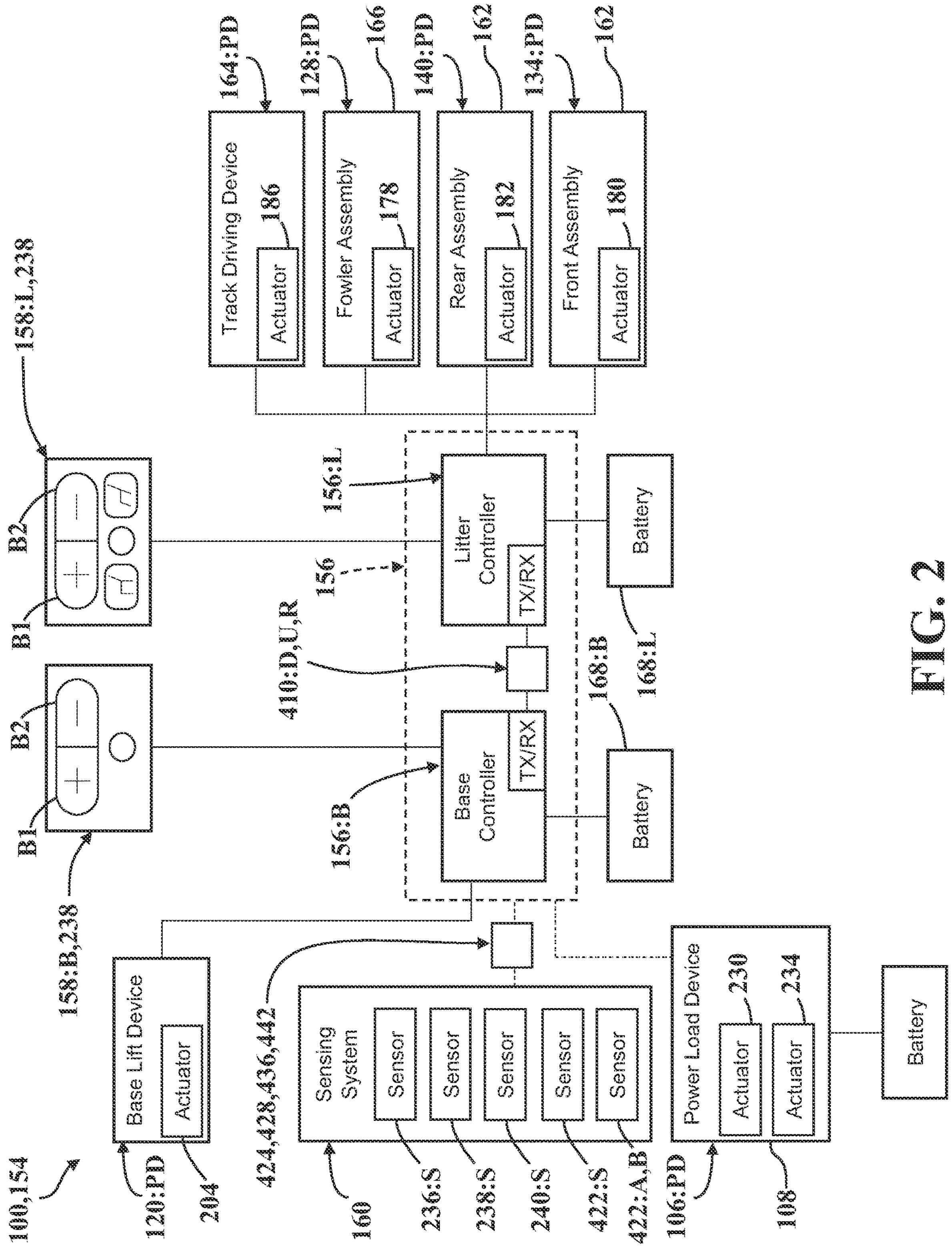
FIG. 2 is a schematic view of a control system of the patient transport apparatus of FIGS. 1A-1B.

Referring now to FIG. 2, a control system 154 of the patient transport apparatus 102 is shown schematically. The control system 154 generally comprises one or more powered devices PD operated by a base controller 156B and/or a litter controller 156L (collectively referred to herein as "controller 156") in response to actuation of a base user interface 158B and/or a litter user interface 158L (collectively referred to herein as "user interface 158") in response to state signals received from a sensing system 160. Each of these components will be described in greater detail below.

With continued reference to FIG. 2, each of the one or more powered devices PD of the control system 154 is configured to perform one or more predetermined functions. To this end, the powered devices PD employ one or more components that utilize electricity in order to perform functions. One or more powered devices PD of the patient support system 100 and/or the patient transport apparatus 102 may comprise powered adjustment devices, such as the power load device 108, the base lift device 120, a litter lift device 162, a track driving device 164, and a fowler section adjustment device 166. To this end, in some versions, the base 110 employs a base energy storage device 168B and the litter 112 employs a litter energy storage device 168L (collectively referred to herein as "energy storage device 168"). Other powered devices PD are also contemplated.

The powered devices PD may have many possible configurations for performing the predetermined functions of the patient transport apparatus 102. As will be appreciated from the subsequent description below, powered devices PD may cooperate with or otherwise form a part of the patient transport apparatus 102 in certain versions. Exemplary configurations of some of the powered devices PD are described in greater detail below. One or more actuators may be used to effectuate functions of each powered device PD. It should be understood that numerous configurations of the powered devices PD, other than those specifically described herein, are contemplated. Exemplary scenarios of how certain powered devices PD may be utilized are also described below. However, numerous other scenarios not described herein are also contemplated.

The litter 112 of the present disclosure is configured to be removably attached to the intermediate frame 118 of the base 110, as noted above and as is described in greater detail below, and is generally operable between: an undocked mode MU (see FIG. 1A) where the litter 112 supports the patient for movement independent of the base 110, and a docked mode MD (see FIG. 1B) where the litter 112 support the patient for movement concurrent with the base 110. The process of moving between the undocked mode MU and the docked mode MD is described in greater detail below in connection with FIGS. 3A-3G. While operating in the undocked mode MU, the litter 112 is operable between a loft configuration CL (see FIG. 7A), a chair configuration CC (see FIG. 7C), and a stair configuration CS (see FIGS. 7D-8). While operating in the docked mode MD, portions of the litter 112 may be articulable to adjust the patient support surface 114, such as by moving the fowler assembly 128. Other configurations are contemplated.

Figure 7A:
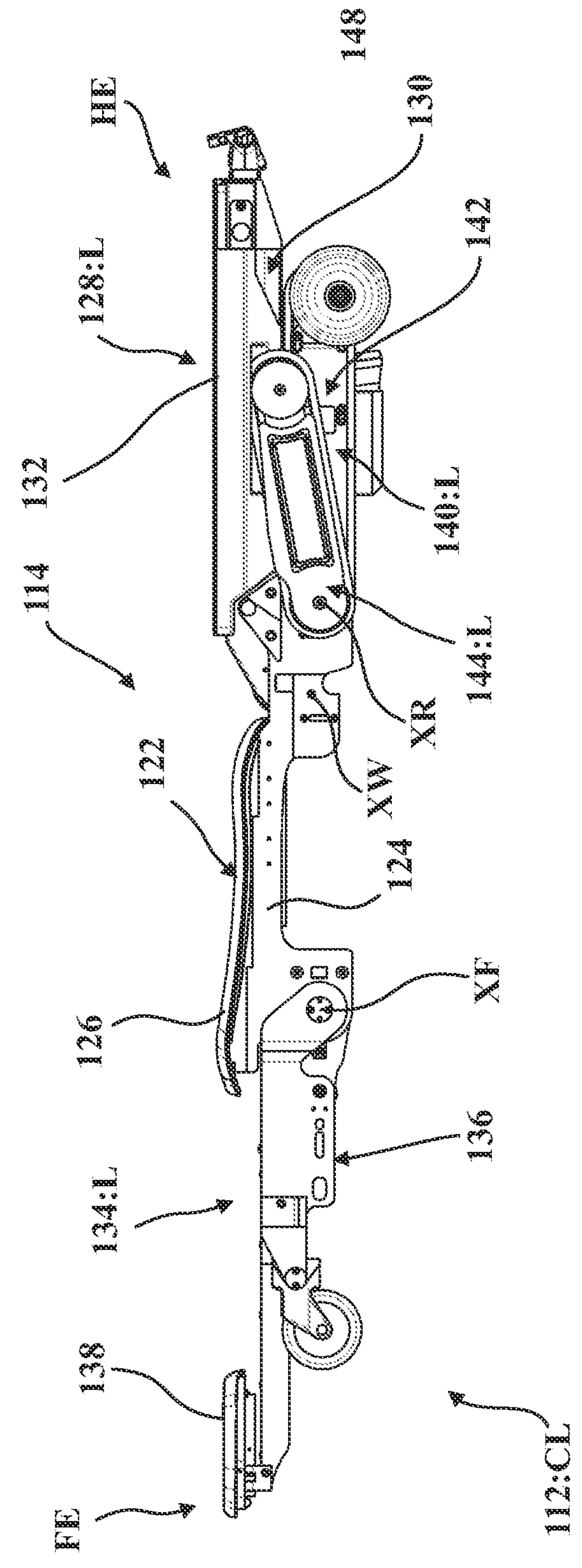
FIG. 7A is a side view of the litter of the patient transport apparatus of FIGS. 1A-6, shown arranged in a loft configuration.
Figure 7B:
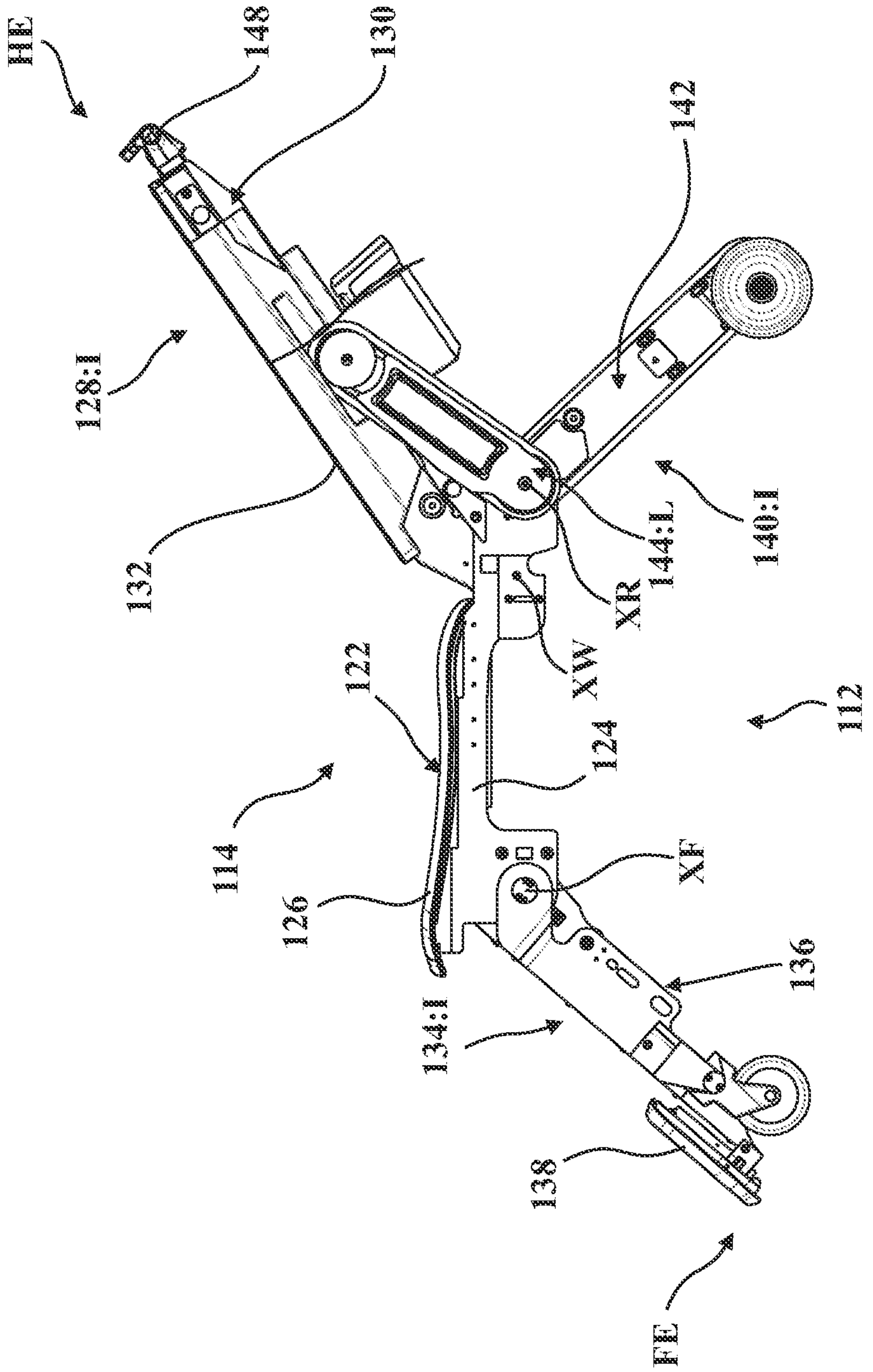
FIG. 7B is another side view of the litter of FIG. 7A shown transitioning between the loft configuration and the chair configuration.
Figure 7C:
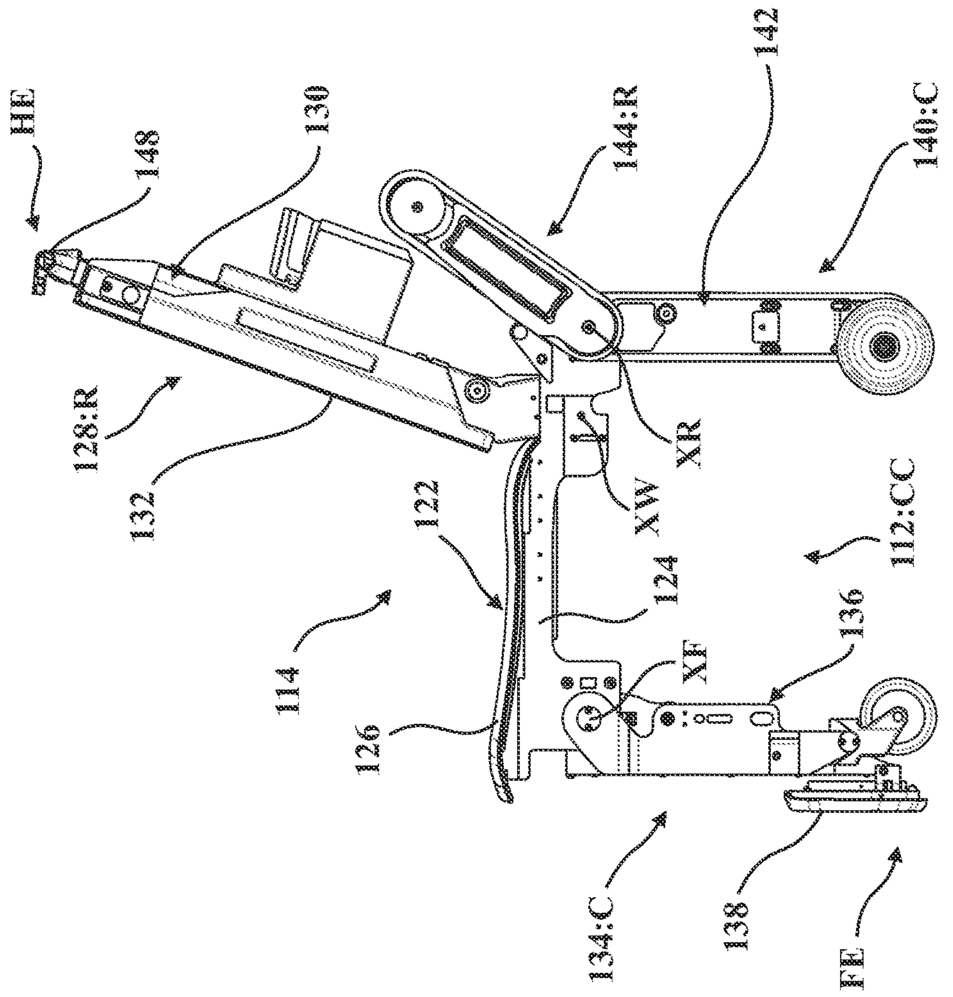
FIG. 7C is another side view of the litter of FIGS. 7A-7B shown arranged in the chair configuration.
Figure 7D:
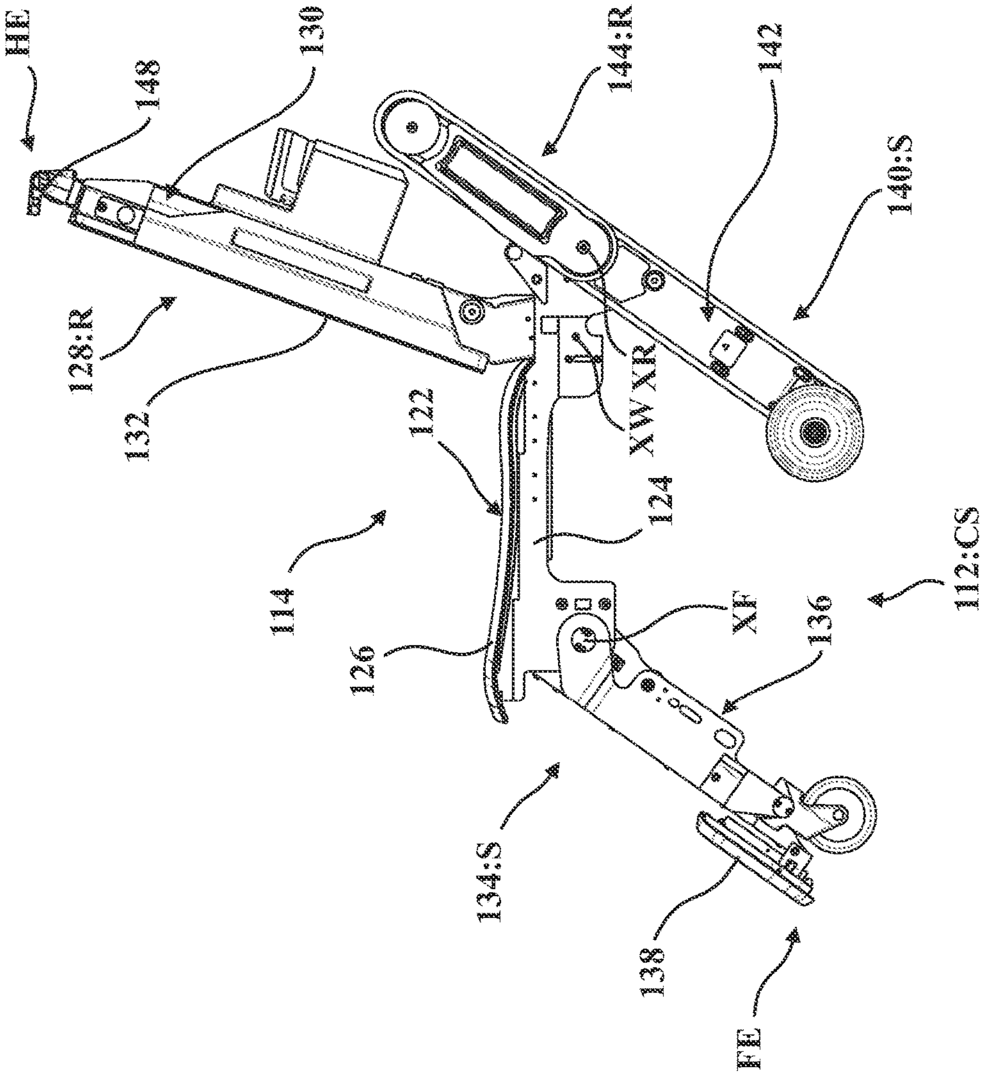
FIG. 7D is another side view of the litter of FIGS. 7A-7C shown arranged in a stair configuration.
Figure 8:
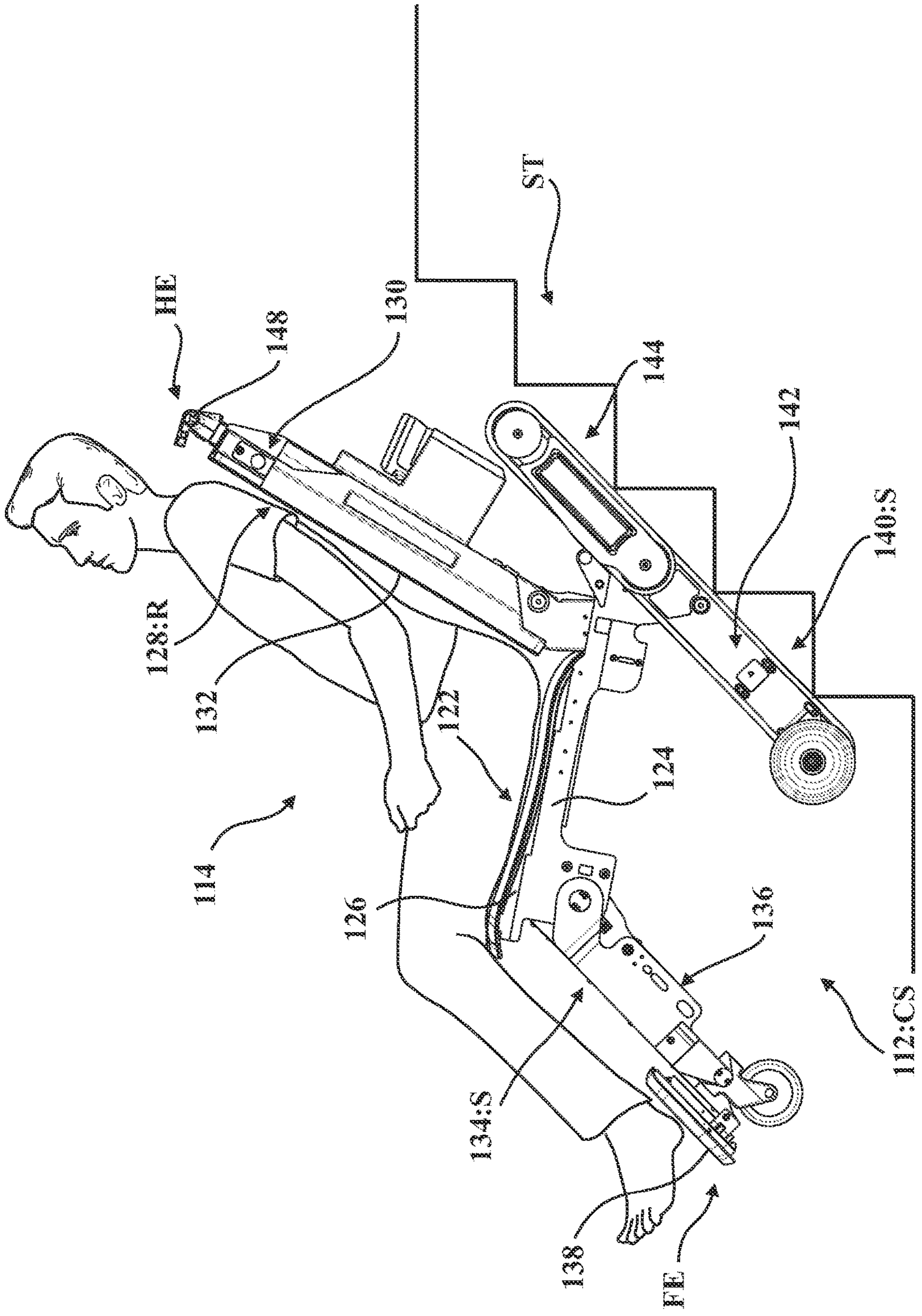
FIG. 8 is another side view of the litter of FIGS. 7A-7D shown arranged in the stair configuration supporting a patient for transport along stairs.

In the version shown in FIGS. 7C-8, when operating in and between the chair and stair configurations CC, CS, the litter 112 is configured to serve as a mobile chair to transport the patient along floor surfaces FS as well as up and down stairs ST. Mobile chairs (sometimes called "stair chairs") are used to evacuate patients from buildings where patient accessibility is limited, such as buildings having more than one floor. As noted above, the patient support surface 114 of the litter 112 of the illustrated patient transport apparatus 102 is generally defined by the fowler section 132, the seat section 126, and the front section 138. Here, the seat section 126 is supported by the seat frame 124, and the fowler section 132 is supported by the fowler frame 130 that is coupled to the seat frame 124 such that the fowler frame 130 may pivot or otherwise articulate relative to the seat frame 124. The front section 138 is supported by the front frame 136 which is coupled to the seat frame 124 such that the front frame 136 may pivot or otherwise articulate relative to the seat frame 124. Here too, the rear assembly 140 is coupled to the seat frame 124 such that the rear frame 142 may pivot or otherwise articulate relative to the seat frame 124.

In some configurations, the seat frame 124 may include seat frame members 170 spaced laterally apart from and fixed relative to each other. Similarly, the fowler frame 130 may include fowler frame members 172 spaced laterally apart and fixed relative to each other. The front frame 136 may include front legs 174 spaced laterally apart and fixed relative to each other, and the rear frame 142 may include rear legs 176 spaced laterally apart and fixed relative to each other. In the illustrated version, the litter 112 comprises a fowler actuator 178, a front actuator 180, and a rear actuator 182 which are each driven by the controller 156 (e.g., by the litter controller 156L) and are operatively attached to the seat assembly 122 to facilitate respectively pivoting or otherwise articulating the fowler assembly 128, the front assembly 134, and the rear assembly 140 relative to the seat assembly 122.

In the illustrated versions, the fowler assembly 128 is movable via the fowler actuator 178 between a fowler raised position 128R (see FIGS. 7D-7E), a fowler lowered position 128L (see FIG. 7A), and one or more intermediate fowler positions 1281 (see FIG. 7B) between the fowler raised position 128R and the fowler lowered position 128L.

As noted above, the illustrated patient transport apparatus 102 employs the track driving device 164, which is configured to assist users in traversing a flight of stairs ST by mitigating the load users (e.g., caregivers) would otherwise be required to lift via caregiver interfaces 148 (see FIG. 8; not shown in detail). In some configurations, the track driving device 164 may be configured to move the litter 112 across the floor surface FS (not shown). The track driving device 164 is formed as a part of the rear legs 176 of the rear assembly 140. Here, each rear leg 176 includes a respective track frame member 184 coupled to the seat frame 124 for pivoting movement about the rear axis XR. The track driving device 164 also includes track actuators 186 which drive continuous leg tracks 188 rotatably coupled to the respective leg track frame members 184. The track actuators 186 are coupled to the track frame members 184 and are coupled to (or otherwise disposed in communication with)

the controller 156 to drive the leg tracks 188 for ascending and descending stairs ST (see FIG. 8). The track driving device 164 may be configured to operate in the same manner or a similar manner as those shown in U.S. Pat. Nos. 7,398,571, 9,486,373, 9,510,981, and/or U.S. Patent Application Publication No. 2018/0028383, previously referenced.

The rear assembly 140 also includes rear wheels 190 rotatably coupled to each of the track frame members 184 that are configured to be disposed in contact with the floor surface FS, such as to support the litter 112 for movement in the chair configuration CC. In the illustrated versions, the rear wheels 190 are freely rotatable. In alternative versions, the rear wheels 190 may be powered drive wheels coupled to the controller 156. Other configurations are contemplated. The components of the track driving device 164 are arranged such that the leg track frame members 184, the leg tracks 188, and the rear wheels 190 move together with the rear assembly 140 which, as noted above, is arranged to selectively pivot about the rear axis XR to facilitate changing between the various configurations of the litter 112 as well as to facilitate docking and undocking from the base 110. As will be described in greater detail below, the rear assembly 140 is movable via the rear actuator 182 between a rear assembly loft position 140L (see FIG. 7A), a rear assembly chair position 140C (see FIG. 7C), a rear assembly stair position 140S (see FIGS. 7D-8), a rear assembly dock position 140D (see FIG. 3D), and one or more intermediate rear assembly positions 140I (see FIG. 7B) between the rear assembly loft position 140L and the rear assembly dock position 140D.

In some versions, the ski assemblies 144 serve as extensions to the track driving device 164 and likewise help facilitate engagement with stairs ST. To this end, in the illustrated versions, the ski assemblies 144 each include respective ski track frame members 192 operatively attached to the seat frame 124 for pivoting movement about the rear axis XR (or another axis). Here too, the track actuators 186 drive continuous ski tracks 194 rotatably coupled to the respective ski track frame members 192. In some versions, the ski assemblies 144 are arranged for pivoting movement between a plurality of ski positions, including a raised ski position 144R (see FIGS. 7C-7D), a lowered ski position 144L (see FIG. 7A), and one or more intermediate ski positions 144I between the raised ski position 144R and the lowered ski position 144L (see FIG. 7B). In some versions, abutment with the fowler assembly 128 moves the ski assemblies 144. However, other configurations are contemplated.

The front legs 174 of the front assembly 134 support respective front wheels 196, which are realized as part of respective front caster assemblies 198 arranged to facilitate movement of the litter 112 in the chair configuration CC (see FIGS. 5-6 and 7C), as well as to facilitate transitioning between the chair configuration CC and the stair configuration CS (compare FIGS. 7C-7D). In the illustrated versions, the front wheels 196 are freely rotatable, but could be motorized, braked, and the like in some versions. As noted above, in some versions, the front section 138 may be translatable along the front frame 136, such as when the litter 112 moves between the loft configuration CL and the chair configuration CC (compare FIGS. 7A-7D), and/or when the litter 112 operates in the docked mode MD (see FIG. 4A). To this end, the front assembly 134 may include an extension mechanism, generally indicated at 200, configured to longitudinally position the front section 138 relative to the front legs 174. While not depicted in detail herein, the extension mechanism 200 may be similar to as is described in U.S. patent application Ser. No. 16/705,878, the disclosure of which is incorporated by reference in its entirety. As will be described in greater detail below, the front assembly 134 is movable via the front actuator 180 between a front assembly loft position 134L (see FIG. 7A), a front assembly chair position 134C (see FIG. 7C), a front assembly stair position 134S (see FIGS. 7D-8), and one or more intermediate front assembly positions 134I (see FIG. 7B) between the front assembly loft position 134L and the front assembly dock position 134D.

The litter lift device 162 is coupled to the litter 112 and is configured to raise and lower the patient between minimum and maximum heights of the litter 112, and to generally facilitate movement between the loft configuration CL, the chair configuration CC, and the stair configuration CS when the litter 112 is separated from the base 110 (see FIGS. 7A-7D). To this end, the illustrated litter lift device 162 generally includes the front actuator 180 and the rear actuator 182. The base lift device 120 is coupled to the base 110 and is configured to raise and lower the patient between a plurality of vertical configurations including a maximum raised configuration 110R (see FIG. 1B), a maximum lowered configuration 110L (see FIG. 1A), and a plurality of vertical configurations therebetween, both while the litter 112 is supported by the base 110 and, in some versions, while the litter 112 is undocked from the base 110.

In the representative version illustrated in FIGS. 1A-1B, the base 110 comprises one or more lift arms 202 coupling the intermediate frame 118 to the base frame 116. The base lift device 120 comprises one or more base lift actuators 204 coupled to at least one of the base frame 116 and the intermediate frame 118 to raise and lower the intermediate frame 118 and litter 112 relative to the floor surface FS and the base frame 116. The base lift device 120 may be configured to operate in the same manner or a similar manner as the lift mechanisms shown in U.S. Pat. Nos. 7,398,571, 9,486,373, 9,510,981, and/or U.S. Patent Application Publication No. 2018/0028383, previously referenced.

The base 110 of the patient transport apparatus 102 also generally includes a docking subassembly 206 operatively coupled to the intermediate frame 118. Here, the docking subassembly 206 includes intermediate rails 208 which support a trolley 210 for translation between a trolley forward position 210F where the trolley 210 is arranged at the head end HE of the base 110, and a trolley docking position 210D where the trolley 210 is arranged at the foot end FE of the base 110. The trolley 210 includes or otherwise defines upper and lower pin stops 212, 214 which are arranged to engage against respective upper and lower pins 216, 218 of the litter 112 in order to support the litter 112 in a cantilevered position CP during the process of docking the litter 112 to the base 110, as well as to support the litter 112 to the base 110 when operating in the docked mode MD. The docking subassembly 206 also generally includes a forward trolley lock mechanism 220 to inhibit movement of the trolley 210 away from the trolley forward position 210F, and a dock trolley lock mechanism 222 to inhibit movement of the trolley 210 away from the trolley docking position 210D, in order to facilitate transitioning between the undocked mode MU and the docked mode MD as described in greater detail below.

Figure 3A:
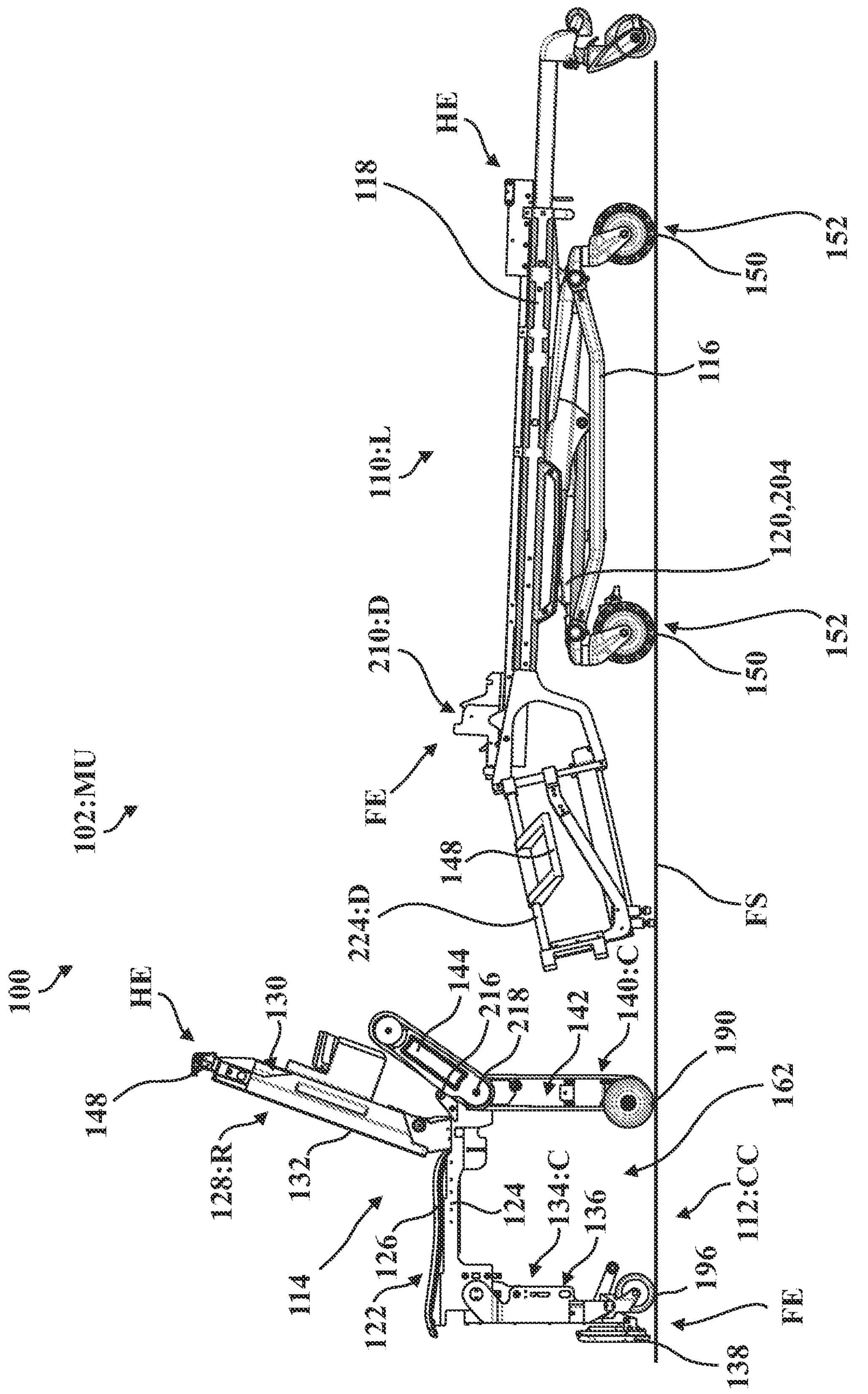
FIG. 3A is a side view of the patient transport apparatus of FIGS. 1A-2, shown with the base arranged in a maximum lowered configuration and having a trolley disposed in a trolley docking position adjacent to the stabilizers shown in the deployed configuration, and with the litter arranged in the stair configuration adjacent to the stabilizers of the base.
Figure 3B:
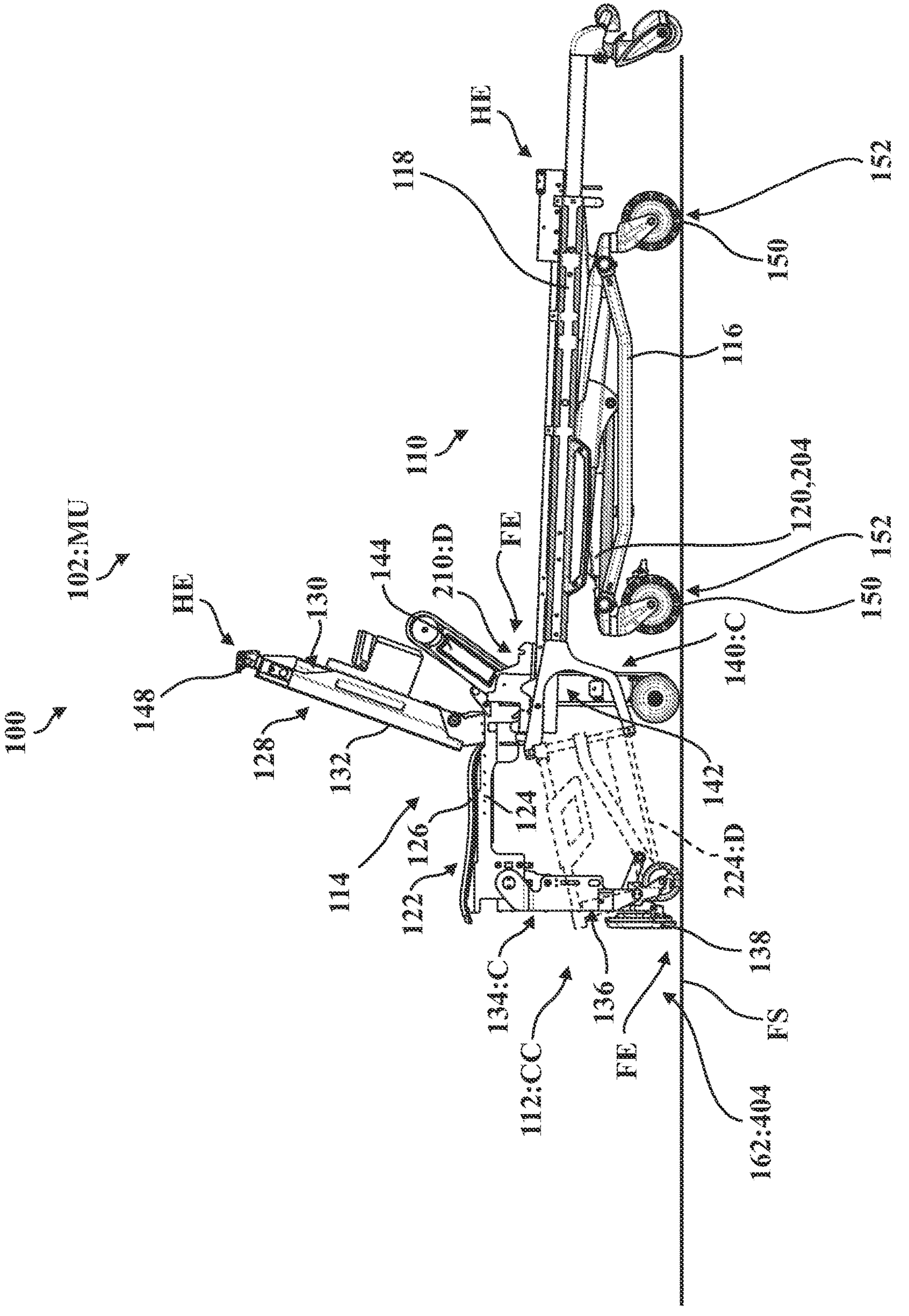
FIG. 3B is another side view of the patient transport apparatus of FIGS. 1A-3A, shown with the litter positioned for engagement with the trolley of the base adjacent to the stabilizers.
Figure 3C:
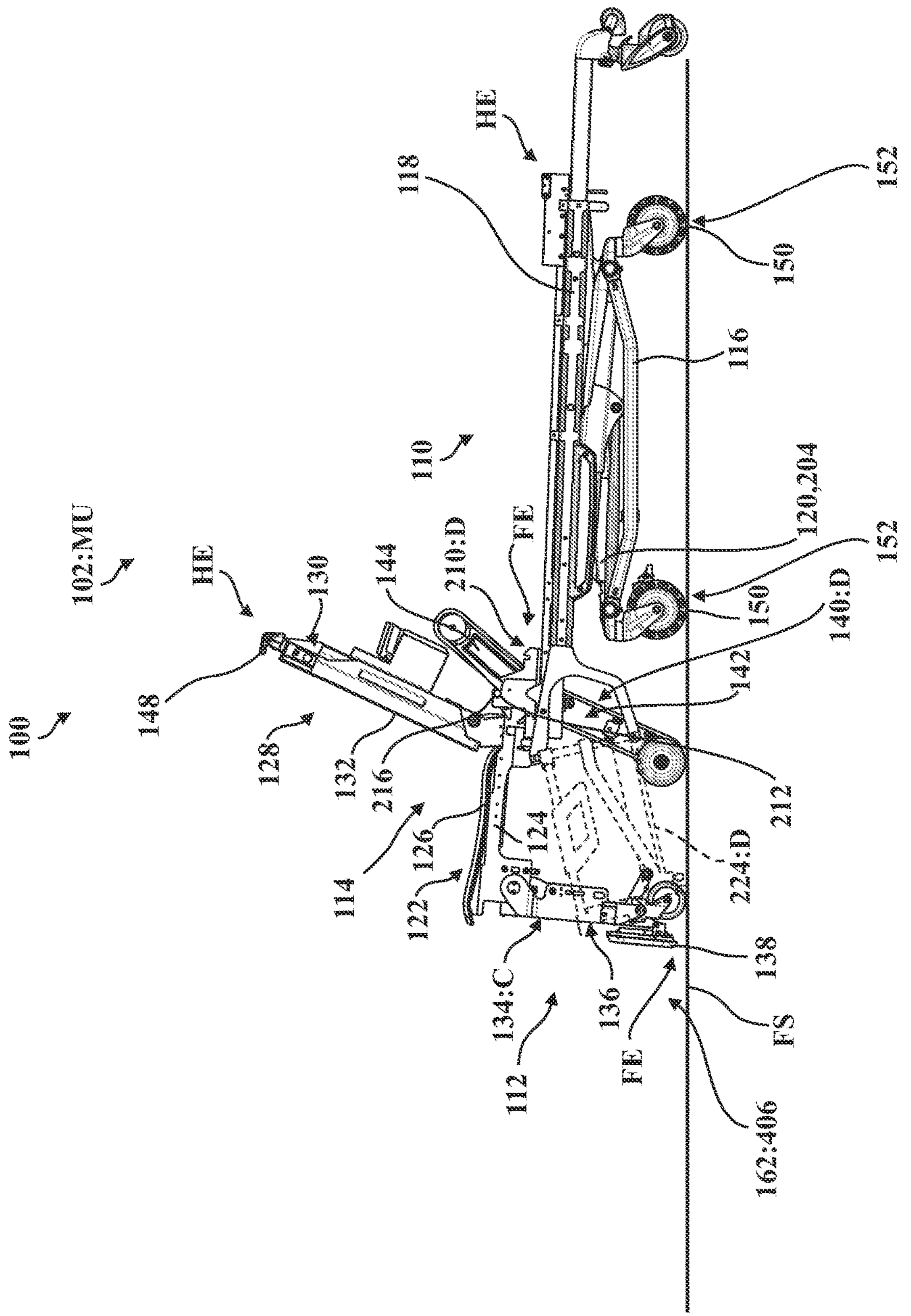
FIG. 3C is another side view of the patient transport apparatus of FIGS. 1A-3B, shown with a rear assembly of the litter pivoting the litter relative to the trolley to transfer weight between the litter and the base.
Figure 3D:
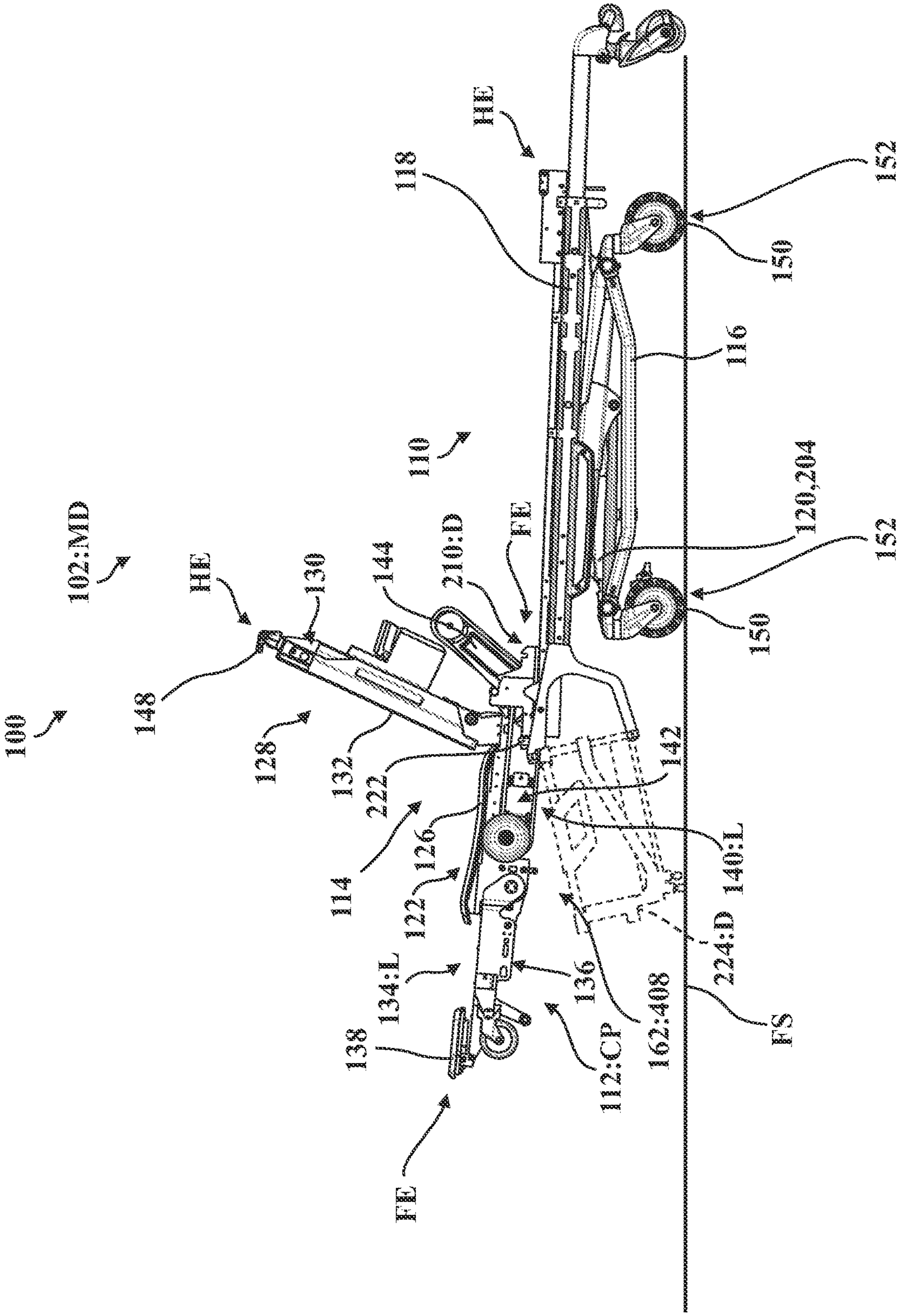
FIG. 3D is another side view of the patient transport apparatus of FIGS. 1A-3C, shown with the litter operating in a cantilevered position where a front assembly and the rear assembly of the litter are pivoted off of the floor surface to transfer weight from the litter onto the base, the base shown braced via the stabilizers.
Figure 3E:
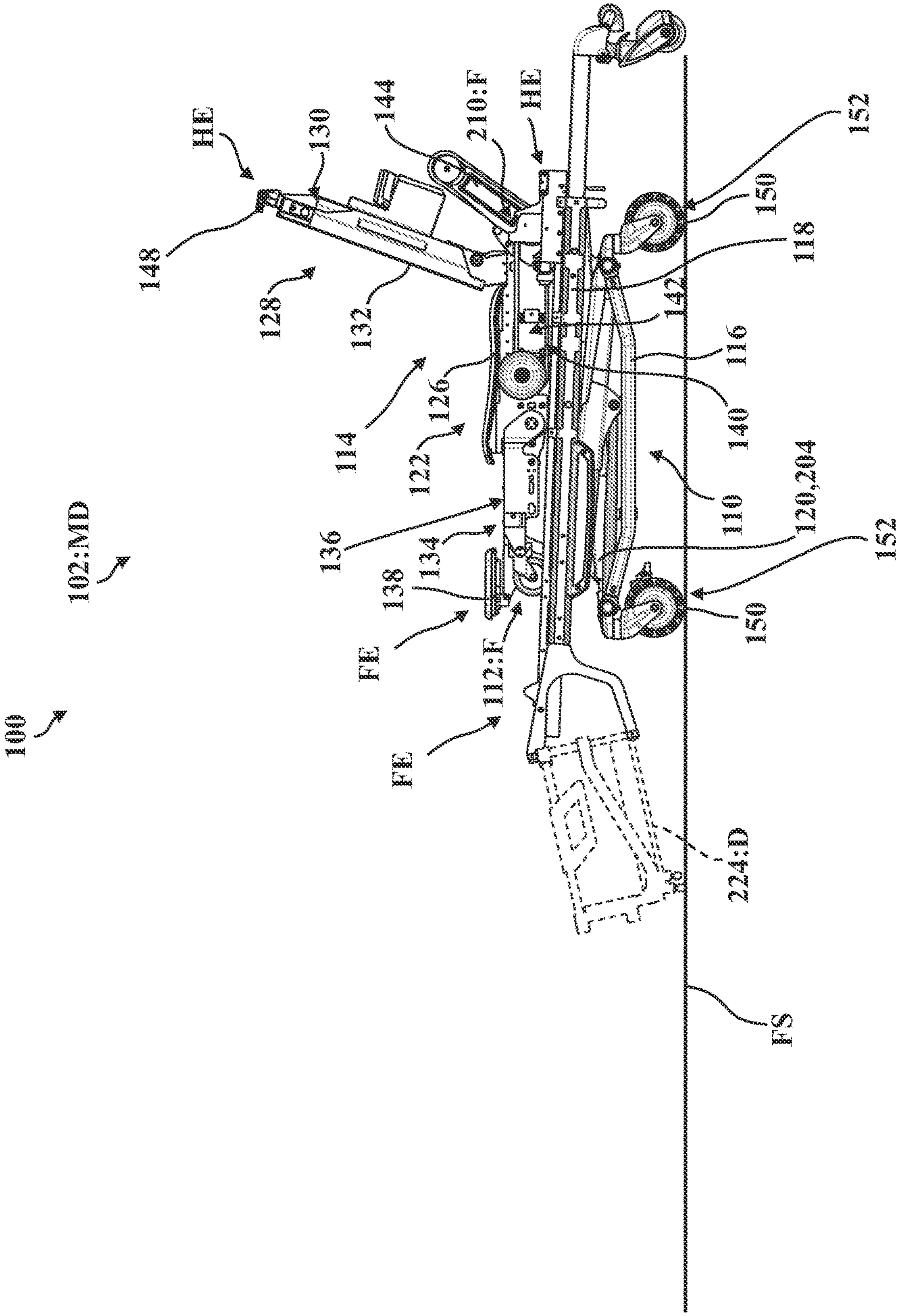
FIG. 3E is another side view of the patient transport apparatus of FIGS. 1A-3D, shown with the litter having moved with the trolley to a trolley forward position to place the patient transport apparatus in the docked mode MD.
Figure 3F:
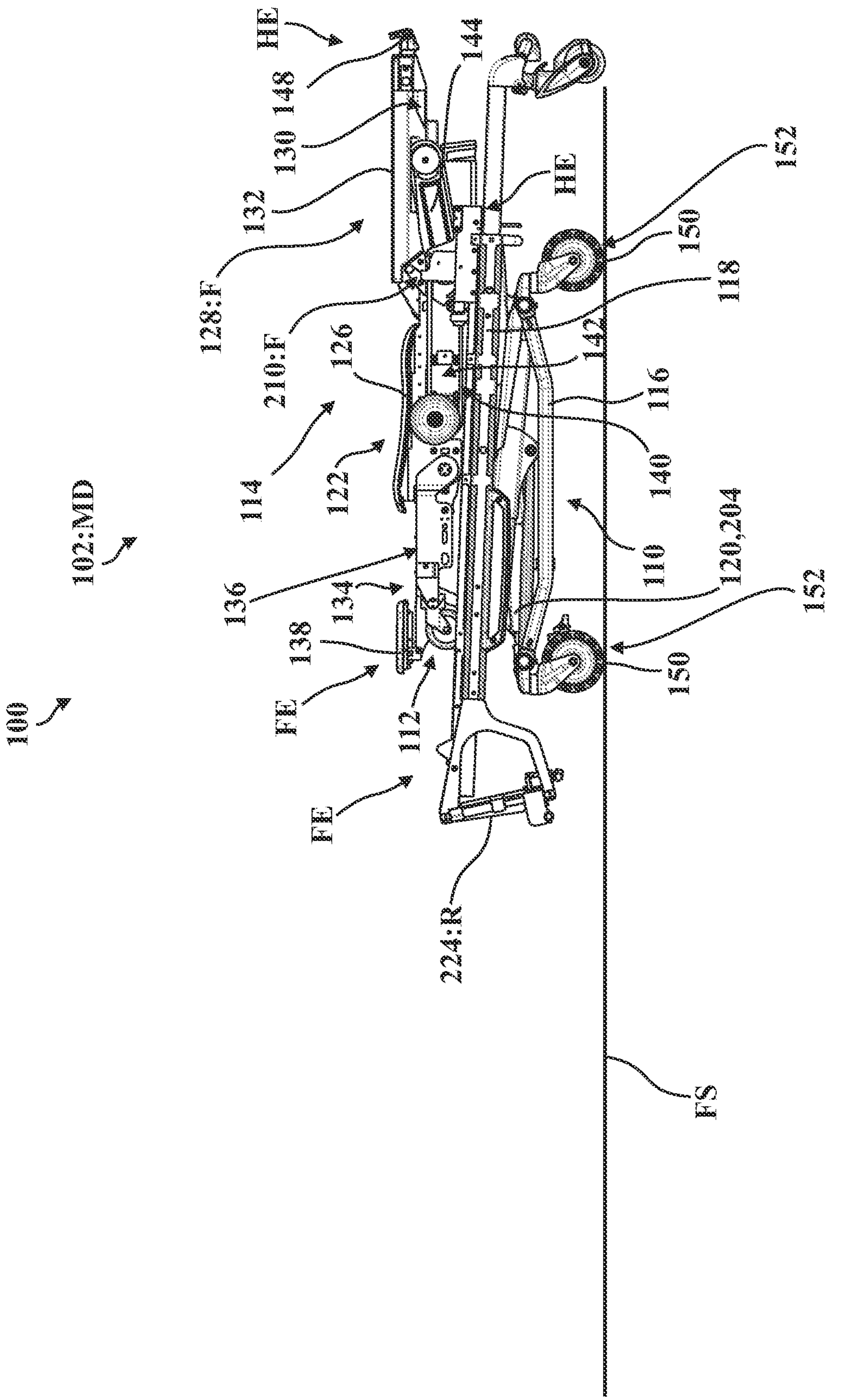
FIG. 3F is another side view of the patient transport apparatus of FIGS. 1A-3E, shown operating in the docked mode, with the stabilizers moved to the retracted configuration, and with a fowler assembly of the litter shown arranged in a fowler lowered position.
Figure 3G:
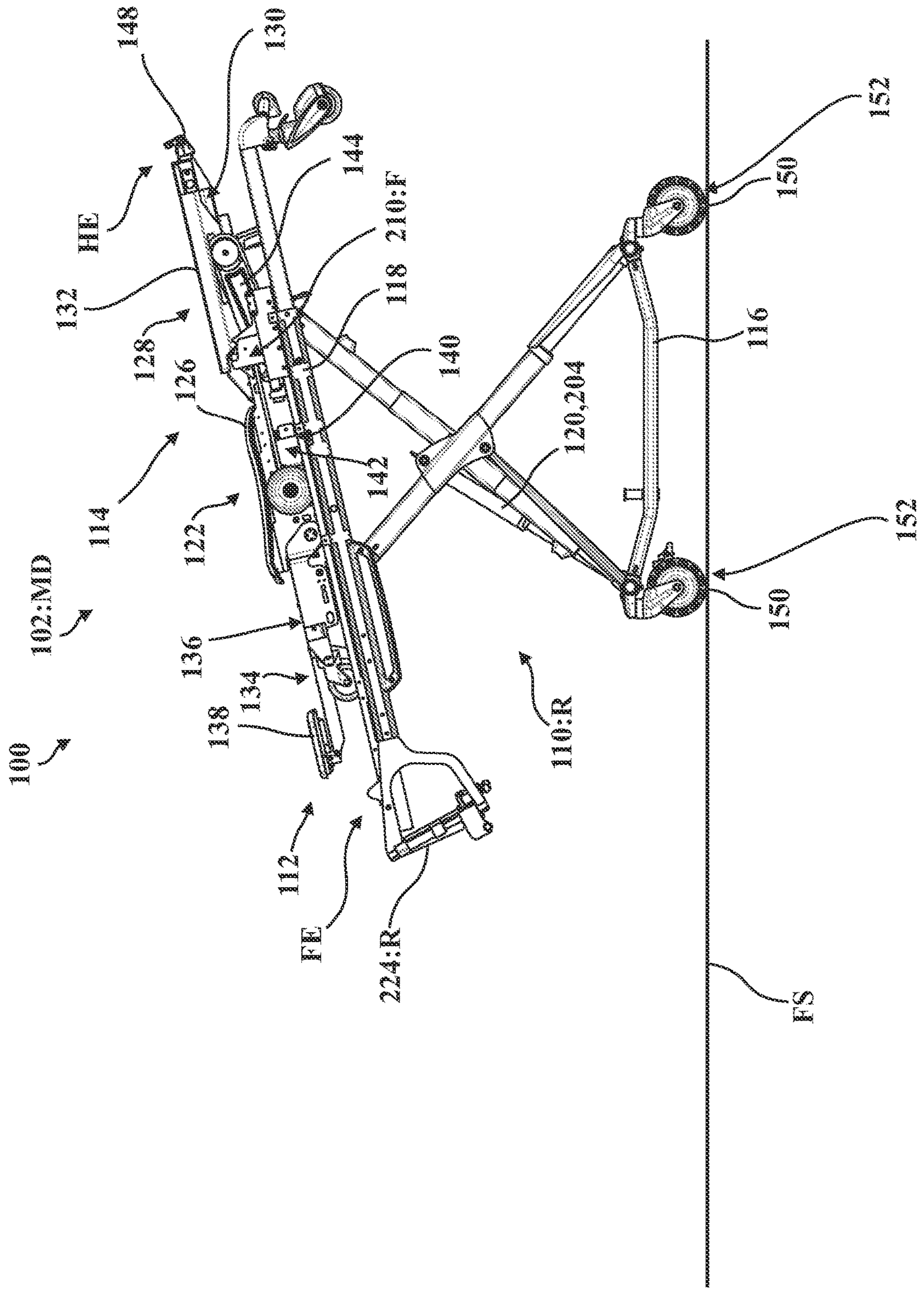
FIG. 3G is another side view of the patient transport apparatus of FIGS. 1A-3F, shown operating in the docked mode, with the base arranged in a raised configuration.

In the illustrated version, the base 110 also includes a stabilizer 224 operatively attached to the foot end FE of the intermediate frame 118 and configured for movement between a retracted configuration 224R (see FIGS. 3F-3G)

where the stabilizer 224 is disposed in spaced relation from the floor surface FS, and a deployed configuration 224D (see FIGS. 3A-3E) where the stabilizer 224 engages the floor surface to brace the base 110 at an additional point of contact with the floor surface FS to stabilize the base 110 when the litter 112 is in the cantilevered position CP (see FIG. 3D) during the process of docking the litter 112 to the base 110.

Figure 4B:
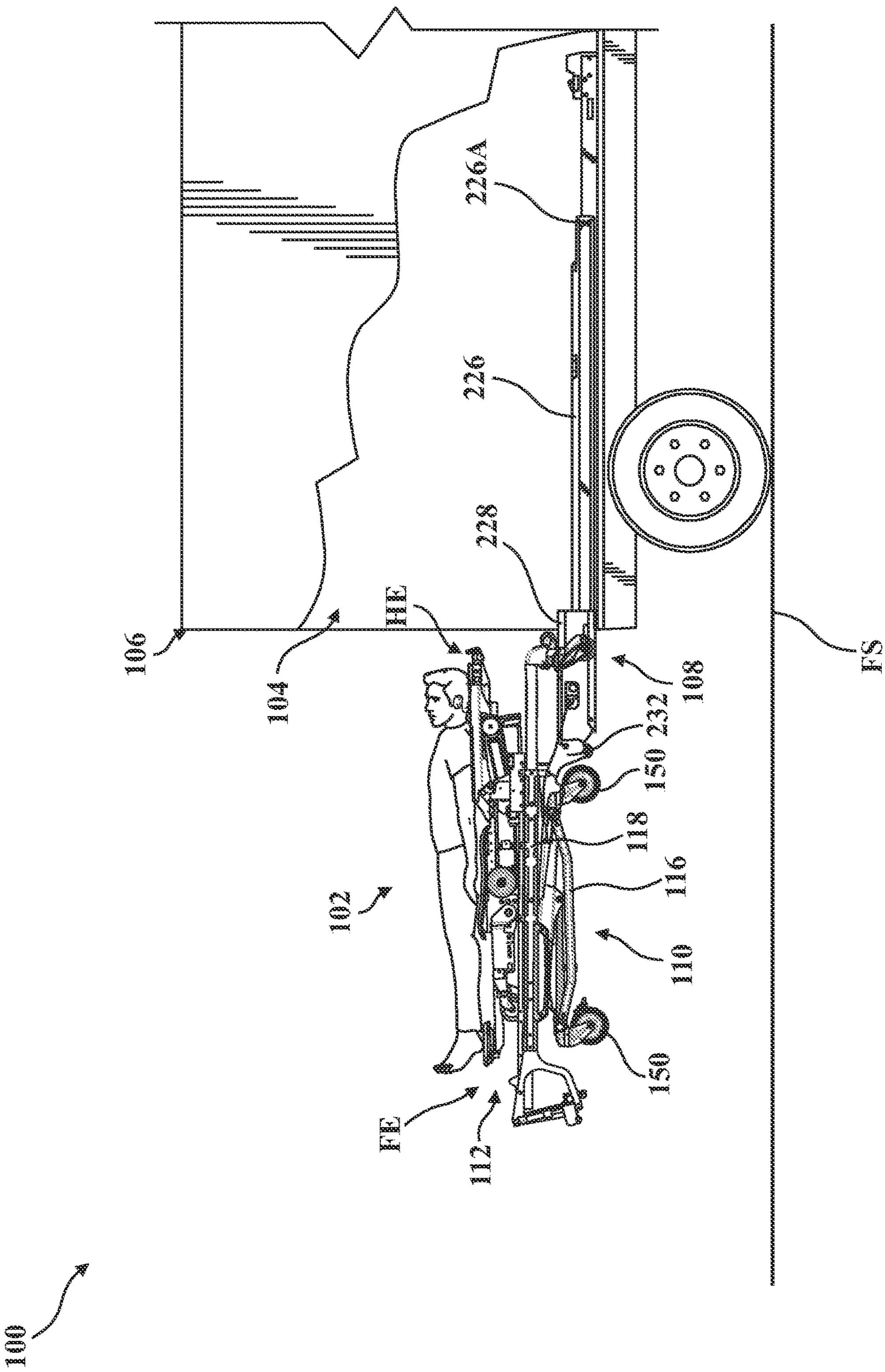
FIG. 4B is another side view of the patient transport apparatus and the ambulance of FIG. 4A, shown with the base arranged in a lowered position secured to the power load device adjacent to the cargo area of the ambulance.
Figure 4C:
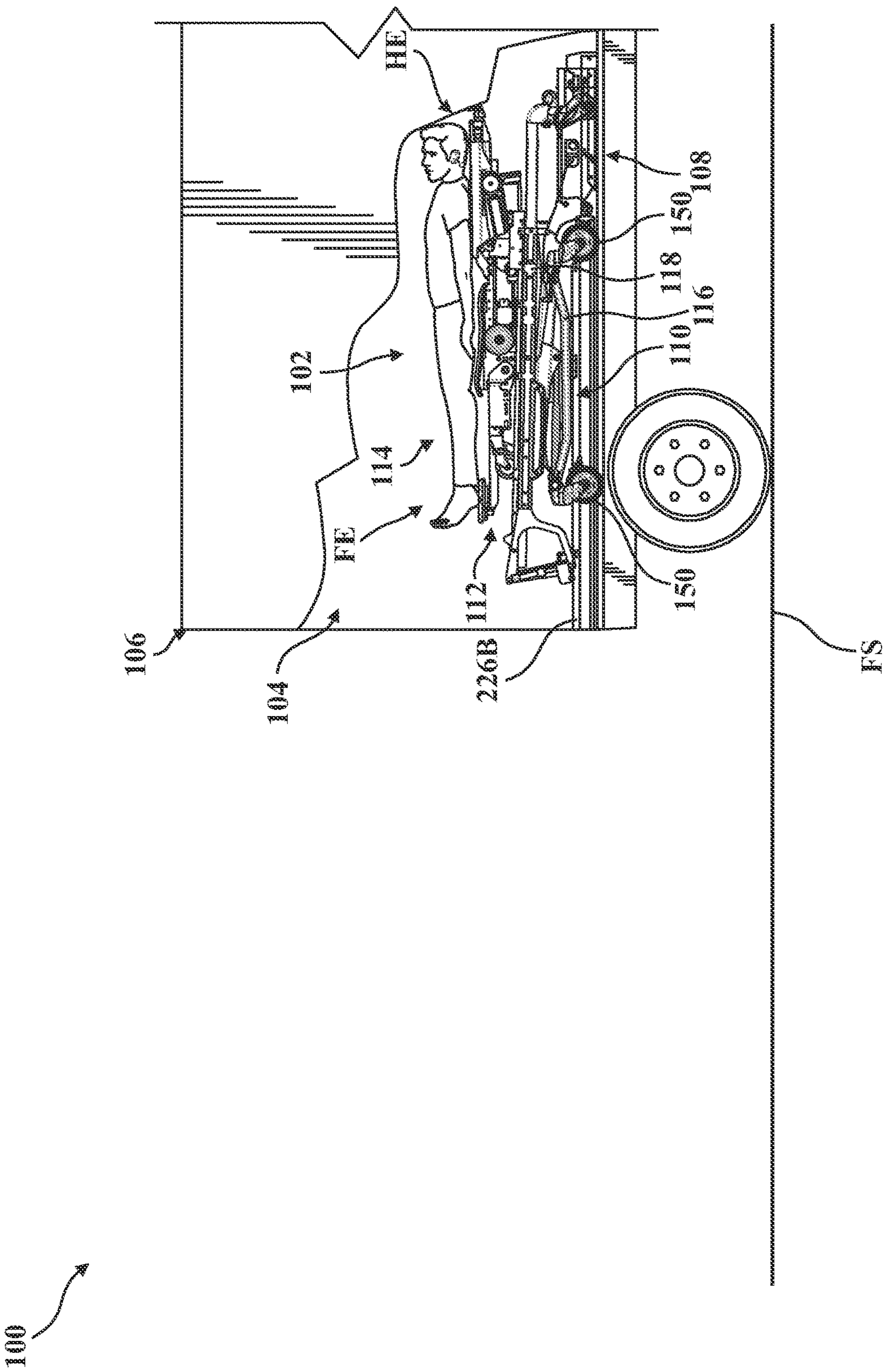
FIG. 4C is another side view of the patient transport apparatus and the ambulance of FIGS. 4A-4B, shown with the power load device retracted together with the patient transport apparatus into the cargo area of the ambulance.

As is shown in FIGS. 4A-4C and depicted schematically in FIG. 2, the power load device 108 is coupled to the ambulance 106 and is configured to load and unload the patient transport apparatus 102 into and out of the ambulance 106 when the power load device 108 is coupled to at least one of the litter 112 and the base 110. In this exemplary version, the power load device 108 of the patient support system 100 is realized as a powered device PD that can be driven by the controller 156 without necessarily forming a part of the patient transport apparatus 102. The power load device 108 generally comprises a rail 226 coupled to the ambulance. The rail 226 comprises a first rail end 226A at the back of the ambulance 106 where patients are loaded (e.g., the cargo area 104), and extends to a second rail end 226B toward the front of the ambulance 106.

The power load device 108 further includes a rail trolley 228 coupled to the rail 226. The rail trolley 228 is movable along a length of the rail 226. The power load device 108 also includes a trolley actuator 230 coupled to the rail 226 and the rail trolley 228 to move the rail trolley 228 along the length of the rail 226, and load arms 232 configured to pivot or otherwise articulate relative to the rail trolley 228 in order to support the patient transport apparatus 102 when at least one of the litter 112 and the base 110 are coupled to the rail trolley 228. The power load device 108 further includes an arm actuator 234 coupled to the rail trolley 228 and the load arms 232 to pivot or otherwise articulate the load arms 232 relative to the rail trolley 228. When the rail trolley 228 is coupled to at least one of the litter 112 and the base 110, the power load device 108 is coupled to or otherwise disposed in communication with the controller 156 to be controlled by the controller 156. The power load device 108 may be powered by a power source supplied by the ambulance 106 and/or by a power source on the patient transport apparatus 102. In some versions, the power load device 108 of the patient support system 100 is configured as described in U.S. Pat. No. 8,439,416, which is hereby incorporated by reference in its entirety.

As noted above, the control system 154 is provided to control operation of the one or more powered devices PD which form a part of or otherwise cooperate with the patient transport apparatus 102. To this end, the controller 156 may employ one or more microprocessors for processing instructions or an algorithm stored in memory to control operation of the one or more powered devices PD. Additionally, or alternatively, the controller 156 may comprise one or more microcontrollers, field programmable gate arrays, systems on a chip, discrete circuitry, and/or other suitable hardware, software, and/or firmware that is capable of carrying out the functions described herein. The controller 156 may be carried on-board the patient transport apparatus 102, or may be remotely located. The controller 156 may comprise one or more subcontrollers configured to control the one or more powered devices PD, and/or one or more subcontrollers for each of the one or more powered devices PD. In some cases, one subcontroller may be attached to the litter 112 and another subcontroller may be attached to the base 110. Power to the one or more powered devices PD and/or the controller 156 may be provided by the energy storage device 168. In alternative configurations, the one or more powered devices PD and/or the controller 156 may be provided by an external power source.

The controller 156 is coupled to the one or more powered devices PD in a manner that allows the controller to control the powered devices PD (e.g., via electrical communication). The controller 156 may communicate with the one or more powered devices PD via wired or wireless connections. In some versions, the controller 156 may generate and transmit control signals to the one or more powered devices PD, or components thereof, to drive or otherwise facilitate operating their associated actuators or to cause the one or more powered devices PD to perform one or more of their respective functions.

In addition to controlling operation of the one or more powered devices PD, in some versions, the controller 156 also determines current and desired states of the litter 112 and/or the base 110 based on input signals that the controller 156 receives from user interfaces 158 and/or based on state signals that the controller 156 receives from the sensing system 160. The state of the litter 112 and/or the base 110 may be a position, a relative position with respect to another object or component, an orientation, a configuration, an angle, a speed, a load condition, an energization status, or any other state of the litter 112 and/or the base 110.

The sensing system 160 comprises a state detection device 236 that is coupled to the litter 112 and the controller 156 and monitors the state of the litter 112 directly, or indirectly. The state detection device 236 comprises one or more sensors S configured to monitor the litter 112, the base 110, and/or the one or more powered devices PD. To this end, the state detection device generates a state signal corresponding to the state of the litter 112 and sends the state signal to the controller, such as when the litter 112 is mounted to the base 110.

The state detection device and/or other aspects of the sensing system 160 may be used by the controller for various purposes. The sensing system 160 may comprise one or more sensors S, including force sensors (e.g., load cells), timers, switches, optical sensors, electromagnetic sensors, motion sensors, accelerometers, potentiometers, infrared sensors, ultrasonic sensors, mechanical limit switches, membrane switches, encoders, and/or cameras. The sensing system 160 may further comprise one or more sensors S to detect mechanical, electrical, and/or electromagnetic coupling between components of the patient transport apparatus 102. Other types of sensors S are also contemplated. Some of the sensors S may monitor thresholds movement relative to discrete reference points. The sensors S can be located anywhere on the patient transport apparatus 102, or remote from the patient transport apparatus 102. For example, the sensors S may be located on or in the patient support surface 114, the base frame 116, the intermediate frame 118, or other suitable locations.

In some configurations, the sensing system 160 may act as an input device used to provide input signals to the controller 156 to cause or continue operation of the one or more powered devices PD. Numerous scenarios exist in which the one or more powered devices PD can be operated based on input signals provided by the sensing system 160 and/or the user interface 158.

In one configuration, the sensing system 160 indicates when the function being performed has been completed by the one or more powered devices PD. By way of non-limiting example, adjustment of one or more powered devices PD may be interrupted or stopped because a minimum or maximum position of the one or more powered devices PD has been reached, such as by using a sensor S realized as a mechanical limit switch, a membrane switch, and the like.

In certain versions, the sensing system 160 may include a state input device 238 to enable a user (e.g., a caregiver) to select a state such that actuation of the state input device 238 generates the state signal. In this case, instead of the controller 156 automatically detecting the current state of the litter 112, a user can manually enter the current state (or, in some versions, a desired state) of the litter 112 (e.g., "litter-on-base," "litter-off-base," etc.). In some configurations, the state input device 238 is spaced from at least one of the user interfaces 158. In other configurations, the state input device 238 is connected to at least one of the user interfaces 158.

One or more user interfaces 158 are coupled to the controller 156 and may be actuated by the user (e.g., a caregiver) to transmit corresponding input signals to the controller 156, and the controller 156 controls operation of the one or more powered devices PD based on the input signals and the state signals. Operation of the one or more powered devices PD may continue until the user discontinues actuation of the user interface 158, (e.g., until the corresponding input signal is terminated). Other configurations are contemplated.

The user interface 158 may comprise devices capable of being actuated by the user, and may be configured to be actuated in a variety of different ways, including but not limited to, mechanical actuation (hand, foot, finger, etc.), hands-free actuation (voice, foot, etc.), and the like. The user interface 158 may comprise one or more of a load cell, a push button, a touch screen, a joystick, a twistable control handle, a dial, a knob, a gesture sensing device for monitoring motion of hands, feet, face, or other body parts of the user (such as through a camera), a microphone for receiving voice activation commands, a foot pedal, and a sensor (e.g., infrared sensor such as a light bar or light beam to sense a user's body part, ultrasonic sensor, etc.). Additionally, buttons/pedals may be physical buttons/pedals, or may be virtually-implemented buttons/pedals such as through optical projection or forming part of a graphical user interface presented on a touchscreen. Buttons/pedals may also be mechanically-implemented in some versions, or may drive-by-wire type buttons/pedals where a user-applied force actuates a sensor S such as a switch or potentiometer. User interfaces 158 may be provided in one or more locations on the base 110 and/or the litter 112. Other configurations are contemplated.

In some versions of the patient transport apparatus 102, the user interface 158 may comprises two buttons B1, B2 that may be actuated to generate the input signal used by the controller 156 to drive the one or more powered devices PD. In other versions, the user interface 158 may comprise three or more buttons. In some versions, the user interface 158 may comprise a single button. Other configurations are contemplated.

As will be appreciated from the subsequent description below, individual buttons B, B (or "input controls") of the user interface 158 may be used to control functions of or associated with more than one powered device PD. The user interfaces 158 generate input signals corresponding to each individual button B1, B2 of the user interface, when actuated. In order to operate different powered devices PD, the input signal received by the controller 156 may not change when the same button B1, B2 is actuated; rather, the state signals generated by the state detection device 236 may change according to the current state of the litter 112 and/or the base 110 such that the controller 156 determines which of the powered devices PD to actuate base **110*d* on the current state detected using the input signal from the same button B1, B2. Put differently, the same button B1, B2 can be used to control different powered devices PD depending on the state determined by the controller 156 via the sensing system 160, the state detection device 236, and/or the state input device 238. By way of non-limiting example, the user may actuate a button B1 on the user interface to operate the base lift device 120 when the litter 112 is in a first state, and the same button B1 may be actuated to operate the track driving device 164 when the litter 112** is in a second state. Other configurations are contemplated.

In one version, the sensing system 160 comprises a load detection device 240 coupled to the base 110. The load detection device 240 is configured to detect when the intermediate frame 118 is subjected to a load, such as load created by the litter 112 or load created by the litter 112 and the patient. More specifically, the load detection device 240 detects when a load has exceeded a load threshold. When the intermediate frame 118 is subject to a load below the load threshold, the base lift actuator 204 raises and lowers the intermediate frame 118 relative to the base frame 116 in response to actuation of the user interface 158 at a first rate. When the intermediate frame 118 is subjected to a load at or above the load threshold, the base lift actuator 204 raises and lowers the intermediate frame 118 relative to the base frame 116 in response to actuation of the user interface 158, at a second rate slower than the first rate. In the illustrated version, the base lift actuator 204 comprises a linear actuator. Here, the state detection device 236 comprises a sensor S to detect the litter 112 being coupled to and supported by the base 110. In this case, the current state of the litter 112 is considered to be a "litter-on-base" state. In response to detection via the sensor S, the state detection device 236 generates a corresponding state signal that is received by the controller 156; here in the "litter-on-base" state, when a user actuates the first button B1 of one of the user interfaces 158, the controller 156 is configured to operate the base lift actuator 204 to raise the litter 112 and the intermediate frame 118 relative to the floor surface and the base frame 116. Conversely, in the "litter-on-base" state, when the user actuates the second button B2 of the user interface 158, the controller 156 is configured to operate the base lift actuator 204 to lower the litter 112 and the intermediate frame 118 relative to the floor surface and the base frame 116. It will be appreciated that the forgoing represents examples of operation of the state detection device 236 and the state input device 238, and that other configurations are contemplated.

As noted above, the litter 112 is operable in the docked mode MD (see FIG. 1B) and in the undocked mode MU (see FIG. 1A). Referring now to FIG. 3A, when in the undocked mode MU, the litter 112 may be disposed adjacent to the base 110, with the litter 112 placed in the chair configuration CC. Here, the chair configuration CC is defined by the fowler assembly 128 being in the fowler raised position 128R, the front assembly 134 being in the front assembly chair position 134C, and with the rear assembly 140 being in the rear assembly chair position 140C. More specifically, here in the chair configuration CC, the fowler raised position 128R places the fowler section 132 relative to the seat section 126 to support the patient in a seated configuration (not shown in detail). Here too, in the chair configuration CC, the front section 138 is arranged to abut the patient's legs, feet, and the like, and the front frame 136 is arranged substantially parallel to the rear frame 142 in a generally vertical configuration with the front wheels 196 and the rear wheels 190 engaging the floor surface FS. Here too in FIG.

3A, the base 110 is shown in the maximum lowered configuration 110L with the stabilizer 224 disposed in the deployed configuration 224D to brace the base 110, and with the litter 112 disposed at the foot end FE of the base 110. In this arrangement, the litter 112 is disposed adjacent to the base 110 and is positioned such as to begin the process of docking.

Continuing from FIG. 3A to FIG. 3B, the litter 112 is shown having been positioned longitudinally closer to the base 110, bringing the upper and lower pins 216, 218 into proximity of the trolley 210. Here, the sensing system 160 determines the relative positioning of the litter 112, and the controller 156 can be used to begin the process of docking by first actuating the rear actuator 182 to move the rear assembly 140 from the rear assembly chair position 140C towards the rear assembly dock position 140D in order to lower the upper and lower pins 216, 218 into engagement with the upper and lower pin stops 212, 214 of the trolley 210.

It will be appreciated that the arrangement of the rear assembly 140 as shown in FIG. 3C is such that the pivoting of the rear assembly 140 about the rear axis XR has moved the rear wheel 190 closer towards the front assembly 134 and has resulted in the seat assembly 122 having "tilted" backwards, which facilitates the process of transferring weight to the base 110. Here too, it will be appreciated that the rear assembly 140 is arranged for movement from the rear assembly chair position 140C (see also FIG. 7C) towards the rear assembly dock position 140D, as well as from the rear assembly chair position 140C towards the rear assembly stair position 140S (see also FIG. 7D) when pivoting about the rear axis XR to move the rear wheel 190 closer towards the front assembly 134. However, the rear assembly 140 is also arranged for movement from the rear assembly chair position 140C (see also FIG. 7C) towards the rear assembly loft position 140L (see FIG. 7A) when pivoting about the rear axis XR to move the rear wheel 190 further away from the front assembly 134.

With continued reference to FIG. 3C, once the controller 156 has determined that the lower the upper and lower pins 216, 218 have come into engagement with the upper and lower pin stops 212, 214 of the trolley 210, the controller 156 drives the rear actuator 182 to pivot the rear assembly 140 about the rear axis XR until it reaches the a rear assembly dock position 140D and, at the same time, drives the front actuator 180 to pivot the front assembly 134 about the front axis XF from the front assembly chair position 134C to the front assembly loft position 134L as shown in FIG. 3D. Here, it will be appreciated that the rear actuator 182 and the front actuator 180 may be driven simultaneously by the controller 156.

In FIG. 3D, the litter 112 is shown disposed in the cantilevered position CP with the trolley 210 disposed in the trolley docking position 210D arranged at the foot end FE of the base 110. Here, the front assembly 134 and the rear assembly 140 are arranged generally parallel to each other and to the seat assembly 122. From this cantilevered position CP depicted in FIG. 3D, the dock trolley lock mechanism 222 can be disengaged by the user, and the trolley 210 can be moved to the trolley forward position 210F arranged at the head end HE of the base 110, as shown in FIG. 3E. Here, in FIG. 3E, the dock trolley lock mechanism 222 retains the trolley 210 in the trolley forward position 210F which places the patient transport apparatus 102 in the docked mode MD. At this point, the stabilizer can be moved to the retracted configuration 224R out of contact with the floor surface FS, and other portions of the patient transport apparatus 102 may be moved if needed, such as to move the fowler assembly 128 to the fowler lowered position 128L as shown in FIG. 3F and/or to raise the intermediate frame 118 to position the base 110 in the maximum raised configuration 110R as shown in FIG. 3G.

FIG. 4A shows the patient transport apparatus 102 in the docked mode MD and positioned adjacent to the cargo area 104 of the ambulance 106 for loading via the power load device 108. Here, the base 110 is arranged with the intermediate frame 118 raised relative to the base frame 116 near or slightly below the maximum raised configuration 110R in order to facilitate loading the patient transport apparatus 102 into the ambulance 106. Continuing to FIG. 4B from FIG. 4A, the patient transport apparatus 102 has been loaded onto the power load device 108 at the first rail end 226A of the rail 226. Here too in FIG. 4B, the base lift device 120 of the base 110 has been utilized to position the base 110 in the maximum lowered configuration 110L, which results in the base wheels 150 coming out of contact with the floor surface FS after weight from the patient transport apparatus 102 has been transferred to the power load device 108 via the load arms 232. At this point, the rail trolley 228 may be moved towards the second rail end 226B of the rail 226 as shown in FIG. 4C in order to load the patient transport apparatus 102 fully into the cargo area 104 of the ambulance 106.

Referring now to FIGS. 5-8, when operating in the undocked mode MU, the litter 112 can be placed in a number of different configurations to support the patient for movement independent of the base 110. In FIG. 7A, for example, the litter 112 is arranged in the loft configuration CL with the rear assembly 140, the front assembly 134, and the fowler assembly 128 each arranged generally parallel to the seat assembly 122 to support the patient in a flat configuration (e.g., laying down). Here in the loft configuration CL, the rear assembly 140 is in the rear assembly loft position 140L, the front assembly 134 is in the front assembly loft position 134L, the fowler assembly 128 is in the fowler lowered position 128L, and the ski assembly is in the lowered ski position 144L. From this position, the litter 112 can be moved into the chair configuration CC depicted in FIG. 7C by moving the front assembly 134 to the front assembly chair position 134C while also moving the rear assembly 140 to the rear assembly chair position 140C and the fowler assembly 128 to the fowler raised position 128R. Here, it will be appreciated that FIG. 7B depicts intermediate positions of the front assembly 134, the rear assembly 140, and the fowler assembly.

Figure 5:
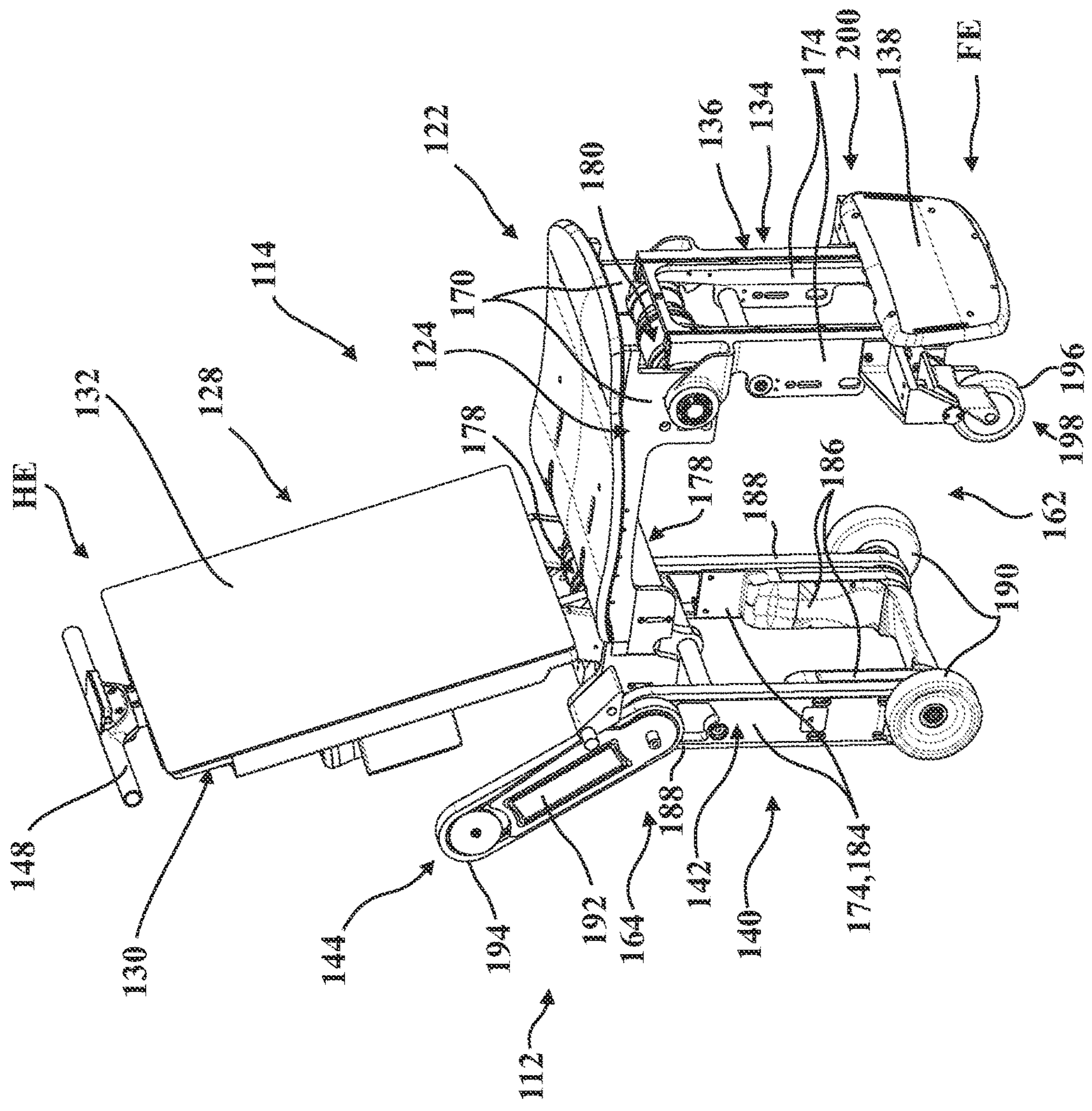
FIG. 5 is a front perspective view of the litter of the patient transport apparatus of FIGS. 1A-4C.
Figure 6:
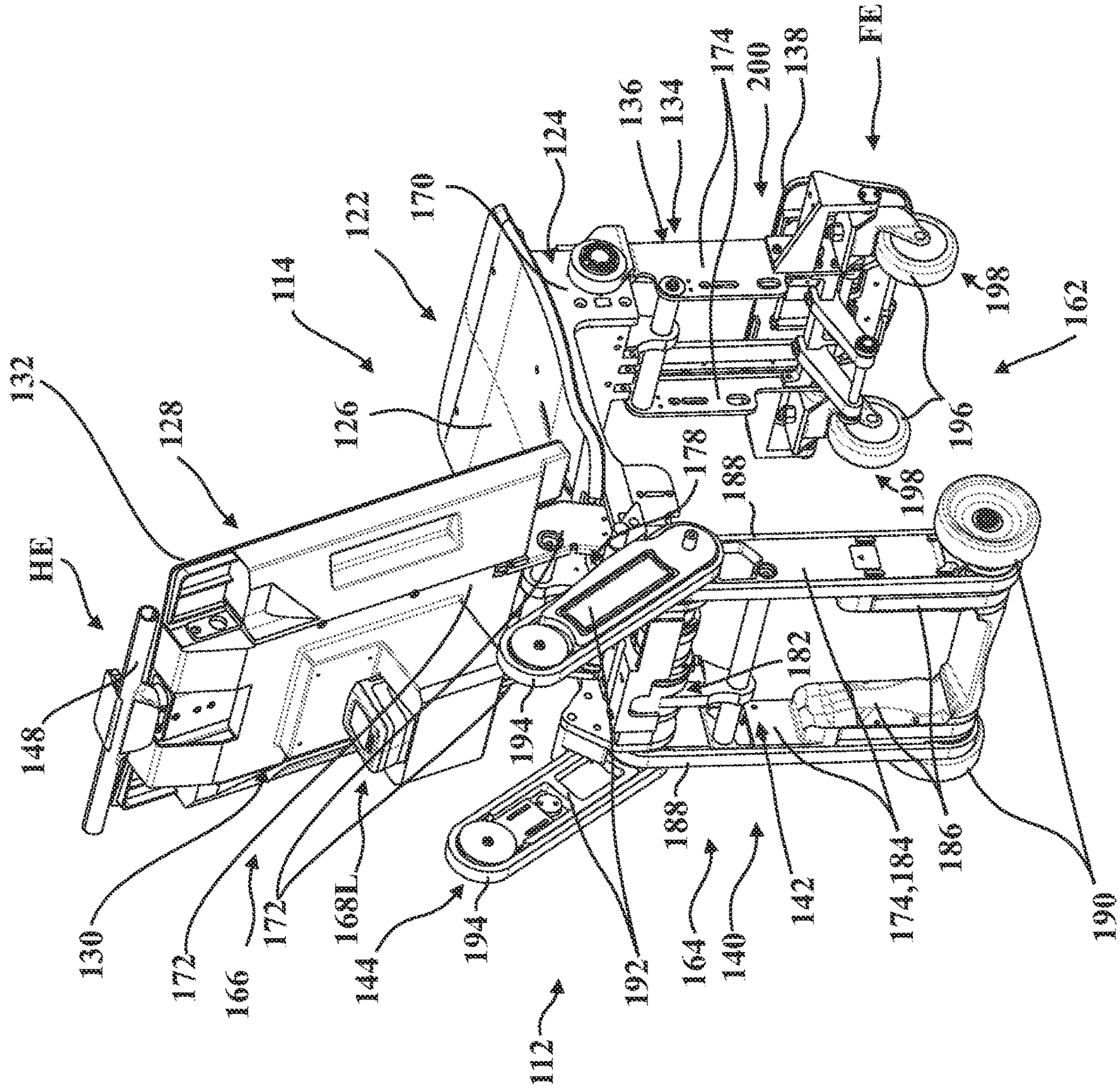
FIG. 6 is a rear perspective view of the litter of the patient transport apparatus of FIGS. 1A-5.

In the chair configuration CC depicted in FIGS. 5-6 and 7C, the rear assembly 140 and the front assembly 134 are each arranged parallel to each other and generally perpendicular to the seat assembly 122. From the chair configuration CC, the rear assembly 140 and the front assembly 134 can be moved simultaneously to bring the litter 112 into the stair configuration CS as depicted in FIG. 7D by placing the rear assembly 140 in the rear assembly stair position 140S and by placing the front assembly 134 in the front assembly stair position 134S. Here too in the stair configuration CS depicted in FIG. 7D, the front assembly 134 and the rear assembly 140 are arranged substantially parallel to each other, but are now arranged an oblique angle relative to the seat assembly 122 in order to, among other things, position the leg tracks 188 for engagement with stairs ST as shown in FIG. 8. Here in the stair configuration CS, the track driving device 164 can be used to move the litter 112 along stairs ST via engagement with the leg tracks 188 (as well as the ski tracks 194). It will be appreciated that the litter 112 can be moved between the configurations CL, CC, CS in various ways to facilitate patient care, and can be docked to and/or undocked from the base 110 as noted above.

Figure 9B:
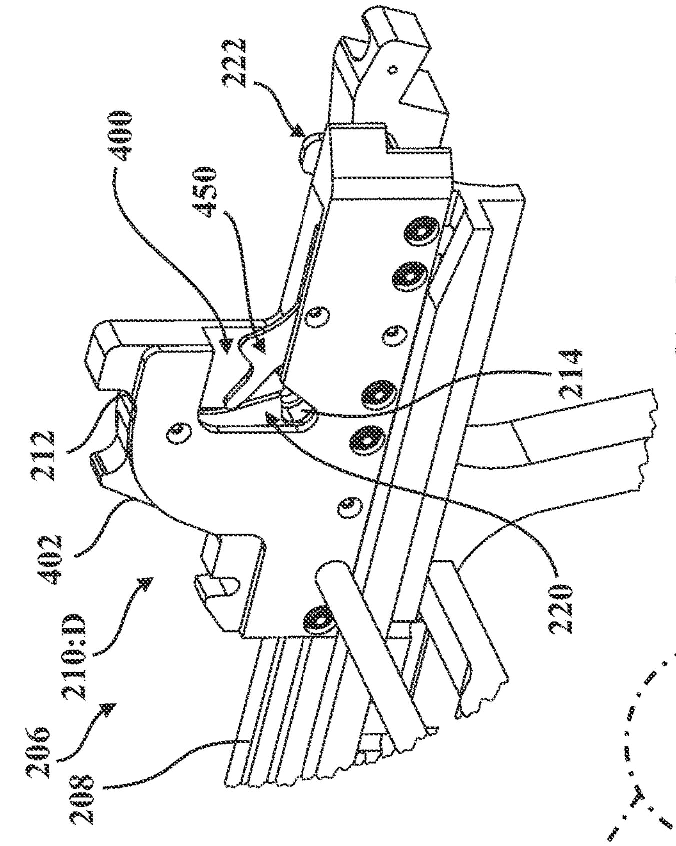
FIG. 9B is an enlarged partial perspective view taken at indicia 9B in FIG. 9A.
Figure 9A:
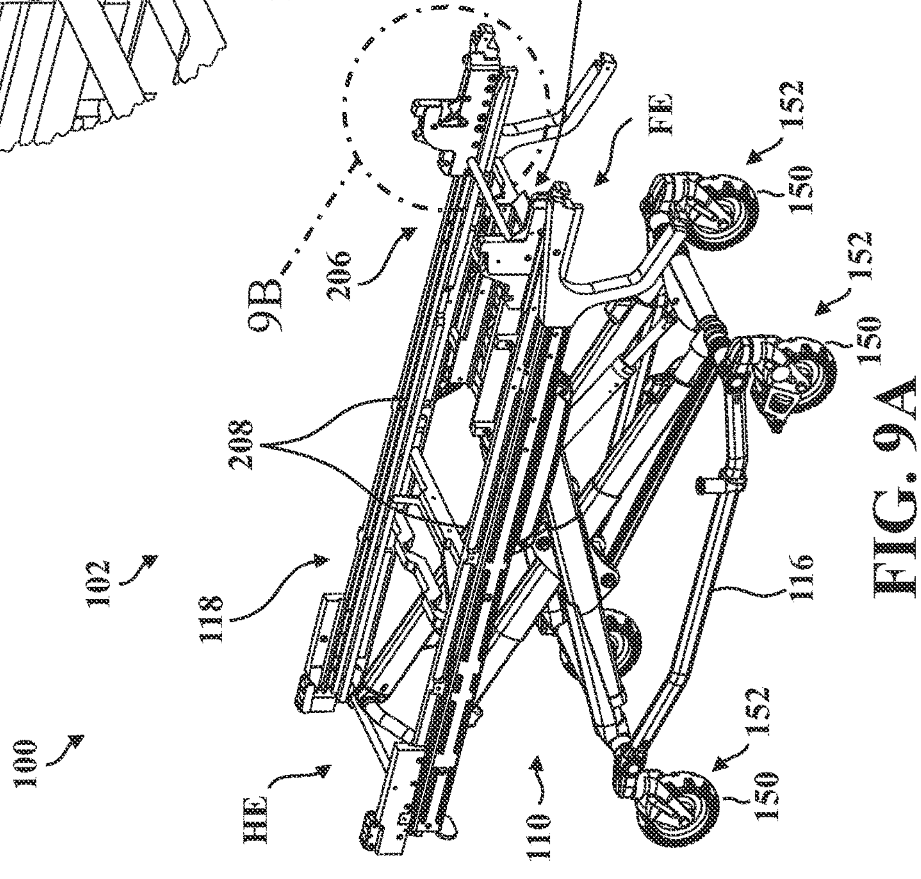
FIG. 9A is a front perspective view of the base of the patient support apparatus including a trolley in a trolley docking position.

Referring to FIGS. 9A and 9B, the trolley 210 may define the lower pin stop 214 and the upper pin stop 212 spaced above the lower pin stop 214. The lower pin stop 214 and the upper pin stop 212 may be defined by the trolley 210 at any suitable location to receive the lower pin 218 and the upper pin 216 (described in further detail below). For example, the trolley 210 may define a trolley void 400 that is spaced above the intermediate rails 208 and is shaped to receive the lower pin 218. A lower portion of the trolley void 400 may define the lower pin stop 214. A portion of an outer profile 402 of the trolley 210 that is spaced above the lower pin stop 214, for example, may define the upper pin stop 212. Additionally, FIGS. 9A and 9B also show a dock trolley lock mechanism 222 for limiting translation of the trolley relative to the intermediate frame when the trolley is in the trolley docking position 210D, a trolley safety latch 450 for ensuring that the lower pin 218 is engaged with the lower pin stop 214, and a forward trolley lock mechanism 220 for ensuring that the lower pin 218 does not lift out of the lower pin stop 214 when the litter 112 is in the litter forward position 112F. The details of the dock trolley lock mechanism 222, the trolley safety latch 450, and the forward trolley lock mechanism 220 will be described in further detail below.

Figure 10A:
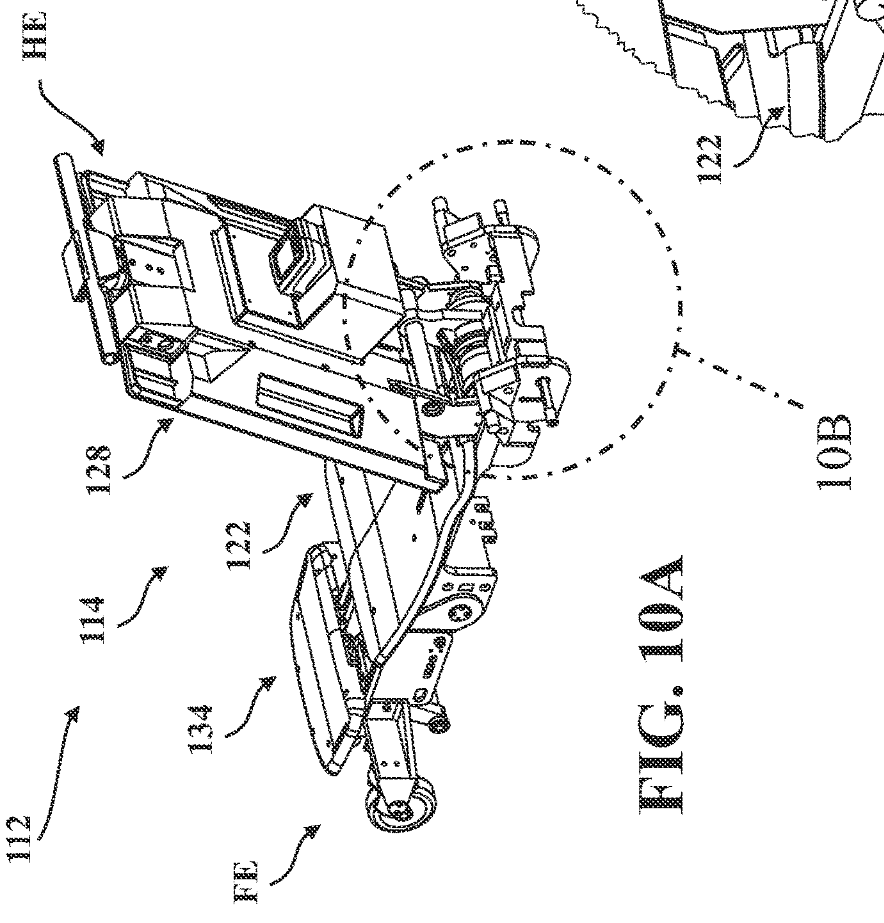
FIG. 10A is a rear perspective view of the litter of the patient support apparatus.
Figure 10B:
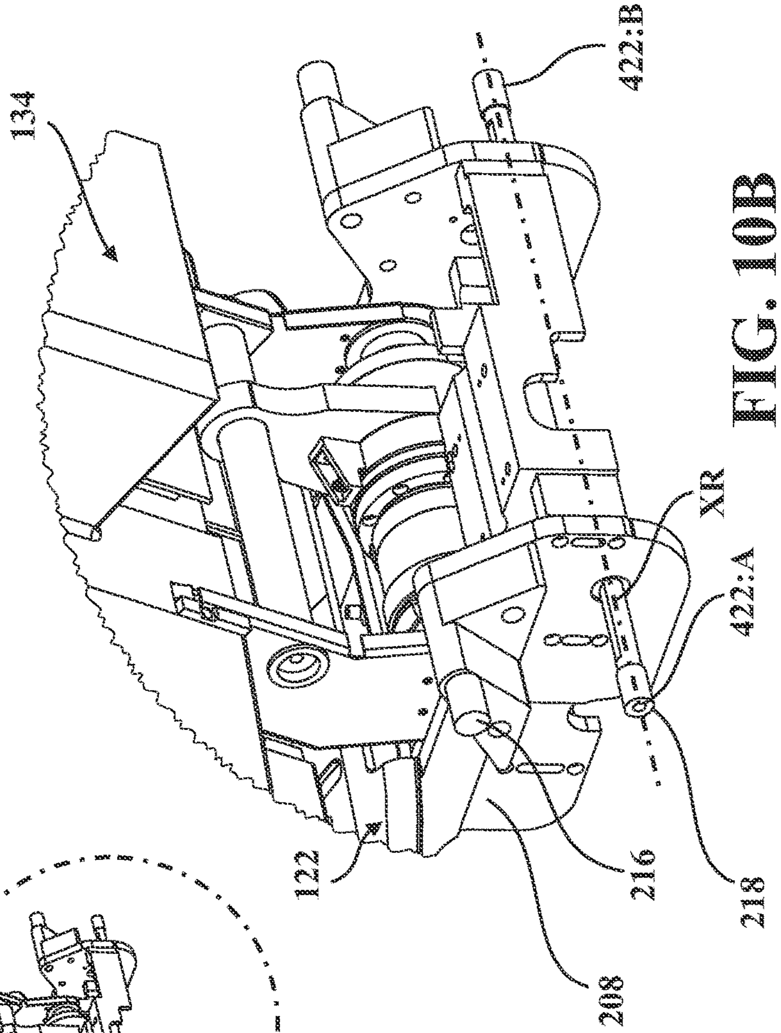
FIG. 10B is an enlarged partial perspective view taken at indicia 10B in FIG. 10A.
Figure 11:
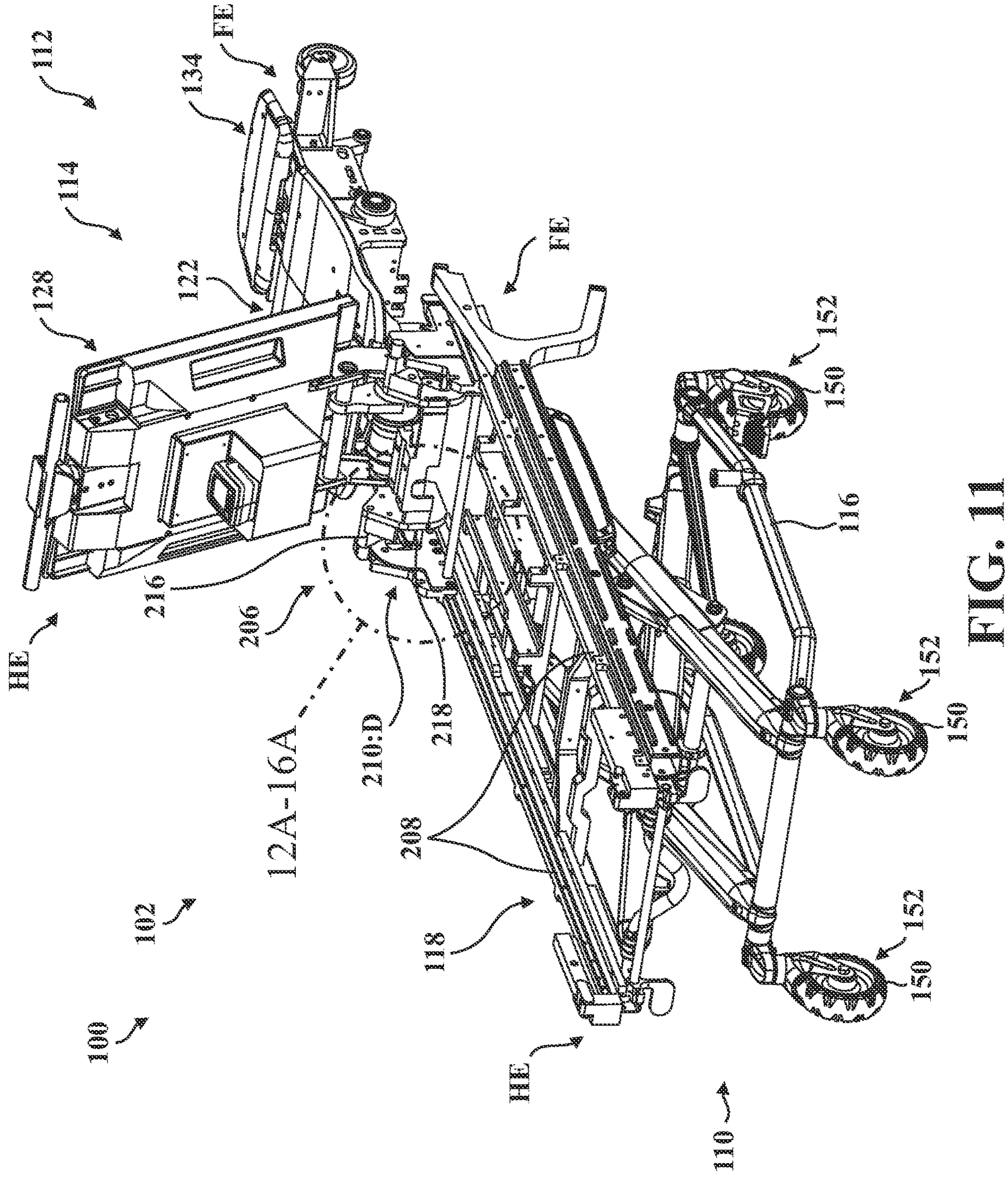
FIG. 11 is a rear perspective view of the patient support apparatus including the litter docked to the base.
Figure 12B:
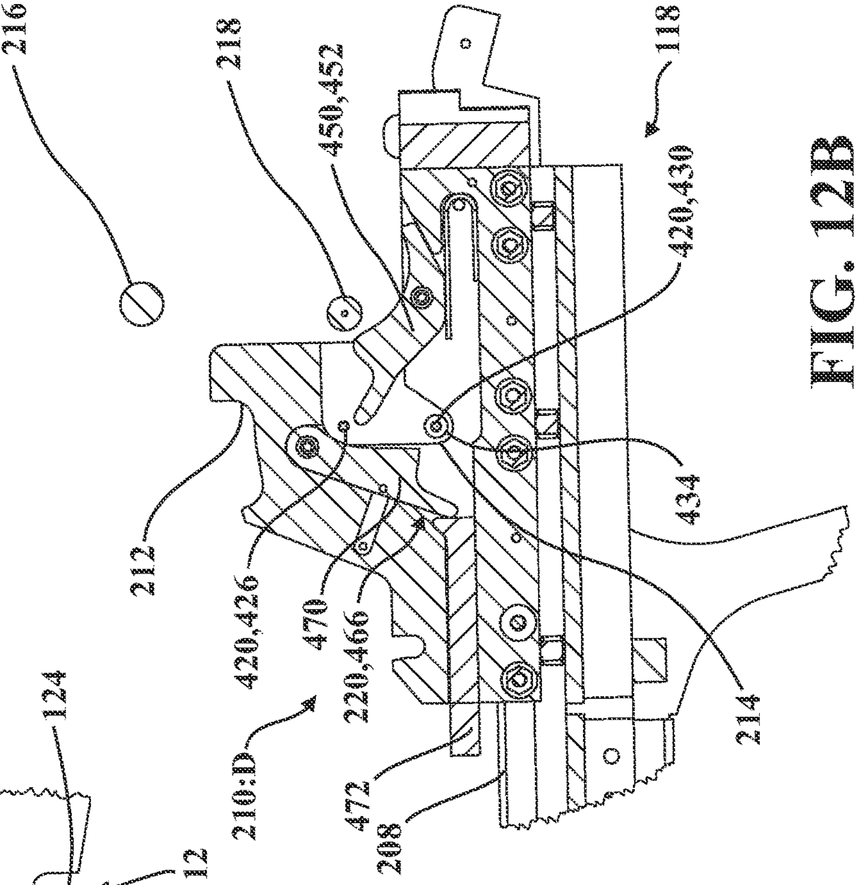
FIG. 12B is a partial section view of the patient support apparatus in the configuration of FIG. 12A showing the position of an upper pin and a lower pin of the litter relative to the trolley.
Figure 12A:
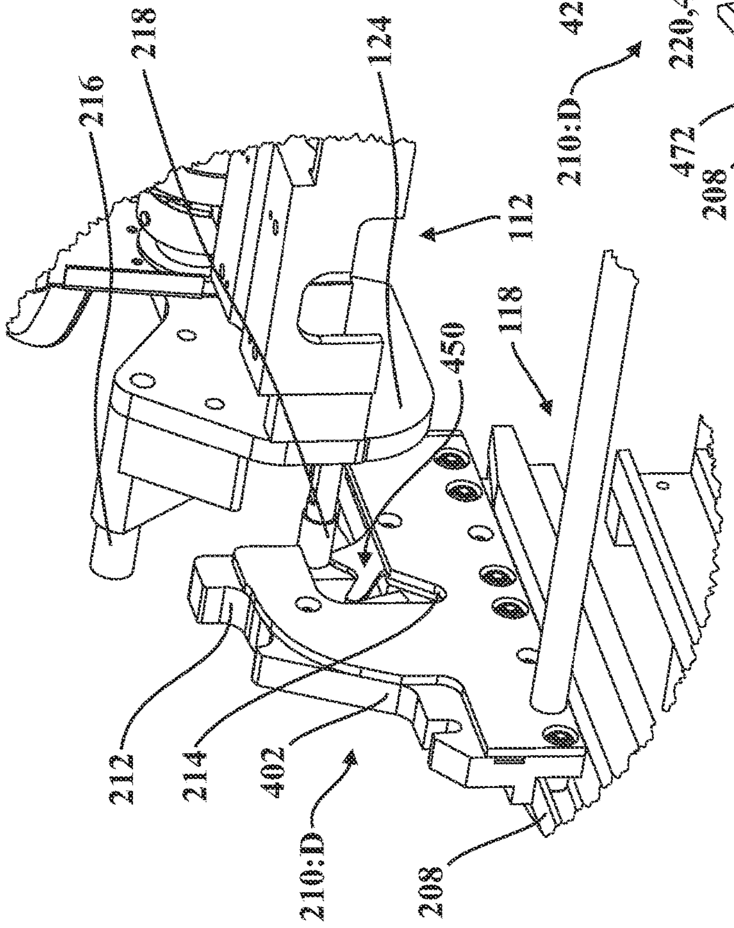
FIG. 12A is an enlarged partial perspective view taken at the indicia 12A-16A of FIG. 11 showing the litter approaching the trolley.
Figure 13B:
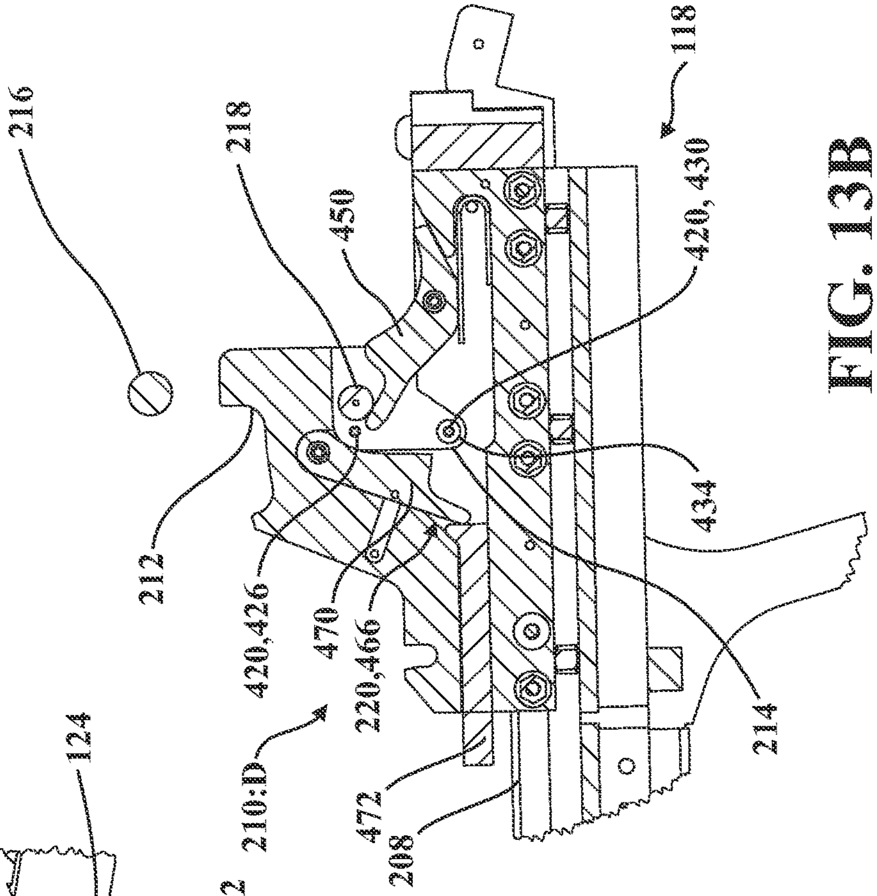
FIG. 13B is a partial section view of the patient support apparatus in the configuration of FIG. 13A showing the position of an upper pin and a lower pin of the litter relative to the trolley.
Figure 13A:
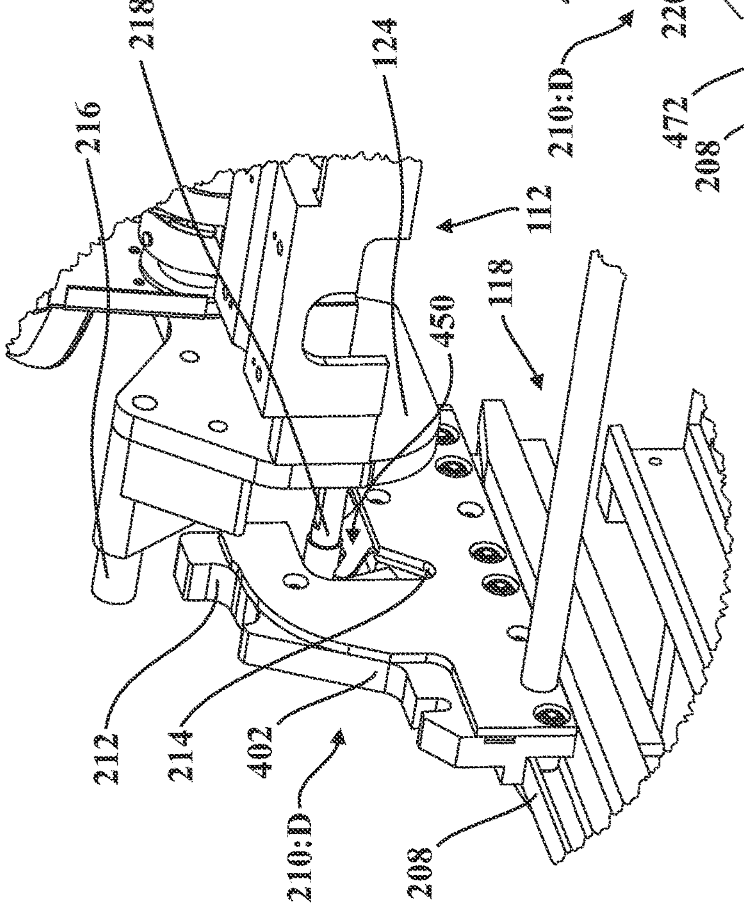
FIG. 13A is an enlarged partial perspective view taken at the indicia 12A-16A of FIG. 11 showing the litter continuing to approach the trolley.
Figure 14A:
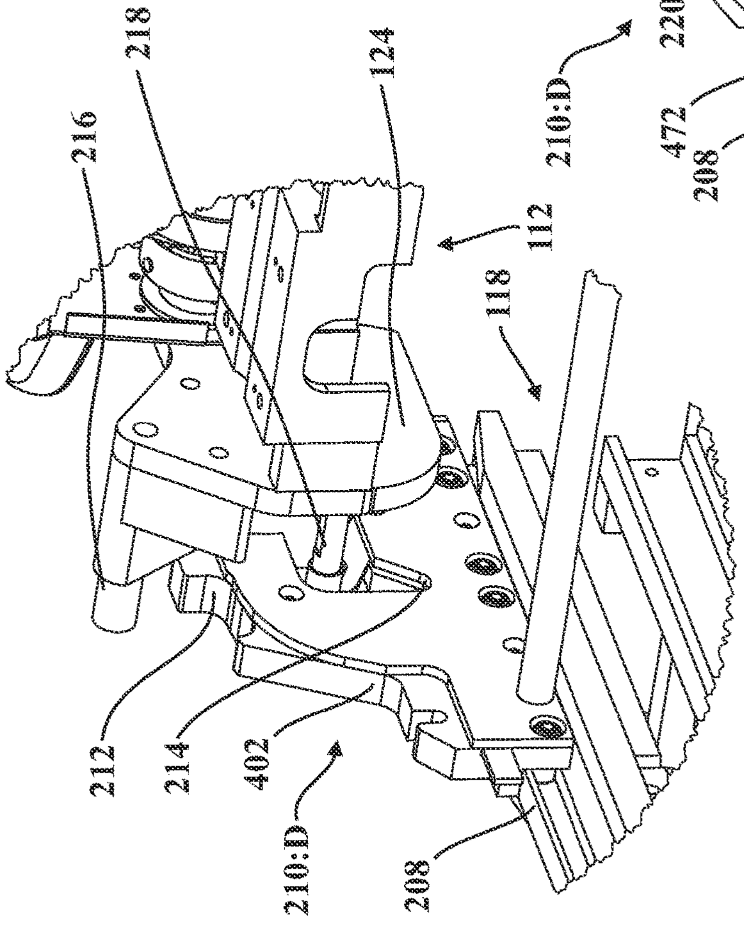
FIG. 14A is an enlarged partial perspective view taken at the indicia 12A-16A of FIG. 11 showing the upper pin and the lower pin of the litter received by the trolley.
Figure 14B:
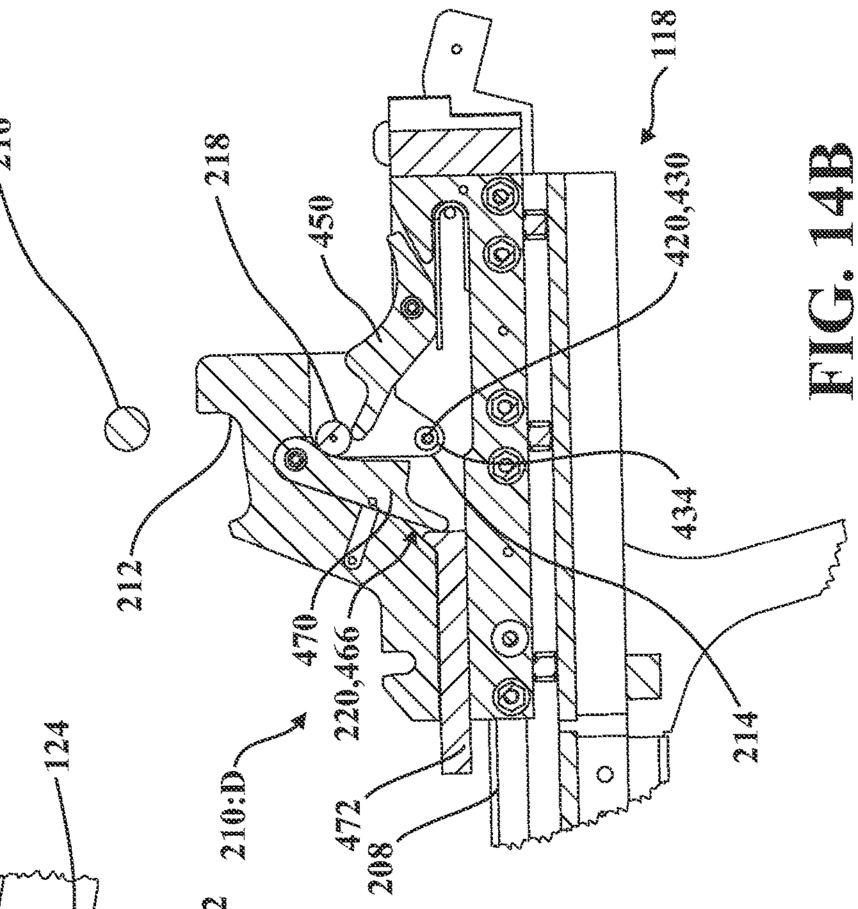
FIG. 14B is a partial section view of the patient support apparatus in the configuration of FIG. 14A showing the position of an upper pin and a lower pin of the litter relative to the trolley.
Figure 15B:
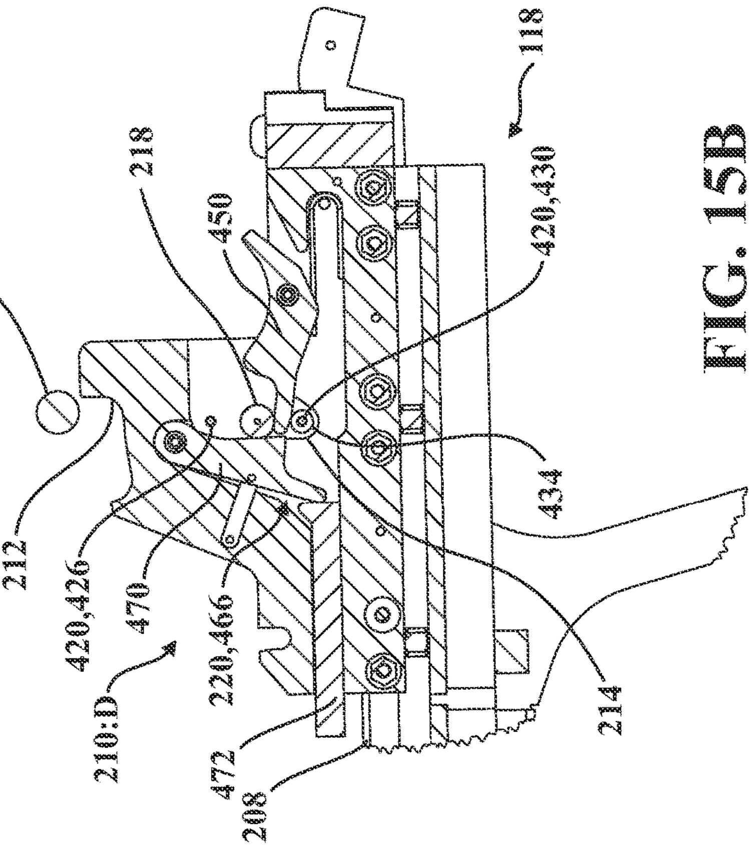
FIG. 15B is a partial section view of the patient support apparatus in the configuration of FIG. 15A showing the position of an upper pin and a lower pin of the litter relative to the trolley.
Figure 15A:
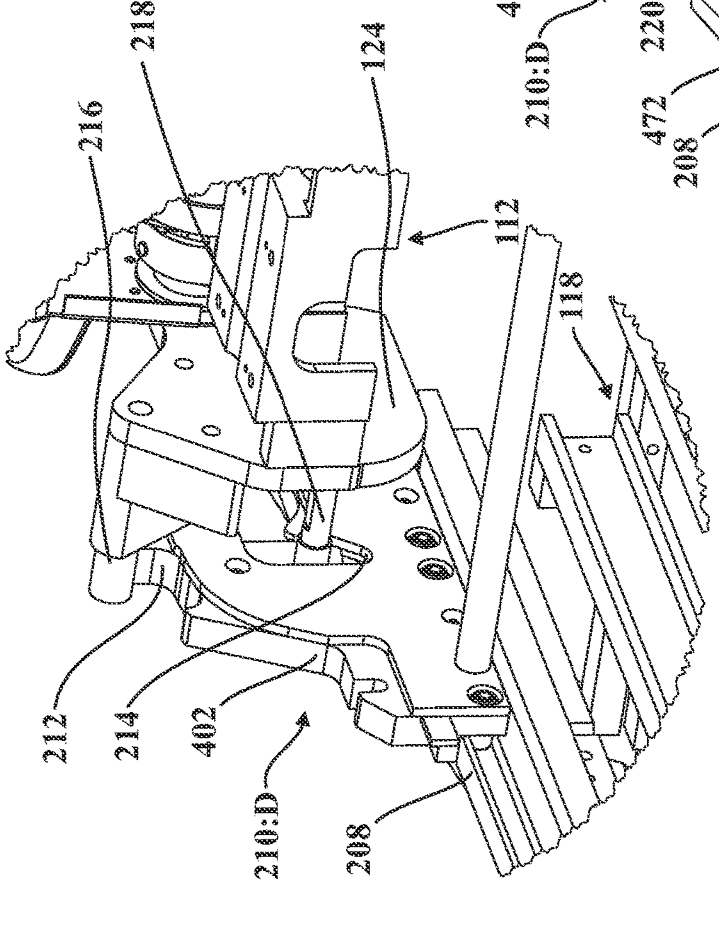
FIG. 15A is an enlarged partial perspective view taken at the indicia 12A-16A of FIG. 11 showing the upper pin and the lower pin of lowering toward the upper pin stop and lower pin stop of the trolley.

Referring to FIGS. 10A and 10B, the litter 112 may include the lower pin 218 extending from the litter 112. Additionally, the litter 112 may include the upper pin 216 extending from the litter 112 and spaced above the lower pin 218. The lower pin 218 and the upper pin 216 may be arranged such that lower pin 218 and the upper pin 216 are aligned with the trolley 210 such that the trolley 210 may receive the lower pin 218 and the upper pin 216. For example, FIGS. 10A and 10B show a rear perspective view of the litter 112 with the rear assembly 140 and the ski assembly 144 hidden to better show the upper pin 216 and the lower pin 218. In some configurations, such as the configuration shown in FIGS. 10A and 10B, the lower pin 218 may extend from the seat frame 124 and be aligned with the rear axis XR. Additionally, the upper pin 216 may extend from the seat frame 124 at a location spaced above the lower pin 218. However, it should be appreciated that the lower pin 218 and the upper pin 216 may be arranged at any suitable location extending from the litter 112 to facilitate docking the litter 112 to the base 110.

Referring back to FIGS. 3A-3D, as previously discussed, the litter 112 may include a litter lift device 162 which may generally include the front actuator 180 and the rear actuator 182 and may be configured to adjustably support the litter 112 relative to the floor surface FS. FIGS. 3A-3D show the general process of docking the litter 112 to the base 110. To facilitate the docking process, the litter lift device 162 may be configured to move between a plurality of positions including a litter lift chair position 404 (where the litter 112 is arranged in the chair configuration CC, shown in FIGS. 3A and 3B), a litter lift dock position 406 (where the litter is arranged in a docking configuration CD, shown in FIG. 3C), and a litter lift loft position 408 (where the litter is arranged in the loft configuration CL, shown in FIG. 3D). When in the litter dock position 406, at least a portion of the patient support surface 114 of the litter 112 is closer to the floor surface FS than in the litter chair position 404.

Figure 16B:
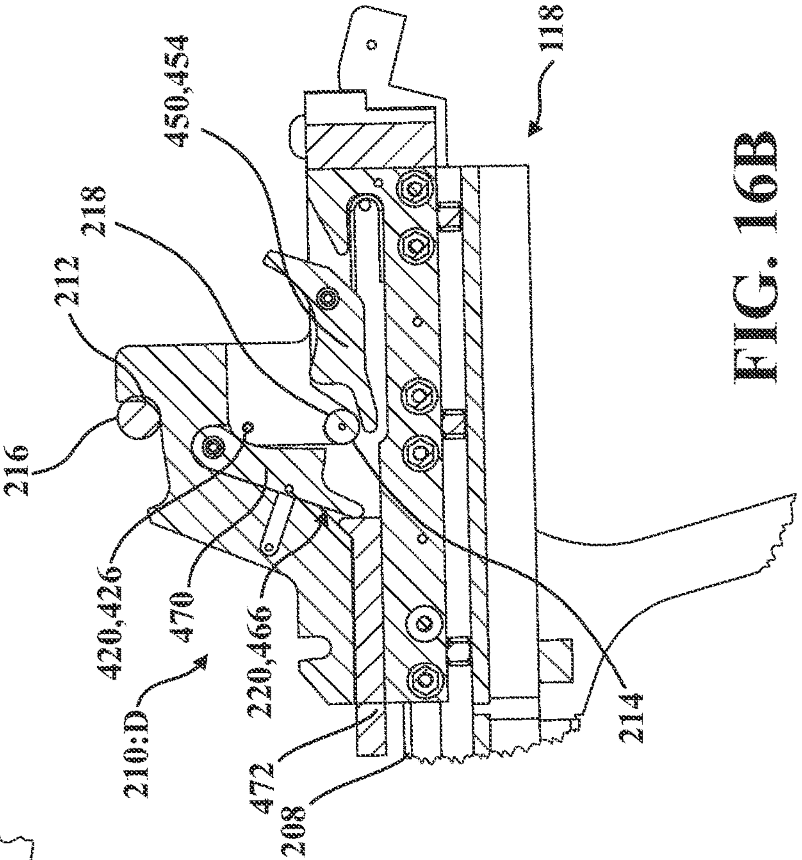
FIG. 16B is a partial section view of the patient support apparatus in the configuration of FIG. 16A showing the position of an upper pin and a lower pin of the litter relative to the trolley.

FIGS. 11-16B show perspective views of the trolley 210 during the docking process with the base 110 as well as section views of the trolley 210 during the same. First, FIGS. 12A and 12B show the upper pin 216 and the lower pin 218 aligned with the trolley 210 as the litter 112 approaches the base 110 while the litter lift device 162 (not shown) in the litter lift chair position 404. Here, the lower pin 218 is shown aligned with and spaced from the trolley void 400, and the upper pin 216 is shown spaced above the upper pin stop 212 as the litter approached the foot end FE of the base 110. Next, FIGS. 13A-14B show the litter 112 continuing to advance toward the base 110 to dock the litter 112 to the base. Here, FIGS. 14A and 14B show the lower pin 218 received in the trolley void 400 such that the lower pin 218 is aligned with and spaced above the lower pin stop 214, and the upper pin 216 is shown aligned with and spaced above the upper pin stop 212. Further, FIGS. 15A-16B illustrate the movement of the upper pin 216 and the lower pin 218 as the litter lift device 162 (not shown) moves from the litter lift chair position 404 to the litter lift dock position 406 to lower the litter 112 relative to the trolley 210. As a result, FIGS. 16A and 16B show the upper pin 216 abutting the upper pin stop 212 and the lower pin 218 abutting the lower pin stop 218.

With continued reference to FIGS. 3A-3C and FIGS. 11-16B, at least one of the upper pin 216 and the lower pin 218 are configured to be received by the trolley 210 when the litter lift device 162 is in the litter lift chair position 404. When at least one of the upper pin 216 and the lower pin 218 have been received by the trolley 210 (shown in FIG. 3B and FIGS. 14A-14B), the litter lift device 164 is configured to actuate from the litter lift chair position 404 to the litter lift dock position 406 to lower the litter 112 such that the lower pin 218 abuts the lower pin stop 214 and the upper pin 216 abuts the upper pin stop 212 (shown in FIG. 3C and FIGS. 16A-16B) to dock the litter 112 to the trolley 210. For example, in the version shown in FIGS. 3A-3C and FIGS. 11-16B, when the lower pin 218 has been received by the trolley in the trolley void 400, the litter lift device 162 is configured to actuate at least one of the front actuator 180 to adjust the front assembly 134 and the rear actuator 182 to adjust the rear assembly 140 such that the litter lift device 162 is adjusted from the litter lift chair position 404 to the litter lift dock position 406 to lower the litter 112 such that the lower pin 218 abuts the lower pin stop 214 and the upper pin 216 abuts the upper pin stop 212 to dock the litter 112 to the trolley 210.

Referring to FIG. 3D, when the litter 112 is docked to the trolley 210, support of the litter 112 relative to the floor surface FS is transferred from the litter lift device 162 to the trolley 210. When the support of the litter 112 has been transferred to the trolley 210, litter lift device 162 may be configured to actuate to a litter loft position 408 where the litter lift device 162 is raised off the floor surface FS such that that the litter 112 is cantilevered off the foot end FE of the base 110. Particularly, the front actuator 180 may be configured to actuate the front assembly 134 to the front assembly loft position 134L to lift the front assembly 134 out of contact with the floor surface FS. Similarly, the rear actuator 182 may be configured to actuate the rear assembly 140 to the rear assembly loft position 140L to lift the rear assembly 140 out of contact with the floor surface FS. With both the front assembly 134 in the front assembly loft position 134L and the rear assembly 140 in the rear assembly loft position 140L, the litter 112 is in a cantilevered position CP where the litter 112 is cantilevered off the foot end FE of the base 110. In some configurations, the front actuator 180 and the rear actuator 182 may be configured to simultaneously actuate the front assembly 134 to the front assembly loft position 134L and the rear assembly 140 to the rear assembly loft position 140L.

FIGS. 3D and 3E show the litter 112 docked to the trolley 210 with the front assembly 134 in the front assembly loft position 134L and with the rear assembly 140 in the rear assembly loft position 140L. In this configuration, the litter 112 is configured to slidably translate relative to the intermediate frame 118 between the cantilevered position CP (shown in FIG. 3D) and a litter forward position 112F (show in FIG. 3E), where the trolley 210 is in the trolley forward position 210F. Particularly, in the front assembly loft position 134L and the assembly loft position 140L may be arranged such that the front assembly 134 and the rear assembly 140 do not collide with the base 110 as the litter 112 translates along the intermediate frame 118.

Referring to FIGS. 3A-3G, as previously discussed, the patient support apparatus 102 may further include a base lift device 120. The base lift device 120 may be configured to move the intermediate frame 118 relative to the base frame 116 between a plurality of vertical configurations including a maximum raised configuration 110R and a maximum lowered configuration 110L. Notably, the base controller 156B may be in communication with the base lift device 120 and configured to control the operations of the base lift device 120. As also discussed above, the litter 112 may include a litter controller 156L configured to control at least one function of the litter 112 (e.g., function of the fowler actuator 178, the front actuator 180, and/or the rear actuator 182).

In some configurations, litter controller 156L is configured to provide a docking status signal 410 to the base controller 156B conveying a docking state of the litter 112, the litter being in a first docking state 410D when the litter 112 is currently docking to or undocking from the base 110 (such as during the sequence shown in FIGS. 3A-3D and FIGS. 11-16B), the litter 112 being in a second docking state 410U when the litter 112 is not currently docking to or undocking from the base 110 (such as shown in FIGS. 3E-3G). In some configurations, the base controller 156B may be configured to inhibit motion of the base lift device 120 when the base controller 156B receives the docking status signal 410 from the litter controller 156L conveying that the litter 112 is in the first docking state 410D. Particularly, if the base controller 156B receives the first docking status signal 410D indicating that the litter 112 is currently being docked to or undocked from the base 110, the base controller 156B will prevent the base lift device 120 from being actuated such that the base 110 and litter 112 are no longer aligned for docking/undocking. Conversely, if the base controller 156B received the second docking status signal 410U indicating that the litter 112 is not currently being docked to or undocked from the base 110, the base controller 156B enables motion of the base lift device 120 such that the base 110 may be moved between the plurality of base configurations, as shown in FIGS. 3F-3G.

As previously discussed above, in some versions, the patient support apparatus 102 further includes a sensing system 160 for sensing various configurations of the litter 112 relative to the base 110. Referring to FIGS. 12A-17B, the sensing system 160 may include one or more emitters 420 disposed about the base 110. The emitter 420 may be any suitable deceive configured to generate a detectable presence. For example, the emitter 420 may be a magnet. Referring to FIGS. 10A and 10B, the sensing system 160 may include one or more emitter sensors 422 disposed on the litter 112. The emitter sensor 422 may be any suitable device configured to detect the presence of the one or more emitters 420, including, but not limited to, a bi-directional hall effect sensor. One or more emitter sensors 422 may be in communication with the litter controller 156L to provide an emitter sensor status signal 424 to the litter controller 156L based on a detected presence of the one or more emitters 420. The emitter sensor 422 may be disposed at any suitable location on the litter 112 to detect the presence of the one or more emitters 420 as the litter 112 moves between a variety of configurations. For example, the emitter sensor 422 may be coupled to or disposed within the lower pins 218 of the litter 112. The litter controller 156L may be configured to receive the emitter sensor status signal 424 and control the at least one function of the litter 112 based on the sensor status signal 424. In the illustrated version, the litter 112 includes two emitter sensors 422: a first emitter sensor 422A arranged in one of the lower pins 218, and a second emitter sensor 422B arranged in the other of the lower pins 218. As is described in greater detail below in connection with FIGS. 25A-26D, the first and second emitter sensors 422A, 422B facilitate docking the litter 112 to the base 110.

Referring to FIGS. 12A-17B, and as is described in greater detail below, emitters 420 are strategically disposed at multiple locations about the base 110 to align with the emitter sensors 422 at a variety of litter locations. For example, the base 110 may include a trolley receptacle emitter 426 (shown in FIG. 13B, for example). Referring to FIGS. 12A-14A, the trolley receptacle emitter 426 may arranged such that the trolley receptacle emitter 426 is aligned with the emitter sensor 422 when the lower pin 218 has been received by the trolley 210 and the litter lift device 162 is in the litter lift chair position 404 (best shown in FIG. 14B). When the trolley receptacle emitter 426 is aligned with the emitter sensor 422, the emitter sensor 422 is configured to provide a litter received sensor signal 428 to the litter controller 156L. The litter received sensor signal 428 may indicate that the litter 112 is ready to be lowered to dock the litter 112 to the base 110. In response to receiving the litter received sensor signal 428, the litter controller 156L is configured to command the litter lift device 162 to adjust to the litter lift docking position 406 to lower the litter 112 such that that the lower pin 218 abuts the lower pin stop 214 and the upper pin 216 abuts the upper pin stop 212 to dock the litter 112 to the trolley 210 of the base 110 (shown in FIGS. 15A-16B).

In some versions, such as is best depicted in FIGS. 25A-26D, the first and second emitter sensors 422A, 422B are arranged at opposing lateral sides of the litter 112 to sense respective first and second trolley receptacle emitters 426A, 426B on corresponding lateral sides of the trolley 210 supported along the intermediate frame 118 of the base 110. In some versions, the first and second trolley receptacle emitters 426A, 426B may each be arranged with "north" poles facing inwardly towards each other. Here, the litter received sensor signal 428 may be defined based on the first and second emitter sensors 422A, 422B concurrently detecting the respective "north" poles of the first and second trolley receptacle emitters 426A, 426B (see FIGS. 25B and 26B).

Referring to FIGS. 12A-17B, the base 110 may include a lower pin stop emitter 430. The lower pin stop emitter 430 may be arranged such that the lower pin stop emitter 430 is aligned with the emitter sensor 422 upper pin 216 and the lower pin 218 have been received by the trolley 210 and the litter lift device 162 has been lowered such that the lower pin 218 abuts the lower pin stop 214 and the upper pin 216 abuts the upper pin stop 212. For example, referring to FIGS. 17A and 17B, the lower pin stop emitter may be supported by a foot end projection 432 of the intermediate frame 118 and configured to align with a through hole 434 of the trolley 210 such that emitter sensor 422 is aligned with the lower pin stop emitter 430 when the lower pin 218 abuts the lower pin stop 214 and the trolley 210 is in the trolley docking position 210D. When the emitter sensor 422 is aligned with the lower pin stop emitter 430, the emitter sensor 422 is configured to provide a litter docked sensor signal 436 to the litter controller 156L, conveying that the litter 112 has been successfully docked to the trolley 210 of the base 110.

In some versions, such as is best depicted in FIGS. 25A-26D, the first and second emitter sensors 422A, 422B are arranged at opposing lateral sides of the litter 112 as noted above. Here, only one lower pin stop emitter 430 is employed and is arranged on one lateral side of the intermediate frame 118 of the base 110, with its "south" pole facing inwardly (e.g., the opposite polar arrangement when compared to the first trolley receptacle emitter 426A). With this configuration, the litter docked sensor signal 436 may be defined based on the first emitter sensor 422A seeing the "south" pole of the lower pin stop emitter 430 and the second emitter sensor 422B seeing no emitter (see FIGS. 25C and 26C) following movement of the litter 112 which occurred in response to the previous litter received sensor signal 428.

Figure 24A:
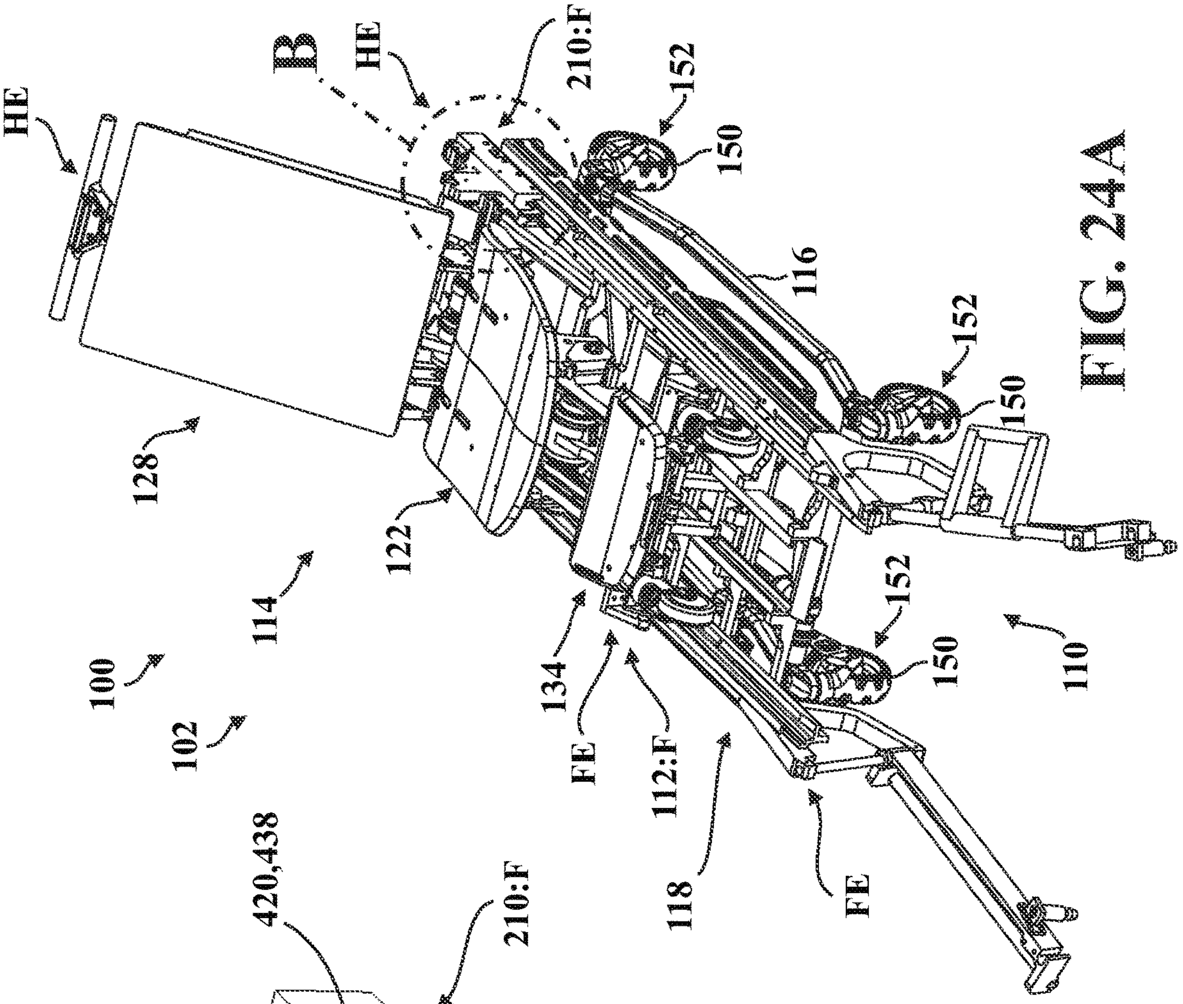
FIG. 24A is a front perspective view of the patient support apparatus showing a head end emitter aligned with the emitter sensor.
Figure 24B:
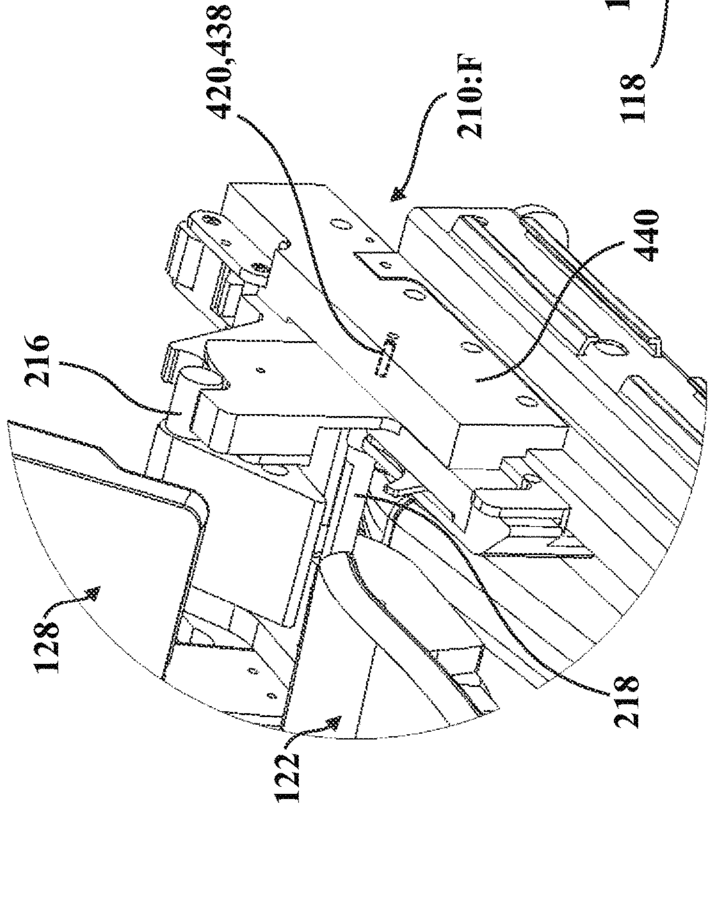
FIG. 24B is an enlarged partial perspective view taken at indicia 24B in FIG. 24.
Figure 25A:
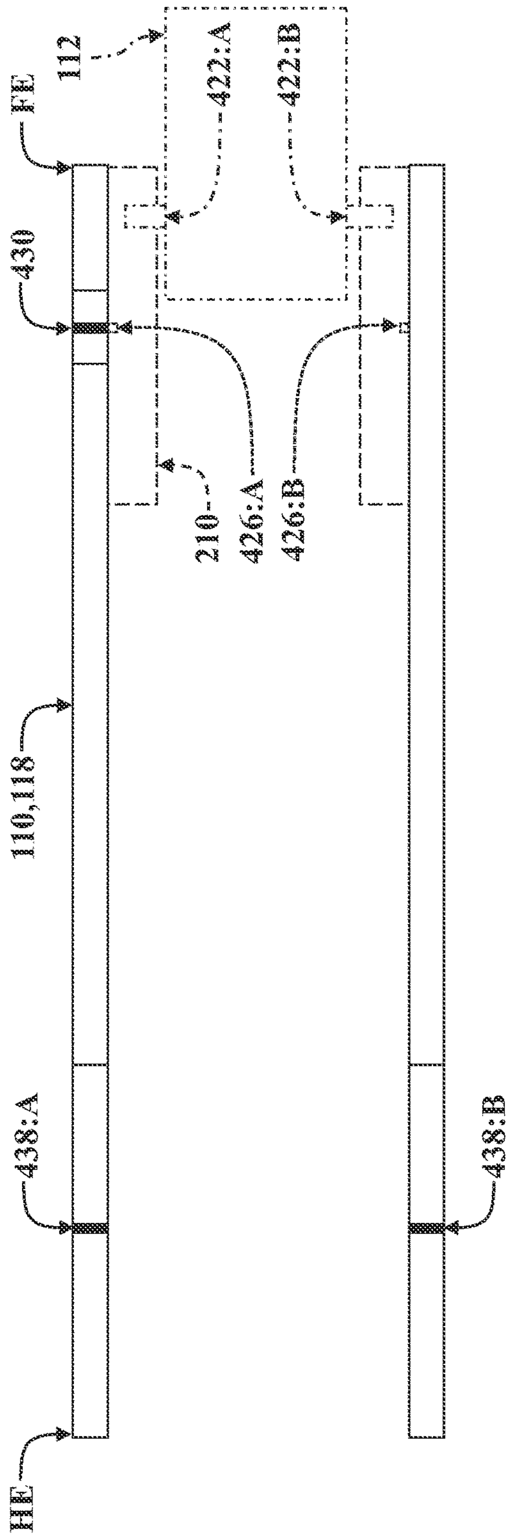
FIG. 25A is a top-side schematic view depicting an arrangement of sensors on a litter and emitters on a base having a trolley arranged at a foot end of the base, shown with the litter approaching the trolley.
Figure 26A:
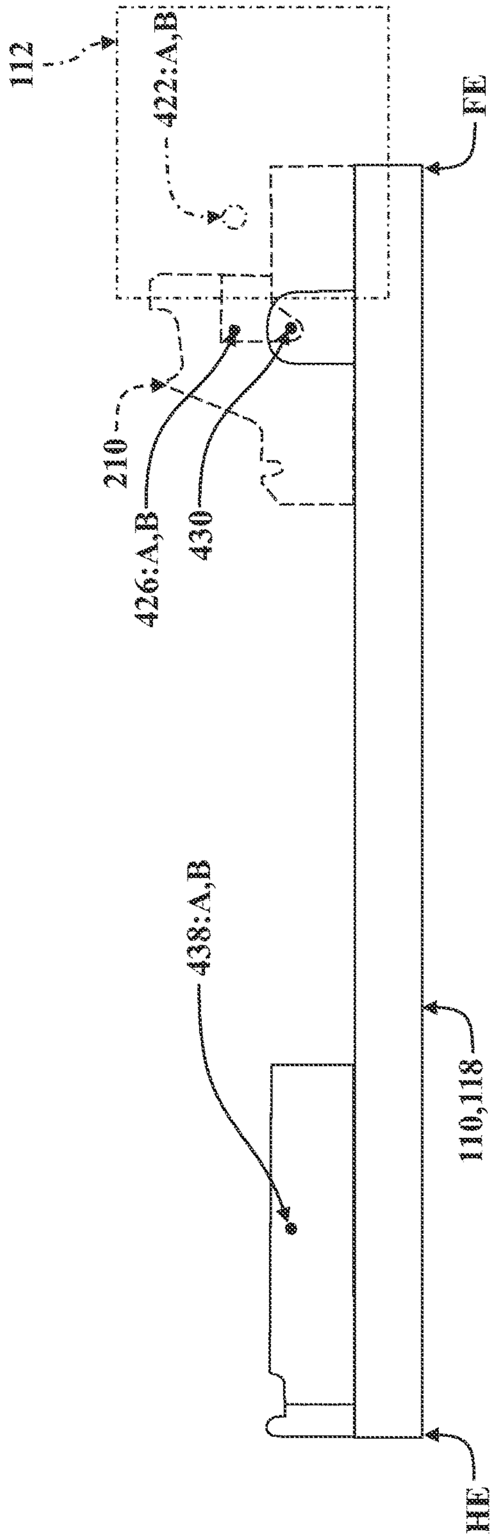
FIG. 26A is a left-side schematic view of the litter and base arranged as depicted in FIG. 25A.
Figure 25B:
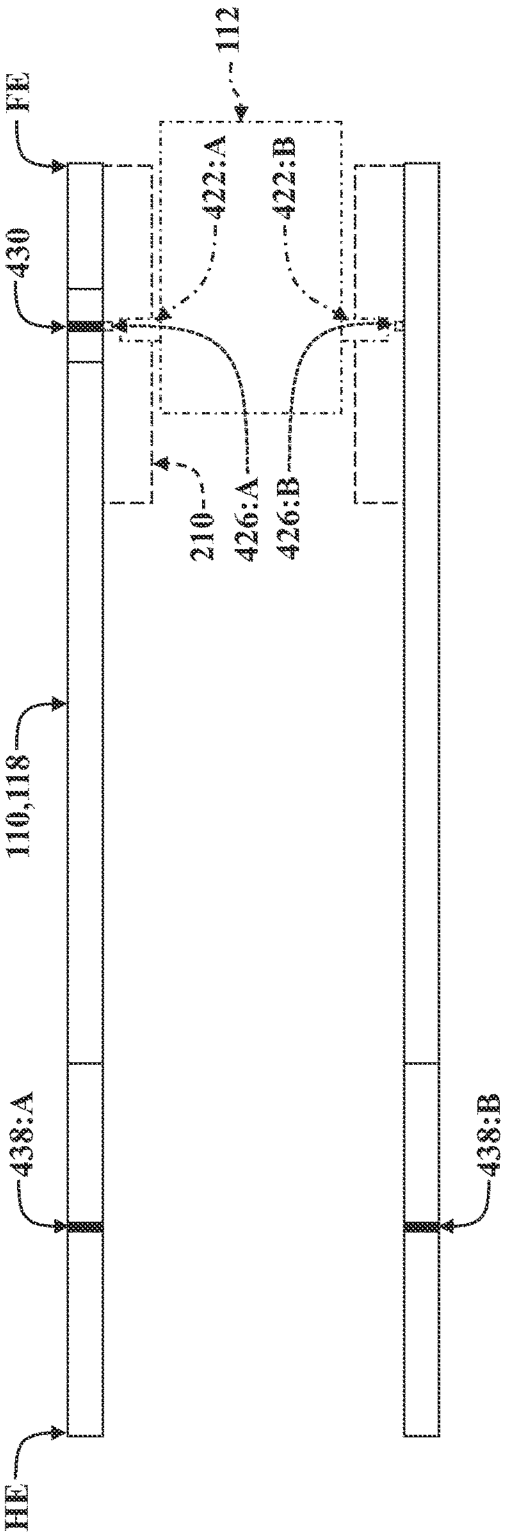
FIG. 25B is another top-side schematic view of the arrangement of sensors on the litter and emitters on the base of FIG. 25A, shown with the litter moved into the trolley.
Figure 26B:
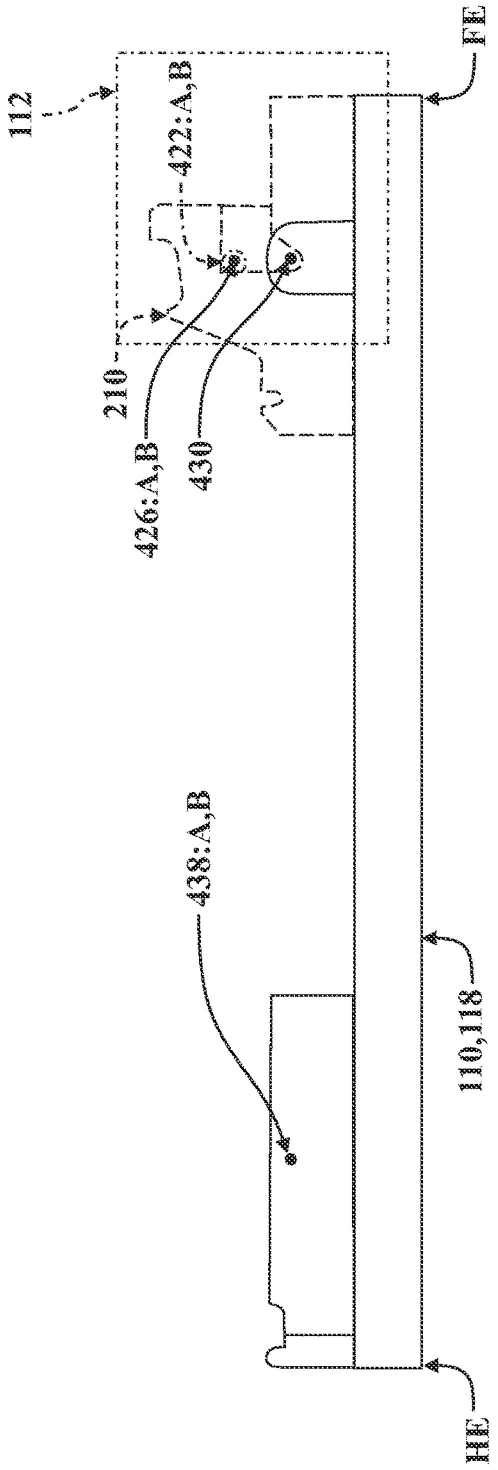
FIG. 26B is a left-side schematic view of the litter and base arranged as depicted in FIG. 25B.
Figure 25C:
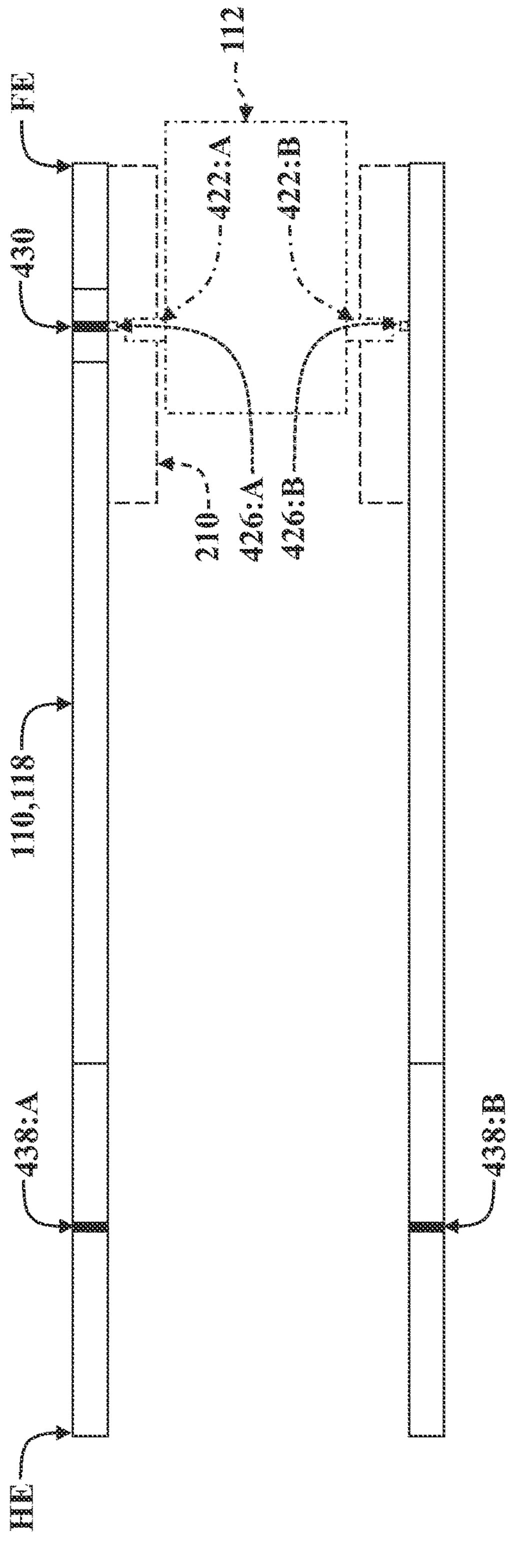
FIG. 25C is another top-side schematic view of the arrangement of sensors on the litter and emitters on the base of FIG. 25B, shown with the litter seated in the trolley at the foot end of the base.
Figure 26C:
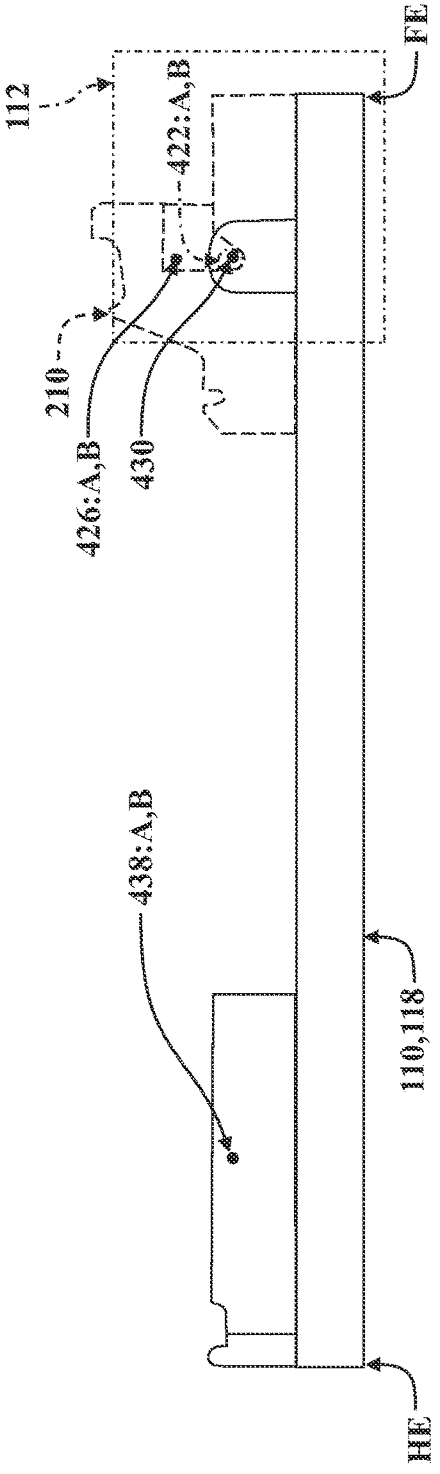
FIG. 26C is a left-side schematic view of the litter and base arranged as depicted in FIG. 25C.
Figure 25D:
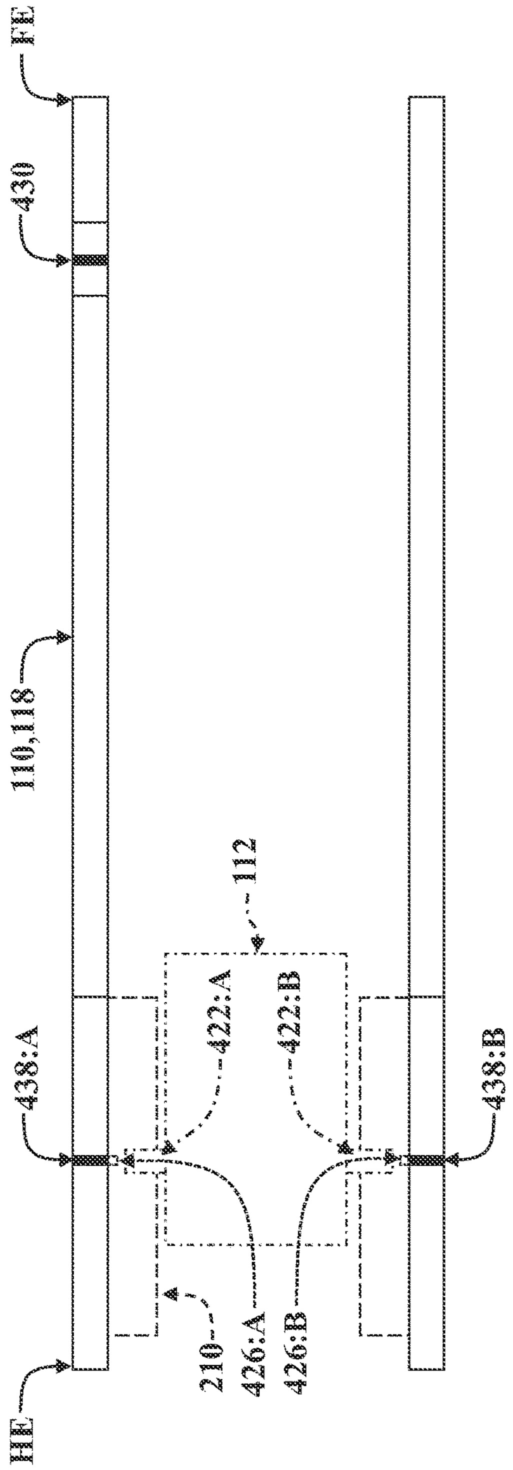
FIG. 25D is another top-side schematic view of the arrangement of sensors on the litter and emitters on the base of FIG. 25C, shown with the litter seated in the trolley and with the trolley arranged at a head end of the base.
Figure 26D:
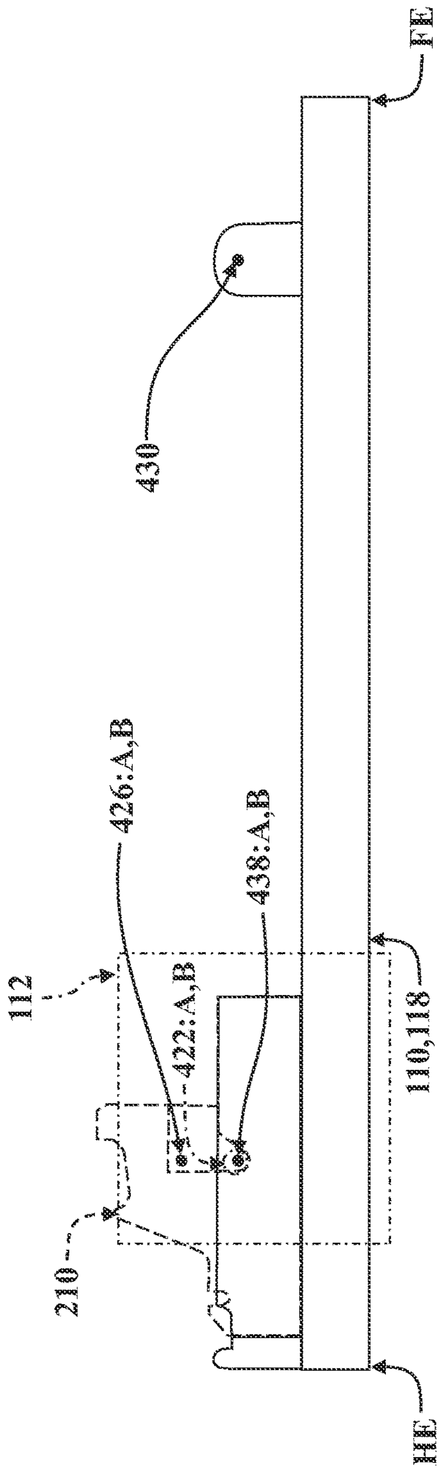
FIG. 26D is a left-side schematic view of the litter and base arranged as depicted in FIG. 25D.

Referring to FIGS. 24A and 24B, the base 110 may include a head end emitter 438. The head end emitter 438 may be arranged such that the head end emitter 438 is aligned with the emitter sensor 422 when the litter 112 is docked to the trolley 210 and the trolley 210 is in the trolley forward position 210F. For example, the head end emitter 438 may be supported by a head end projection 440 and configured to align with the through hole 434 of the trolley 210 such that the emitter sensor 422 is aligned with the head end HE when the litter 112 is docked to the trolley 210 and the trolley 210 is in the trolley forward position 210F. When the emitter sensor 422 is aligned with the head end emitter 438, the emitter sensor 422 may be configured to provide a forward sensor signal 442 to the litter controller 156L, conveying that the litter 112 is docked to the trolley 210 and the trolley 210 is in the forward trolley position 210F. In response to receiving the forward sensor signal 442, the litter controller 156L may be configured to enable a number of functions of the litter 112 or base 110. For example, once the litter controller 156 receives the forward sensor signal 442, the litter controller 156L may enable actuation of the fowler actuator 178, the front actuator 180, and/or the rear actuator 182 to arrange the patient support surface 114 in any suitable patient support configuration (e.g., trend, gatch). Also, for example, when the litter controller 156L receives the forward sensor signal 442, the litter controller 156L may provide the docking status signal 410 to the base controller 156B, enabling actuation of the base lift device 120.

In some versions, such as is best depicted in FIGS. 25A-26D, the first and second emitter sensors 422A, 422B are arranged at opposing lateral sides of the litter 112 as noted above. Here, the first and second emitter sensors 422A, 422B may also be arranged to sense respective first and second head end emitters 438A, 438B on corresponding lateral sides of the intermediate frame 118 of the base 110 adjacent to the head end HE. In some versions, the first and second head end emitters 438A, 438B may each be arranged with "south" poles facing inwardly towards each other (e.g., the opposite polar arrangement when compared to the first and second trolley receptacle emitters 426A, 426B). Here, the forward sensor signal 442 may be defined based on the first and second emitter sensors 422A, 422B concurrently detecting the respective "south" poles of the first and second head end emitters 438A, 438B (see FIGS. 25D and 26D) following movement of the trolley 210 which occurred after to the previous litter docked sensor signal 436 was received.

Figure 16A:
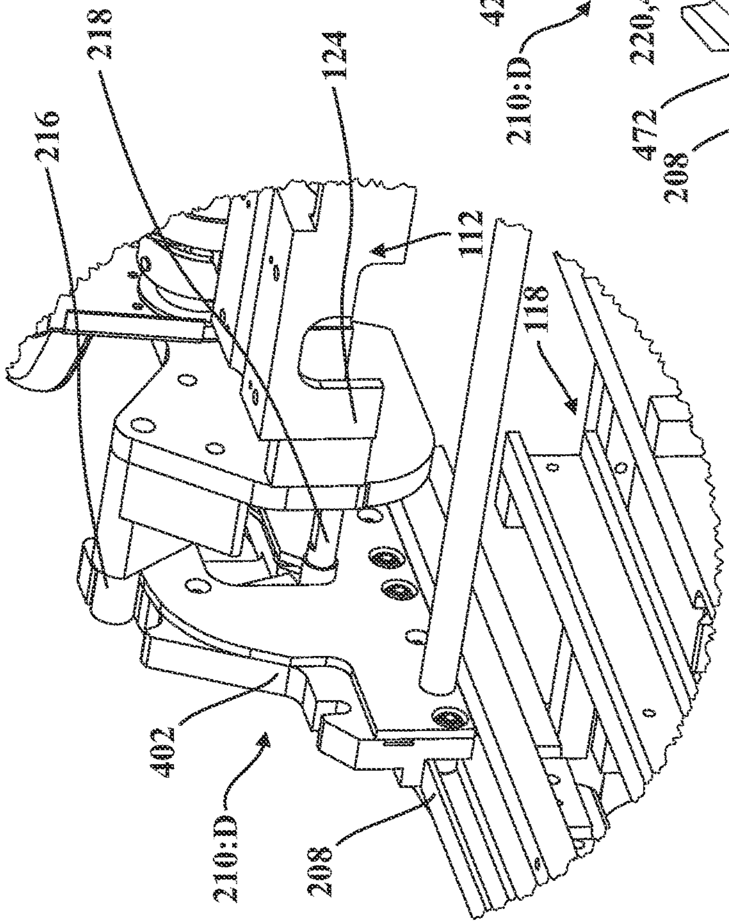
FIG. 16A is an enlarged partial perspective view taken at the indicia 12A-16A of FIG. 11 showing the upper pin and the lower pin abutting the upper pin stop and lower pin stop of the trolley.
Figure 17B:
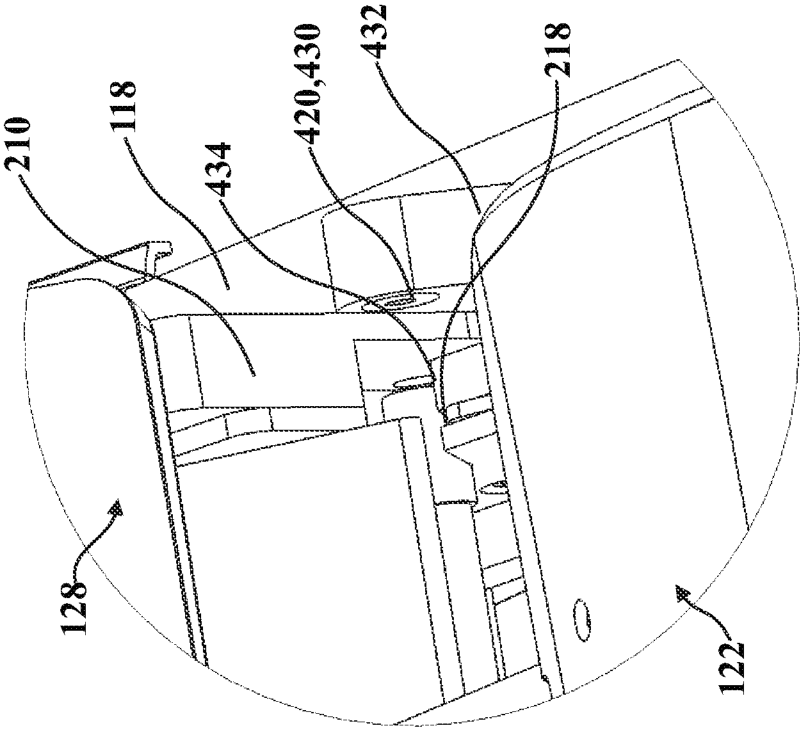
FIG. 17B is an enlarged partial perspective view taken at indicia 17B in FIG. 17A.
Figure 17A:
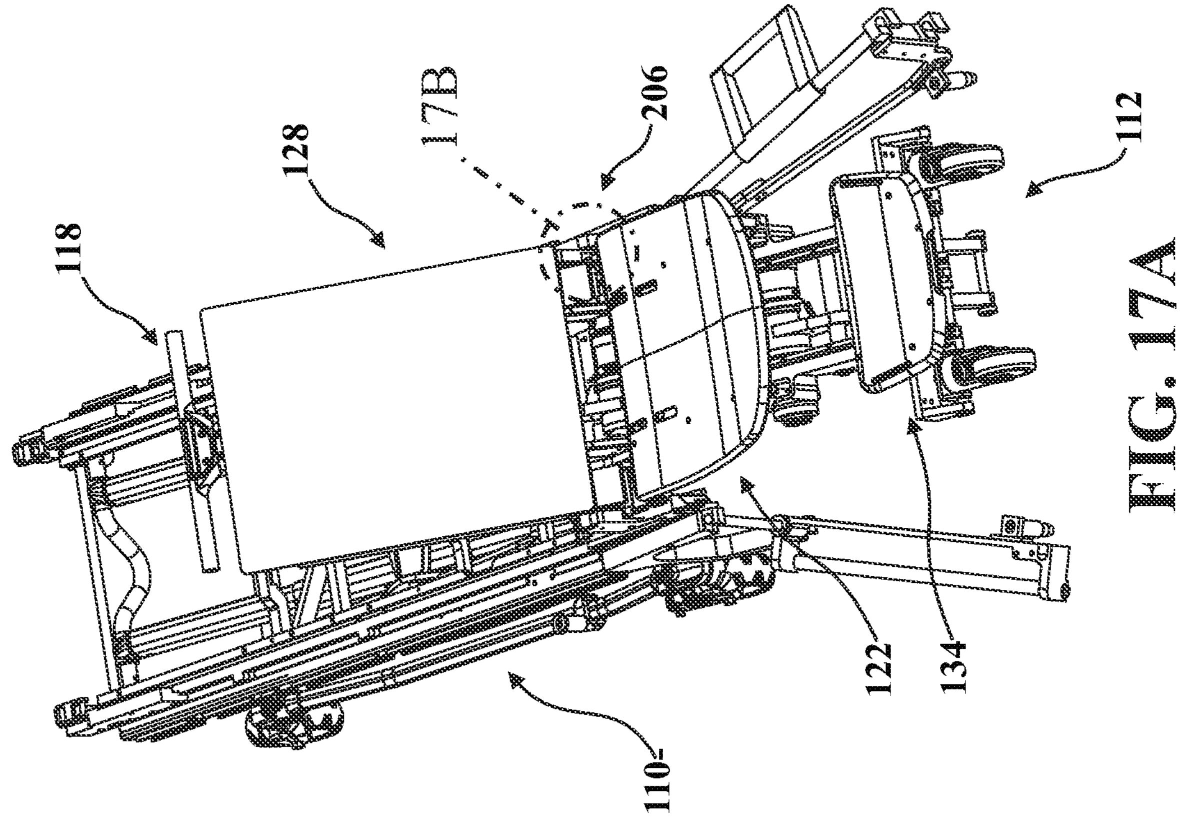
FIG. 17A is another front perspective of the patient support apparatus including an emitter and an emitter sensor.

Referring again to FIGS. 11-16B, in some versions, the trolley 210 may further include a trolley safety latch 450. The trolley safety latch 450 may be configured to move between a first trolley safety latch position 452 and a second trolley safety latch position 454. In the first trolley safety latch position 452, shown in FIGS. 12A-13B, the trolley safety latch 450 may be configured to abut the lower pin 218 as the lower pin 218 is received by the trolley 210. Referring now to FIGS. 14A-16B, as the lower pin 218 moves toward the lower pin stop 214, the trolley safety latch 450 is deflected. Referring to FIGS. 16A and 16B, once the lower pin 218 abuts the lower pin stop 214 such that the litter 112 is docked to the trolley 210, the trolley safety latch 450 is arranged in the second trolley safety latch position 454. Here, it will be appreciated that the geometry of the trolley safety latch 450 helps ensure that the lower pins 218 on each lateral side of the litter 112 are in their respective lower pin stops 214 when the litter 112 is docked to the base 110.

Figure 18A:
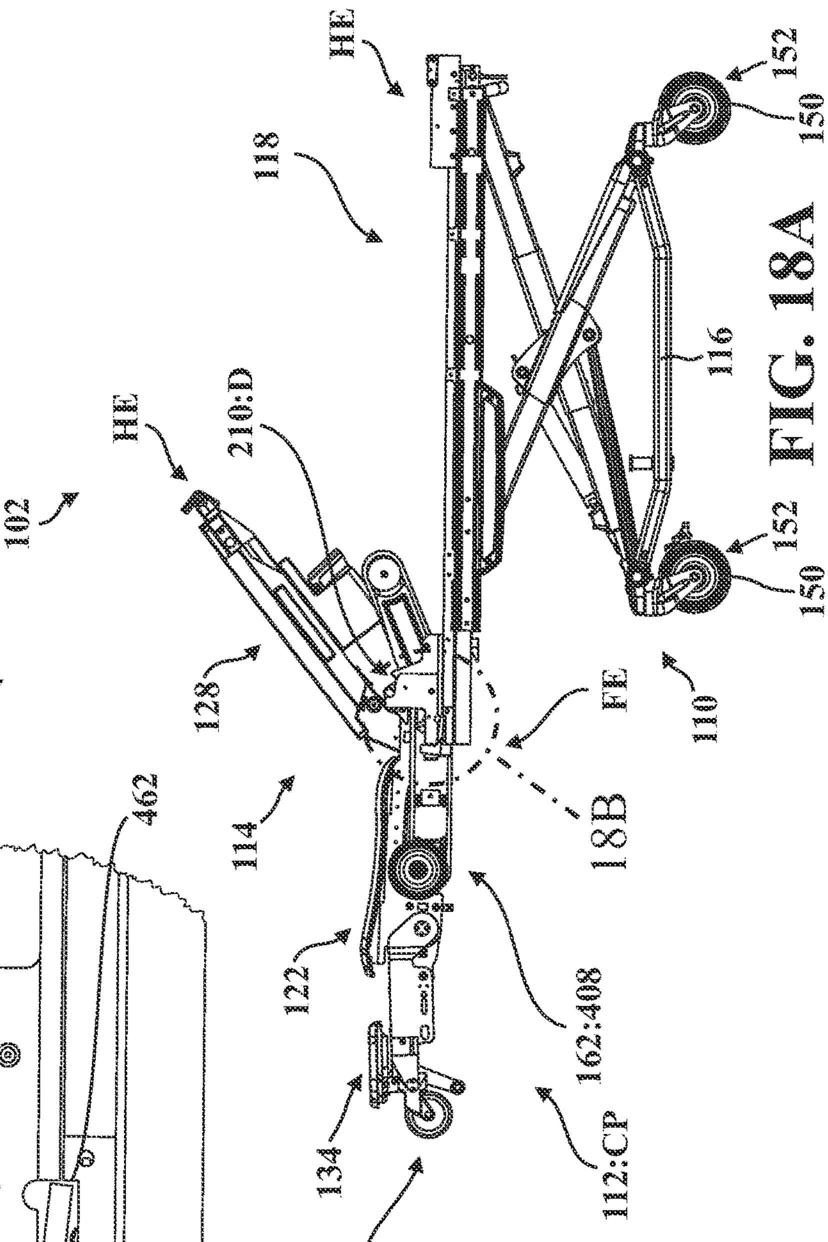
FIG. 18A is a side view of the patient support apparatus including a dock trolley lock mechanism in a first dock trolley lock position.
Figure 18B:
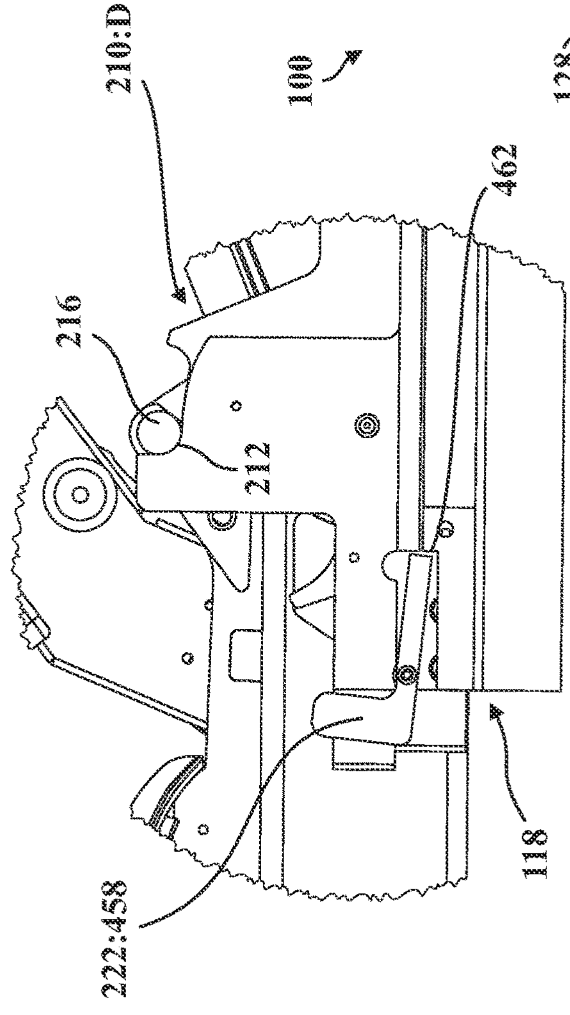
FIG. 18B is an enlarged partial perspective view taken at indicia 18B in FIG. 18A.
Figure 19A:
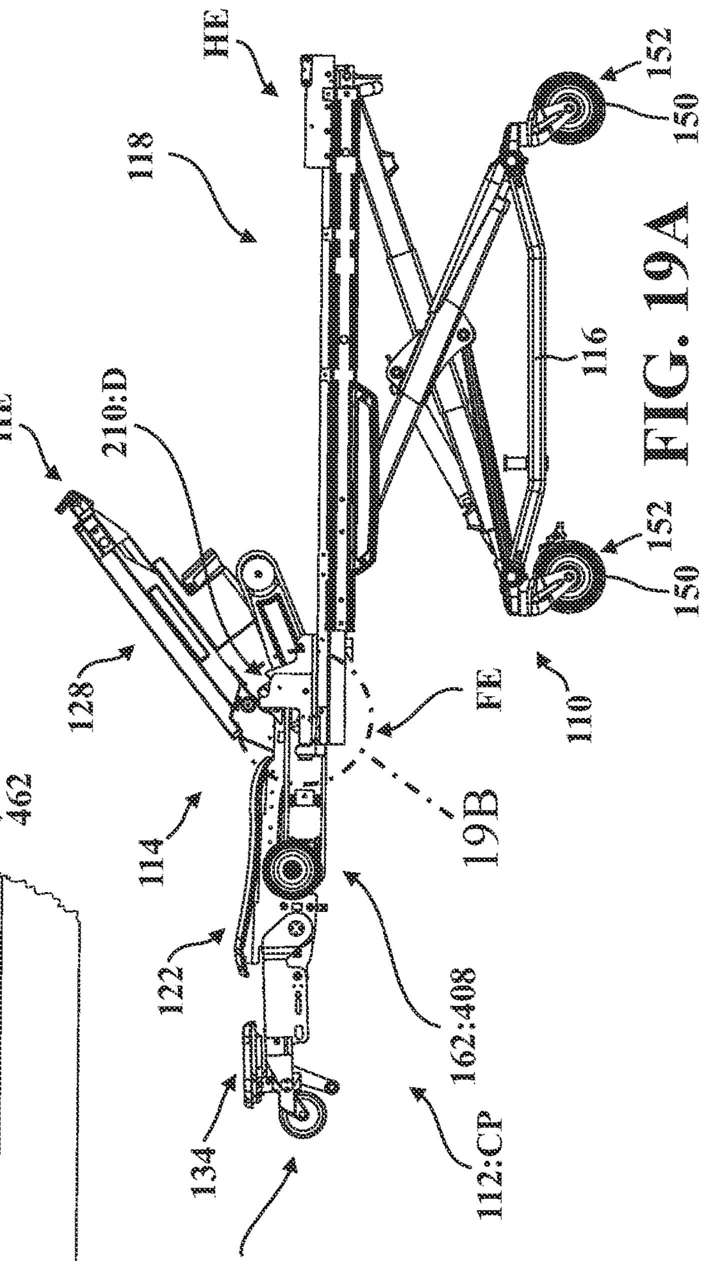
FIG. 19A is a side view of the patient support apparatus including a dock trolley lock mechanism in a second dock trolley lock position.
Figure 19B:
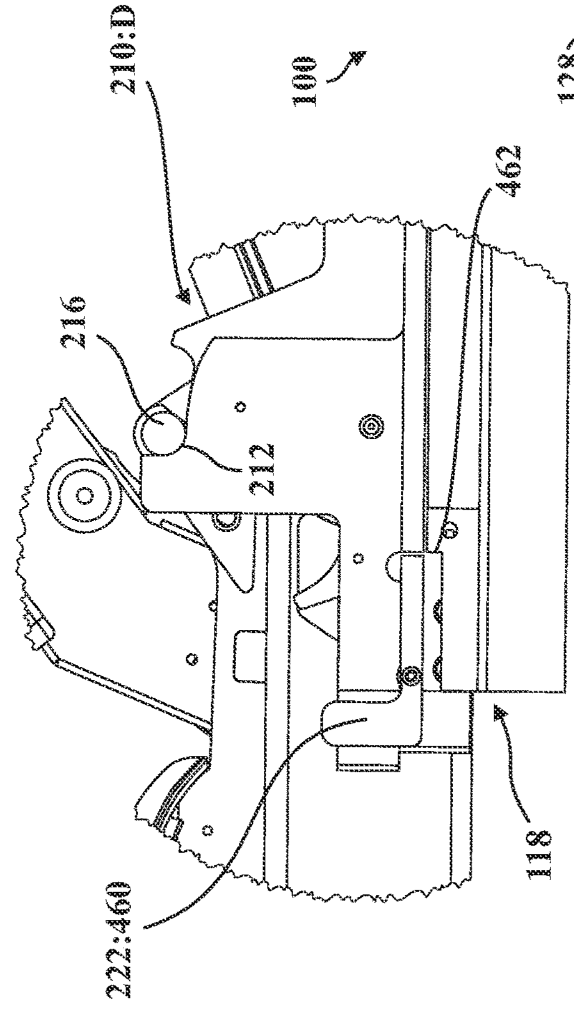
FIG. 19B is an enlarged partial perspective view taken at indicia 19B in FIG. 19A.
Figure 20:
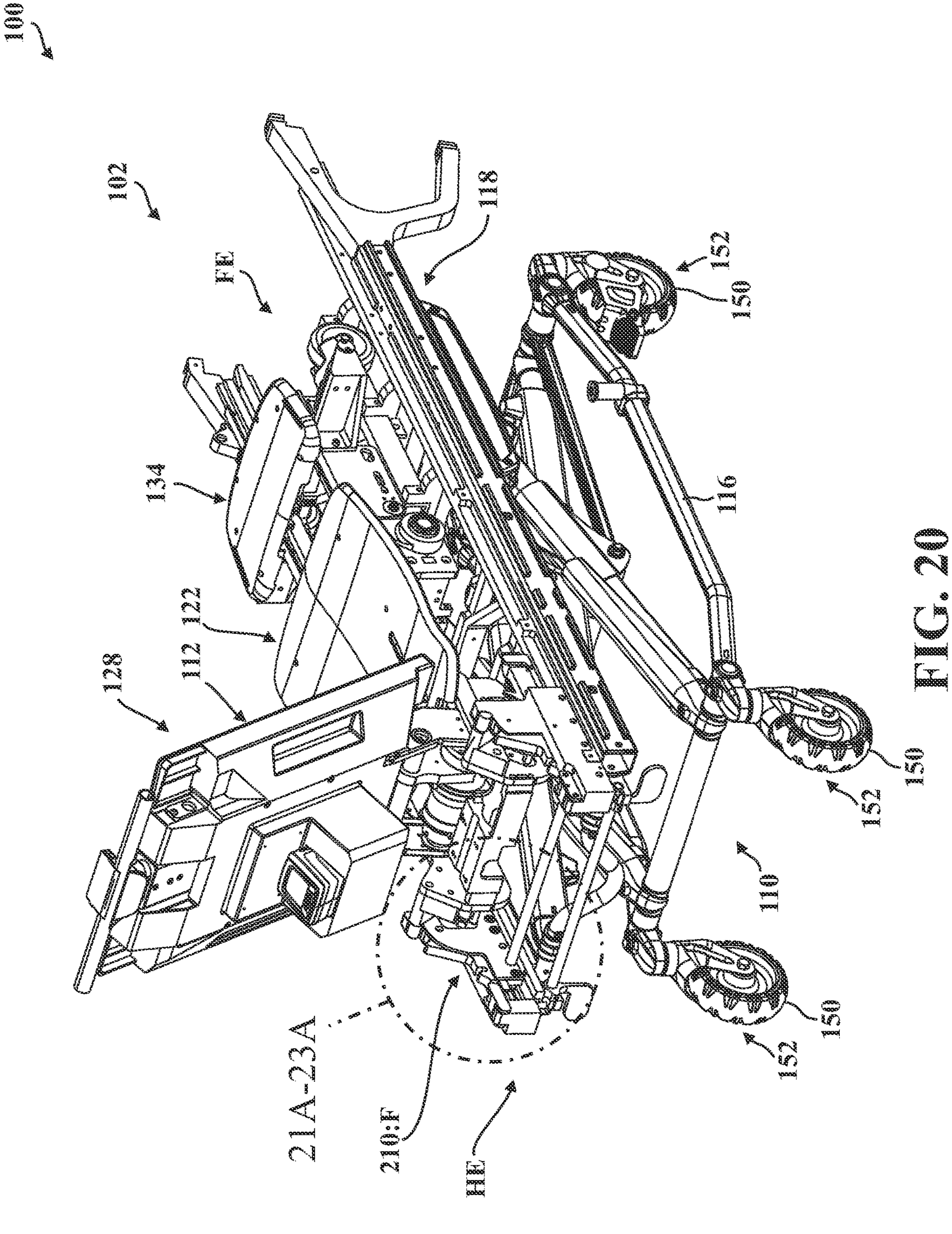
FIG. 20 is a rear perspective view of the patient support apparatus including the litter approaching a litter forward position.
Figure 21B:
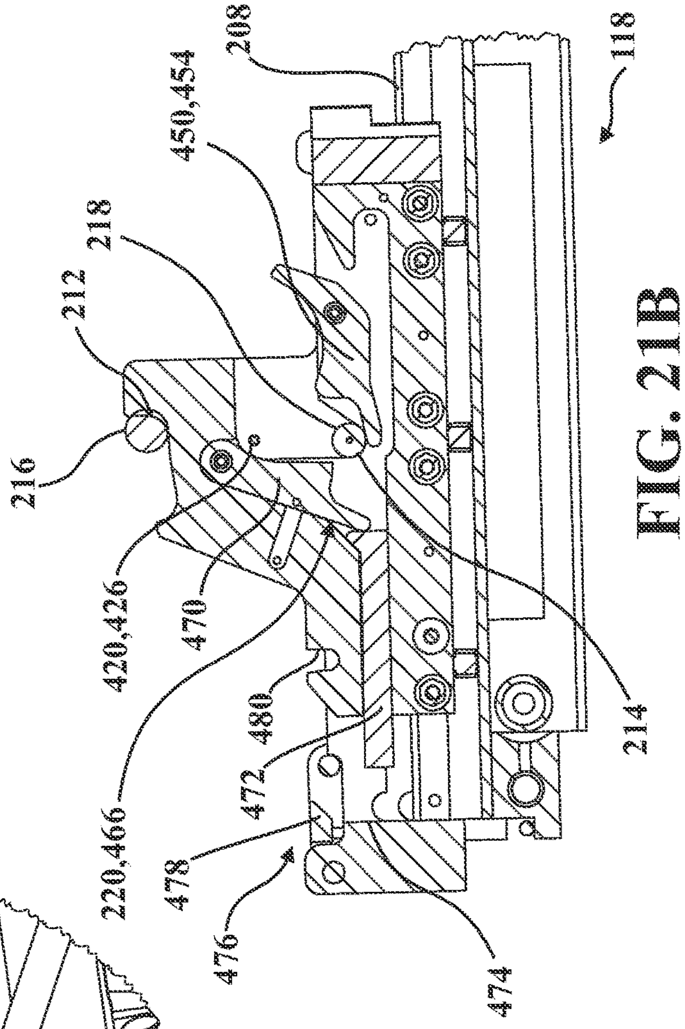
FIG. 21B is a partial section view of the patient support apparatus in the configuration of FIG. 21A showing the front trolley lock mechanism.
Figure 21A:
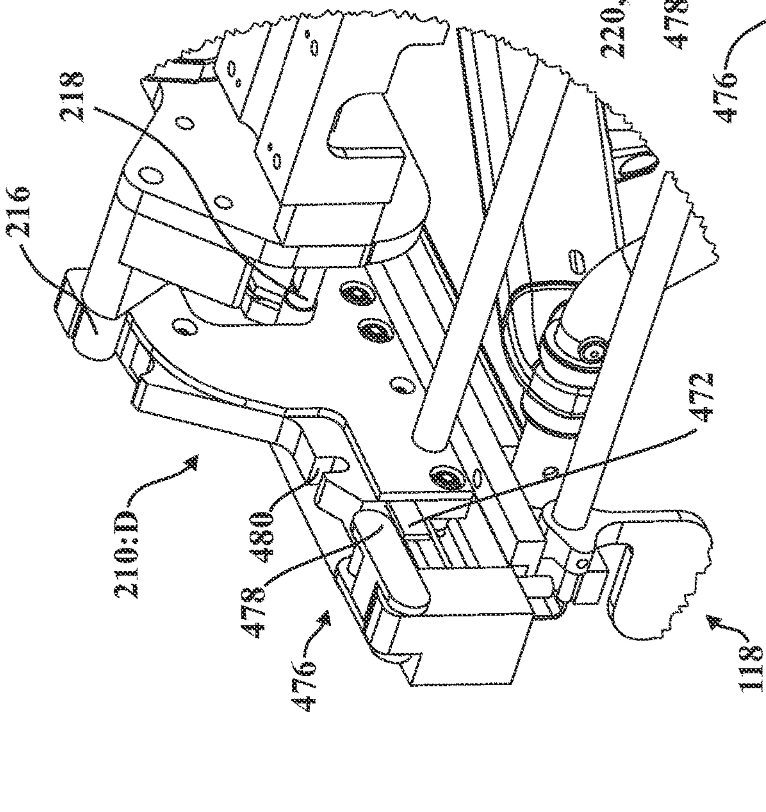
FIG. 21A is an enlarged partial perspective view taken at the indicia 21A-23A of FIG. 20 showing a front trolley lock mechanism in a first front trolley lock position.

Referring now to FIGS. 18A-19B, the trolley 210 may further include a dock trolley lock mechanism 222. The dock trolley lock mechanism 222 is configured to move between a first dock trolley lock position 458 (shown in FIGS. 18A and 18B) and a second dock trolley lock position 460 (shown in FIGS. 19A and 19B). Referring to FIGS. 18A and 18B, in the first dock trolley lock position 458, the dock trolley lock mechanism 222 is arranged to abut an abutment portion 462 at the foot end FE of the intermediate frame 118. When the dock trolley lock mechanism 222 abuts the abutment portion 462, translation of the trolley 210 relative to the intermediate frame 118 is limited. Referring to FIGS. 19A and 19B, in the second dock trolley lock position 460, the dock trolley lock mechanism 222 is arranged such that the dock trolley mechanism 222 does not abut the abutment portion 462, thereby allowing translation of the trolley 210 relative to the intermediate frame 118. In some configurations, the dock trolley lock mechanism 222 may include a dock trolley biasing element (not shown) arranged to urge the dock trolley lock mechanism 222 into the first dock trolley lock position 458 such that translation of the trolley 210 relative to the intermediate frame 118 is automatically limited when the trolley 210 is in the trolley docking position 210D.

Figure 22B:
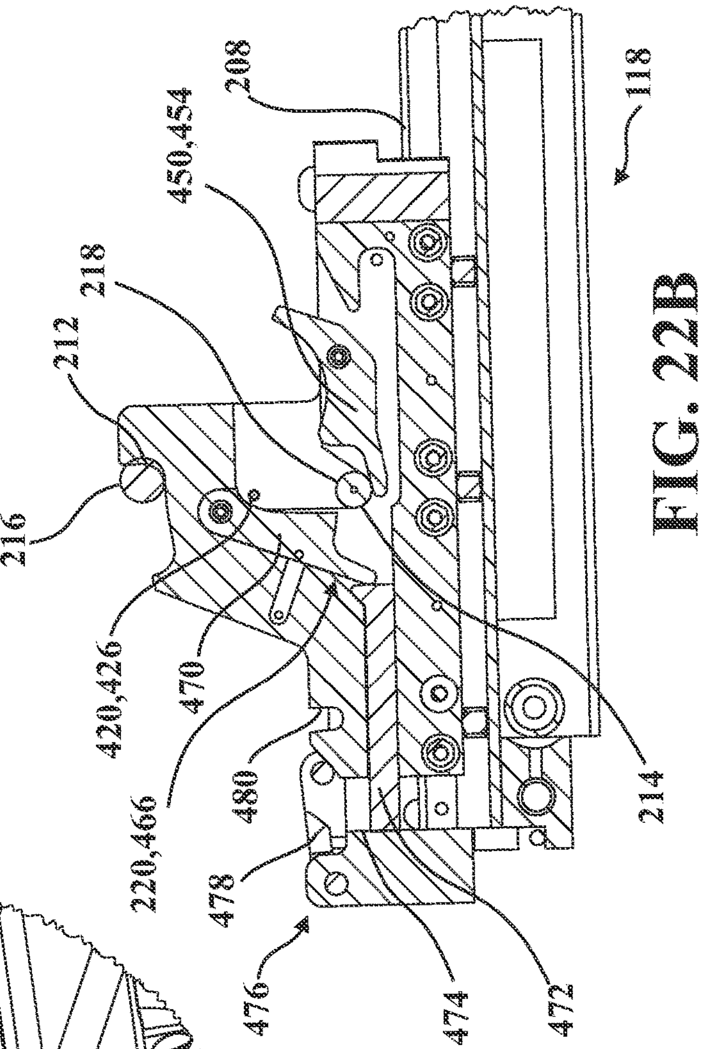
FIG. 22B is a partial section view of the patient support apparatus in the configuration of FIG. 22A showing the front trolley lock mechanism.
Figure 22A:
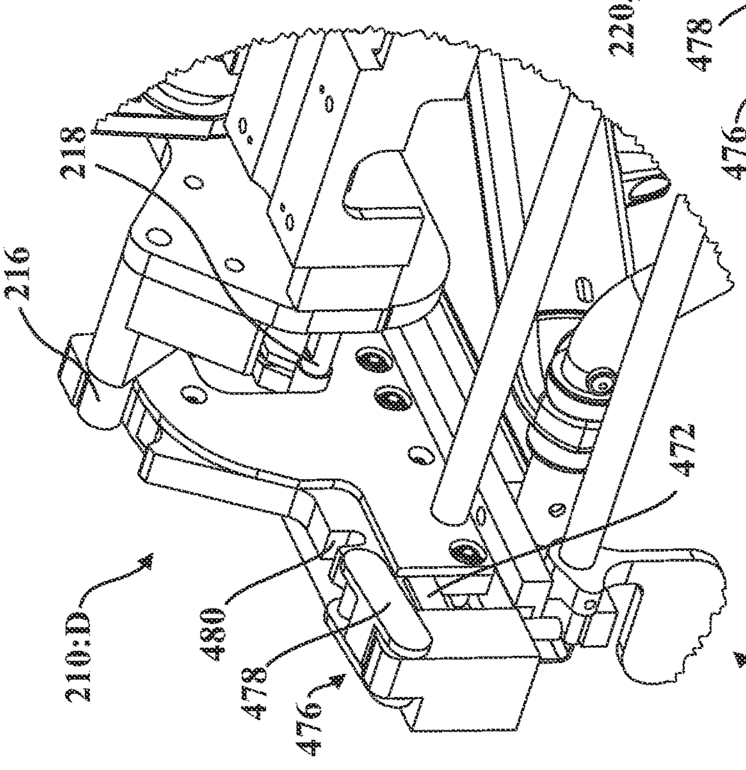
FIG. 22A is another enlarged partial perspective view taken at the indicia 21A-23A of FIG. 20 showing a front trolley lock mechanism in the first front trolley lock position.
Figure 23B:
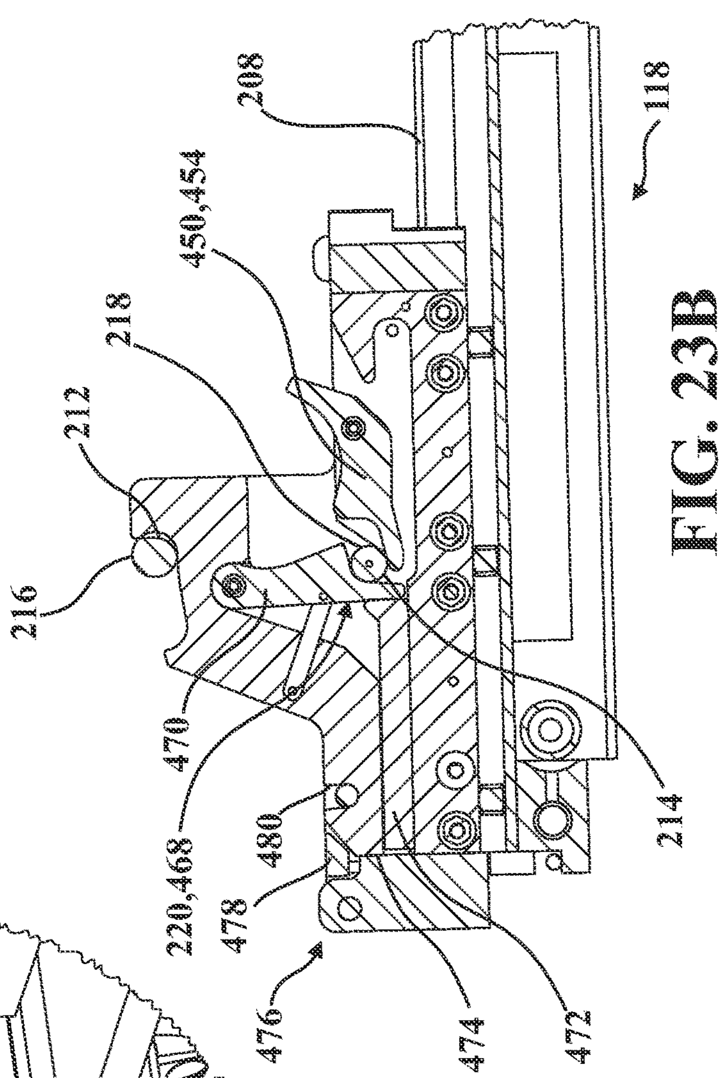
FIG. 23B is a partial section view of the patient support apparatus in the configuration of FIG. 23A showing the front trolley lock mechanism.
Figure 23A:
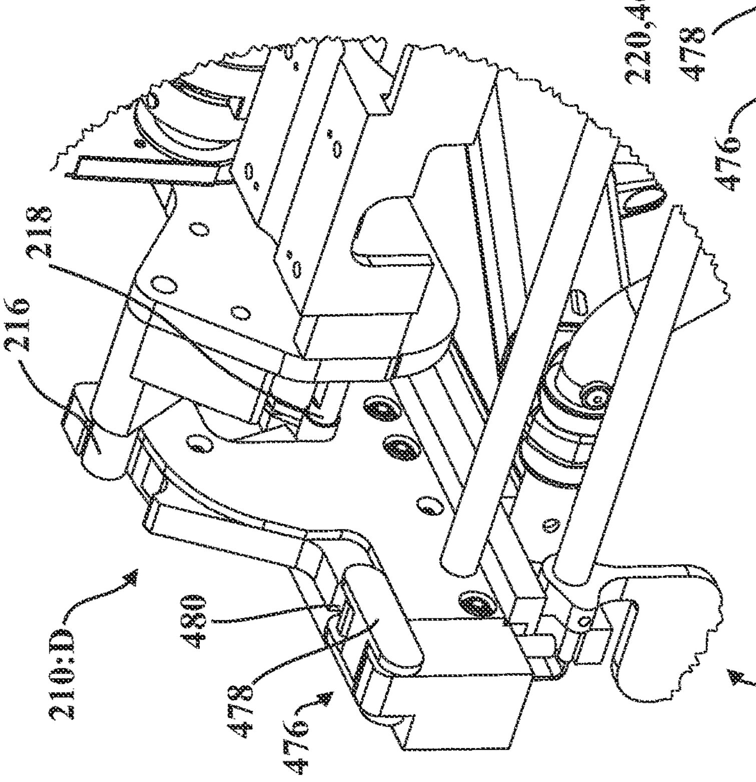
FIG. 23A is another enlarged partial perspective view taken at the indicia 21A-23A of FIG. 20 showing a front trolley lock mechanism in a second front trolley lock position.

Referring to Figured 20-23B, the trolley 210 may further include a forward trolley lock mechanism 220. The forward trolley lock mechanism 220 may be configured to move between a first forward trolley lock position 466 (shown in FIGS. 21A-22B) and a second forward trolley lock position 468 (shown in FIGS. 23A and 23B). The forward trolley lock mechanism 220 may include a forward trolley lock member 470 and a forward trolley lock deflector 472. Referring to FIGS. 21A-22B, when the forward trolley lock mechanism 220 is in first forward trolley lock position 466, the forward trolley lock member 470 is arranged such that the lower pin 218 may be lifted out of the lower pin stop 214. Referring now to FIGS. 22A and 22B, the forward trolley lock deflector 472 is arranged to abut a head end abutment surface 474 of the head end HE of the intermediate frame 118. Referring next to FIGS. 23A and 23B, as the trolley 210 translates along the intermediate frame 118 into the trolley forward position 210F, the forward trolley lock deflector 472 abuts the head end abutment surface 474 and deflects such that the forward trolley lock member 470 deflects from the first forward trolley lock position 466 to the second forward trolley lock position 468. In the second forward trolley lock position 468, the trolley lock mechanism is configured to abut a portion of the lower pin 218 such that the lower pin 218 does not lift out of the lower pin stop 214. In some configurations, the forward trolley lock mechanism 220 may include a forward trolley biasing element (not shown) arranged to urge the forward trolley lock mechanism 220 into the first forward trolley lock position 466.

With continued reference to FIGS. 20-23B, the intermediate frame 118 may further include a head end lock 476. The head end lock may include a head end lock latch 478 configured to be engaged with a head end lock void 480 of the trolley 210 when the trolley 210 is in the trolley forward position 210F to limit translation of the trolley 210 relative to the intermediate frame 118.

It will be further appreciated that the terms "include," "includes," and "including" have the same meaning as the terms "comprise," "comprises," and "comprising." Moreover, it will be appreciated that terms such as "first," "second," "third," and the like are used herein to differentiate certain structural features and components for the non-limiting, illustrative purposes of clarity and consistency.

Several configurations have been discussed in the foregoing description. However, the configurations discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

The present disclosure also comprises the following clauses, with specific features laid out in dependent clauses, that may specifically be implemented as described in greater detail with reference to the configurations and drawings above.

CLAUSES

I. A patient support apparatus for supporting a patient, the patient support apparatus comprising:

- a base having a head end and a foot end, the base including:
  - a base frame arranged for movement about a floor surface, and
  - an intermediate frame operatively coupled to the base frame, the intermediate frame including a trolley configured to translate between a plurality of trolley positions including a trolley forward position where the trolley is arranged at the head end of the base and a trolley docking position where the trolley is arranged at the foot end of the base, the trolley defining a lower pin stop and an upper pin stop spaced above the lower pin stop; and
- a litter for supporting the patient, the litter configured to be docked to and undocked from the trolley, the litter including:
  - a patient support surface for supporting the patient,
  - a litter lift device configured to adjustably support the litter relative to the floor surface between a plurality of positions including a litter lift chair position and a litter lift dock position, wherein at least a portion of the patient support surface is closer to the floor surface in the litter lift dock position than in the litter lift chair position,
  - a lower pin extending from the litter, and
  - an upper pin extending from the litter and spaced above the lower pin;
- wherein at least one of the upper pin and the lower pin are configured to be received by the trolley when the litter lift device is in the litter lift chair position, and, when the at least one of the upper pin and the lower pin have been received by the trolley, the litter lift device is configured to actuate from the litter lift chair position to the litter lift dock position to lower the litter such that the lower pin abuts the lower pin stop and the upper pin abuts the upper pin stop to dock the litter to the trolley.

II. The patient support apparatus of clause I, wherein, when the litter is docked to the trolley, support of the litter relative to the floor surface is transferred from the litter lift device to the trolley, enabling the litter lift device to drive the litter a litter loft position where the litter lift device is raised off the floor surface such that that the litter is cantilevered off the foot end of the base.

III. The patient support apparatus of any one of clauses I-II, wherein the patient support surface is defined by a seat assembly with a seat frame having a front end and a rear end; and wherein the litter lift device includes:

- a front assembly coupled to the front end of the seat frame and configured for movement between a plurality of front assembly positions including a front assembly chair position and a front assembly loft position; and
- a rear assembly coupled to the rear end of the seat frame and configured for movement between a plurality of rear assembly positions including a rear assembly chair position and a rear assembly loft position.

IV. The patient support apparatus of clause III, wherein the litter lift device includes:

- a front actuator arranged to articulate the front assembly relative to the seat frame between the front assembly chair position and the front assembly loft position; and
- a rear actuator arranged to articulate the rear assembly relative to the seat frame between the rear assembly chair position and the rear assembly loft position.

V. The patient support apparatus of clause IV, wherein, when at least one of the lower pin and the a upper pin have been received by the trolley, the litter lift device is configured to actuate at least one of the front actuator and the rear actuator to move from the litter lift chair position to the litter lift dock position to bring the lower pin into abutment with the lower pin stop and to bring the upper pin into abutment with the upper pin stop to transfer support of the litter relative to the floor surface to the trolley.

VI. The patient support apparatus of clause V, wherein, when the litter is docked to the trolley:

- the front actuator is configured to drive the front assembly to the front assembly loft position to lift the front assembly out of contact with the floor surface, and
- the rear actuator is configured to drive the rear assembly to the rear assembly loft position to lift the rear assembly out of contact with the floor surface to place the litter in a cantilevered position with the litter cantilevered off the foot end of the base.

VII. The patient support apparatus of clause VI, wherein, when the litter is docked to the trolley with the front assembly in the front assembly loft position and with the rear assembly in the rear assembly loft position, the litter is configured to slidably translate relative to the intermediate frame between the cantilevered position and a litter forward position defined by the trolley being in the trolley forward position.

VIII. The patient support apparatus of any one of clauses VI-VII, wherein the front actuator and the rear actuator are configured to simultaneously drive the front assembly to the front assembly loft position and the rear assembly to the rear assembly loft position.

IX. The patient support apparatus of any one of clauses I-VIII, wherein the patient support apparatus further includes a base lift device configured to move the intermediate frame relative to the base frame between a plurality of vertical configurations including a maximum raised configuration and a maximum lowered configuration.

X. The patient support apparatus of clause IX, wherein the patient support apparatus further includes:

a base controller in communication with the base lift device and configured to control the operations of the base lift device; and a litter controller in communication with the base controller and configured to control at least one function of the litter;

wherein the litter controller is configured to provide a docking status signal to the base controller conveying a docking state of the litter, the litter being in a first docking state while the litter is docking to or undocking from the base, and the litter being in a second docking state when the litter is not docking to or undocking from the base; and wherein the base controller is configured to inhibit motion of the base lift device when the base controller receives the docking status signal from the litter controller conveying that the litter is in the first docking state.

XI. The patient support apparatus of any one of clauses I-X, wherein the patient support apparatus further comprises:

a litter controller configured to control at least one function of the litter;

one or more emitters disposed on the base; and an emitter sensor disposed on the litter and in communication with the litter controller, the emitter sensor configured to provide an emitter sensor status signal to the litter controller based on a detected presence of the one or more emitters;

wherein the litter controller is configured to receive the sensor status signal and control the at least one function of the litter based on the sensor status signal.

XII. The patient support apparatus of clause XI, wherein the one or more emitters comprise magnets.

XIII. The patient support apparatus of clause XI, wherein the emitter sensor comprises a hall effect sensor.

XIV. The patient support apparatus of any one of clauses XI-XIII, wherein the one or more emitters includes a trolley receptacle emitter arranged such that the trolley receptacle emitter is aligned with the emitter sensor when the lower pin has been received by the trolley and the litter is in the litter lift chair position, wherein, when the trolley receptacle emitter is aligned with the emitter sensor, the emitter sensor is configured to provide a litter received sensor signal to the litter controller indicating that the litter is ready to be lowered to dock the litter to the base, and wherein, when the litter controller receives the litter received sensor signal, the litter controller is configured to command the litter lift device to move to the litter lift docking position to lower the litter such that that the lower pin abuts the lower pin stop and the upper pin abuts the upper pin stop to dock the litter to the trolley.

XV. The patient support apparatus of any one of clauses XI-XIV, wherein the one or more emitters include a lower pin stop emitter arranged to align with the emitter sensor when the litter lift device is in the litter lift docking position where the lower pin abuts the lower pin stop to dock the litter to the trolley; and wherein the emitter sensor is configured to provide a litter docked sensor signal to the litter controller conveying that the litter has been docked to the trolley.

XVI. The patient support apparatus of any one of clauses XI-XV, wherein the one or more emitters includes a head end emitter arranged on the intermediate frame at the head end of the base such that the head end emitter is aligned with the emitter sensor when the litter is docked to the trolley and the trolley is in the forward trolley position; and wherein the emitter sensor is configured to provide a forward sensor signal to the litter controller conveying that the litter is docked to the trolley and the trolley is in the forward trolley position.

XVII. The patient support apparatus of any one of clauses I-XVI, wherein the trolley includes a trolley safety latch configured to move between:

a first safety latch position where the trolley safety latch abuts the lower pin as the lower pin is received by the trolley, and a second safety latch position where the lower pin moves the trolley safety latch as the lower pin engages the lower pin stop to maintain engagement between the lower pin and the lower pin stop.

XVIII. The patient support apparatus of any one of clauses I-XVII, wherein the trolley includes a dock trolley lock mechanism configured to move between:

a first dock trolley lock position where the dock trolley lock mechanism abuts a portion of the intermediate frame to limit translation of the trolley relative to the intermediate frame when the trolley is in the trolley docking position, and a second dock trolley lock position where the dock trolley lock mechanism permits translation of the trolley relative to the intermediate frame.

XIX. The patient support apparatus of any one of clauses I-XVIII, wherein the trolley includes a forward trolley lock mechanism configured to move between:

a first forward trolley lock position where the forward trolley lock mechanism permits the lower pin to lift out of the lower pin stop, and a second forward trolley lock position where the forward trolley lock mechanism abuts a portion of the lower pin to maintain engagement between the lower pin and the lower pin stop.

What is claimed is:

1. A patient support apparatus for supporting a patient, the patient support apparatus comprising:

a base having a head end and a foot end, the base including:

a base frame arranged for movement about a floor surface, and an intermediate frame operatively coupled to the base frame, the intermediate frame including a trolley configured to translate between a plurality of trolley positions including a trolley forward position where the trolley is arranged at the head end of the base and a trolley docking position where the trolley is arranged at the foot end of the base, the trolley defining a lower pin stop and an upper pin stop spaced above the lower pin stop; and a litter for supporting the patient, the litter configured to be docked to and undocked from the trolley, the litter including:

a patient support surface for supporting the patient, a litter lift device configured to adjustably support the litter relative to the floor surface between a plurality of positions including a litter lift chair position and a litter lift dock position, wherein at least a portion of the patient support surface is closer to the floor surface in the litter lift dock position than in the litter lift chair position, a lower pin extending from the litter, and an upper pin extending from the litter and spaced above the lower pin;

wherein at least one of the upper pin and the lower pin are configured to be received by the trolley when the litter lift device is in the litter lift chair position, and, when the at least one of the upper pin and the lower pin have been received by the trolley, the litter lift device is configured to actuate from the litter lift chair position to the litter lift dock position to lower the litter such that the lower pin abuts the lower pin stop and the upper pin abuts the upper pin stop to dock the litter to the trolley.

2. The patient support apparatus of claim 1, wherein, when the litter is docked to the trolley, support of the litter relative to the floor surface is transferred from the litter lift device to the trolley, enabling the litter lift device to drive the litter to a litter loft position where the litter lift device is raised off the floor surface such that that the litter is cantilevered off the foot end of the base.

3. The patient support apparatus of claim 1, wherein the patient support surface is defined by a seat assembly with a seat frame having a front end and a rear end; and wherein the litter lift device includes:

a front assembly coupled to the front end of the seat frame and configured for movement between a plurality of front assembly positions including a front assembly chair position and a front assembly loft position; and a rear assembly coupled to the rear end of the seat frame and configured for movement between a plurality of rear assembly positions including a rear assembly chair position and a rear assembly loft position.

4. The patient support apparatus of claim 3, wherein the litter lift device includes:

a front actuator arranged to articulate the front assembly relative to the seat frame between the front assembly chair position and the front assembly loft position; and a rear actuator arranged to articulate the rear assembly relative to the seat frame between the rear assembly chair position and the rear assembly loft position.

5. The patient support apparatus of claim 4, wherein, when at least one of the lower pin and the a upper pin have been received by the trolley, the litter lift device is configured to actuate at least one of the front actuator and the rear actuator to move from the litter lift chair position to the litter lift dock position to bring the lower pin into abutment with the lower pin stop and to bring the upper pin into abutment with the upper pin stop to transfer support of the litter relative to the floor surface to the trolley.

6. The patient support apparatus of claim 5, wherein, when the litter is docked to the trolley:

the front actuator is configured to drive the front assembly to the front assembly loft position to lift the front assembly out of contact with the floor surface, and the rear actuator is configured to drive the rear assembly to the rear assembly loft position to lift the rear assembly out of contact with the floor surface to place the litter in a cantilevered position with the litter cantilevered off the foot end of the base.

7. The patient support apparatus of claim 6, wherein, when the litter is docked to the trolley with the front assembly in the front assembly loft position and with the rear assembly in the rear assembly loft position, the litter is configured to slidably translate relative to the intermediate frame between the cantilevered position and a litter forward position defined by the trolley being in the trolley forward position.

8. The patient support apparatus of claim 6, wherein the front actuator and the rear actuator are configured to simultaneously drive the front assembly to the front assembly loft position and the rear assembly to the rear assembly loft position.

9. The patient support apparatus of claim 1, wherein the patient support apparatus further includes a base lift device configured to move the intermediate frame relative to the base frame between a plurality of vertical configurations including a maximum raised configuration and a maximum lowered configuration.

10. The patient support apparatus of claim 9, wherein the patient support apparatus further includes:

a base controller in communication with the base lift device and configured to control the operations of the base lift device; and a litter controller in communication with the base controller and configured to control at least one function of the litter;

wherein the litter controller is configured to provide a docking status signal to the base controller conveying a docking state of the litter, the litter being in a first docking state while the litter is docking to or undocking from the base, and the litter being in a second docking state when the litter is not docking to or undocking from the base; and wherein the base controller is configured to inhibit motion of the base lift device when the base controller receives the docking status signal from the litter controller conveying that the litter is in the first docking state.

11. The patient support apparatus of claim 1, wherein the patient support apparatus further comprises:

a litter controller configured to control at least one function of the litter;

one or more emitters disposed on the base; and an emitter sensor disposed on the litter and in communication with the litter controller, the emitter sensor configured to provide an emitter sensor status signal to the litter controller based on a detected presence of the one or more emitters;

wherein the litter controller is configured to receive the sensor status signal and control the at least one function of the litter based on the sensor status signal.

12. The patient support apparatus of claim 11, wherein the one or more emitters comprise magnets.

13. The patient support apparatus of claim 11, wherein the emitter sensor comprises a hall effect sensor.

14. The patient support apparatus of claim 11, wherein the one or more emitters includes a trolley receptacle emitter arranged such that the trolley receptacle emitter is aligned with the emitter sensor when the lower pin has been received by the trolley and the litter is in the litter lift chair position, wherein, when the trolley receptacle emitter is aligned with the emitter sensor, the emitter sensor is configured to provide a litter received sensor signal to the litter controller indicating that the litter is ready to be lowered to dock the litter to the base, and wherein, when the litter controller receives the litter received sensor signal, the litter controller is configured to command the litter lift device to move to the litter lift docking position to lower the litter such that that the lower pin abuts the lower pin stop and the upper pin abuts the upper pin stop to dock the litter to the trolley.

15. The patient support apparatus of claim 11, wherein the one or more emitters include a lower pin stop emitter arranged to align with the emitter sensor when the litter lift device is in the litter lift docking position where the lower pin abuts the lower pin stop to dock the litter to the trolley; and wherein the emitter sensor is configured to provide a litter docked sensor signal to the litter controller conveying that the litter has been docked to the trolley.

16. The patient support apparatus of claim 11, wherein the one or more emitters includes a head end emitter arranged on the intermediate frame at the head end of the base such that the head end emitter is aligned with the emitter sensor when the litter is docked to the trolley and the trolley is in the forward trolley position; and wherein the emitter sensor is configured to provide a forward sensor signal to the litter controller conveying that the litter is docked to the trolley and the trolley is in the forward trolley position.

17. The patient support apparatus of claim 1, wherein the trolley includes a trolley safety latch configured to move between:

a first safety latch position where the trolley safety latch abuts the lower pin as the lower pin is received by the trolley, and a second safety latch position where the lower pin moves the trolley safety latch as the lower pin engages the lower pin stop to maintain engagement between the lower pin and the lower pin stop.

18. The patient support apparatus of claim 1, wherein the trolley includes a dock trolley lock mechanism configured to move between:

a first dock trolley lock position where the dock trolley lock mechanism abuts a portion of the intermediate frame to limit translation of the trolley relative to the intermediate frame when the trolley is in the trolley docking position, and a second dock trolley lock position where the dock trolley lock mechanism permits translation of the trolley relative to the intermediate frame.

19. The patient support apparatus of claim 1, wherein the trolley includes a forward trolley lock mechanism configured to move between:

a first forward trolley lock position where the forward trolley lock mechanism permits the lower pin to lift out of the lower pin stop, and a second forward trolley lock position where the forward trolley lock mechanism abuts a portion of the lower pin to maintain engagement between the lower pin and the lower pin stop.

* * * * *